US 011855885B2

(12) United States Patent
Dutta

(10) Patent No.: US 11,855,885 B2
(45) Date of Patent: Dec. 26, 2023

(54) LABEL SWITCHED PATH SCALABILITY

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 186 days.

(21) Appl. No.: 17/075,326

(22) Filed: Oct. 20, 2020

(65) Prior Publication Data

US 2022/0124028 A1    Apr. 21, 2022

(51) Int. Cl.
*H04L 45/50* (2022.01)
*H04L 45/02* (2022.01)
*H04L 45/00* (2022.01)
*H04L 45/28* (2022.01)

(52) U.S. Cl.
CPC .............. *H04L 45/50* (2013.01); *H04L 45/04* (2013.01); *H04L 45/22* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 7,936,780 B1 | 5/2011 | Kompella | |
| 8,121,126 B1 * | 2/2012 | Moisand | H04L 45/66 370/392 |
| 9,225,664 B2 | 12/2015 | Dutta | |
| 2005/0220107 A1 * | 10/2005 | DelRegno | H04L 45/66 370/392 |
| 2008/0253367 A1 * | 10/2008 | Ould-Brahim | H04L 45/50 370/467 |

(Continued)

OTHER PUBLICATIONS

Andersson, L., et al., "LDP Specification," Network Working Group, RFC 5036, Oct. 2007, 135 pages.

(Continued)

*Primary Examiner* — Xavier S Wong
(74) *Attorney, Agent, or Firm* — Tong, Rea, Bentley & Kim, LLC

(57) ABSTRACT

Various example embodiments for supporting scalability of label switched paths (LSPs) in a label switching network are presented herein. Various example embodiments for supporting scalability of LSPs in a label switching network may be configured to support scalability of LSPs in a Multiprotocol Label Switching (MPLS) network. Various example embodiments for supporting scalability of LSPs in an MPLS network may be configured to support scalability of LSPs of various FEC types. Various example embodiments for supporting scalability of LSPs in an MPLS network may be configured to support scalability of Prefix FEC based LSPs spanning across multiple routing domains. Various example embodiments for supporting scalability of LSPs in an MPLS network may be configured to support scalability of LSPs for various FEC types that enable aggregation of ranges of FECs by aggregate FECs. Various example embodiments for supporting scalability of LSPs in an MPLS network may be configured to support scalability of LSPs implemented as pseudowires (PWs).

21 Claims, 26 Drawing Sheets

(56) References Cited

U.S. PATENT DOCUMENTS

| | | | | |
|---|---|---|---|---|
| 2009/0268731 | A1* | 10/2009 | Narayanan | H04L 45/50 370/390 |
| 2011/0164617 | A1* | 7/2011 | Yong | H04L 45/502 370/392 |
| 2014/0341016 | A1* | 11/2014 | Kini | H04L 45/507 370/230 |
| 2015/0207675 | A1* | 7/2015 | Hayashi | H04L 41/0668 370/225 |
| 2021/0119907 | A1* | 4/2021 | Hu | H04L 45/22 |
| 2021/0273881 | A1* | 9/2021 | Peng | H04L 12/4633 |

OTHER PUBLICATIONS

Moy, J., "OSPF Version 2," Network Working Group, RFC 2328, Apr. 1998, 244 pages.

Coltun, R., et al., "OSPF for IPV6," Network Working Group, RFC 5340, Jul. 2008, 94 pages.

Callon, W., "Use of OSI IS-IS for Routing in TCP/IP and Dual Environments," Network Working Group, RFC 1195, Dec. 1990, 68 pages.

Rekhter, Y., et al., "Carrying Label Information in BGP-4," Network Working Group, RFC 3107, May 2001, 8 pages.

Swallow, G., et al., "Network Scaling with Aggregate LSPs," draft-swallow-mpls-aggregate-fec-01, Network Working Group, Jul. 7, 2008, 10 pages.

Filsfils, C., et al., "Segment Routing Architecture," Internet Engineering Task Force (IETF), RFC 8402, Jul. 2018, 32 pages.

Bashandy, A., et al., "Segment Routing with the MPLS Data Plane," Internet Engineering Task Force (IETF), RFC 8860, Dec. 2019, 29 pages.

Bryant, S., et al., "Pseudo Wire Emulation Edge-to-Edge (PWE3) Architecture," Network Working Group, RFC 3985, Mar. 2005, 42 pages.

Martini, L., et al., "Pseudowire Setup and Maintenance Using the Label Distribution Protocol (LDP)," Network Working Group, RFC 4447, Apr. 2006, 33 pages.

Boutros, S., et al., "Virtual Private Wire Service Support in Ethernet VPN," Internet Engineering Task Force (IETF), RFC 8214, Aug. 2017, 17 pages.

Bocci, M., et al., "An Architecture for Multi-Segment Pseudowire Emulation Edge-to-Edge," Network Working Group, RFC 5659, Oct. 2009, 24 pages.

Martini, L., et al., "Dynamic Placement of Multi-Segment Pseudowires," Internet Engineering Task Force (IETF), RFC 7267, Jun. 2014, 24 pages.

Iana, "Special-Purpose Multiprotocol Label Switching (MPLS) Label Values," printed on Oct. 20, 2020 from https://www.iana.org/assignments/mpls-label-values/mpls-label-values.xhtml).

EP Search Report mailed in corresponding EP 21193049.0 dated Jan. 27, 2022, 11 pages.

* cited by examiner

*FIG. 2A*

| R1: IP ROUTE TABLE ||
|---|---|
| IP PREFIX | NEXT-HOP |
| 10.10.1.1/32 | LOCAL |
| 10.10.1.2/32 | R1->R2 |
| 10.10.1.3/32 | R1->R3 |
| 10.10.1.4/32 | R1->R3 |
| 10.10.1.5/32 | R1->R2 |
| 10.10.1.6/32 | R1->R2 |
| .... | ...... |
| 10.10.2.0/24 | R1->R2 |
| 10.10.3.0/24 | R1->R2 |

*FIG. 2B*

| R6: IP ROUTE TABLE ||
|---|---|
| IP PREFIX | NEXT-HOP |
| 10.10.1.1/32 | R6->R2 |
| 10.10.1.2/32 | R6->R2 |
| 10.10.1.3/32 | R6->R4 |
| 10.10.1.4/32 | R6->R4 |
| 10.10.1.5/32 | R6->R5 |
| 10.10.1.6/32 | LOCAL |
| .... | ...... |
| 10.10.2.0/24 | R6->R11 |
| ...... | ...... |
| 10.10.3.11/24 | R6->R11 |
| 10.10.3.12/24 | R6->R11 |
| 10.10.3.13/24 | R6->R11 |
| 10.10.3.14/24 | R6->R11 |

*FIG. 2C*

| R7: IP ROUTE TABLE ||
|---|---|
| IP PREFIX | NEXT-HOP |
| 10.10.1.0/24 | R7->R12 |
| ...... | ...... |
| 10.10.2.7/32 | LOCAL |
| 10.10.2.8/32 | R7->R8 |
| 10.10.2.9/32 | R7->R8 |
| 10.10.2.10/32 | R7->R10 |
| .... | ...... |
| 10.10.3.11/24 | R7->R12 |
| 10.10.3.12/24 | R7->R12 |
| 10.10.3.13/24 | R7->R12 |
| 10.10.3.14/24 | R7->R12 |

*FIG. 2D*

| R9: IP ROUTE TABLE ||
|---|---|
| IP PREFIX | NEXT-HOP |
| 10.10.1.0/24 | R9->R10 |
| ...... | ...... |
| 10.10.2.7/32 | R9->R10 |
| 10.10.2.8/32 | R9->R8 |
| 10.10.2.9/32 | LOCAL |
| 10.10.2.10/32 | R9->R10 |
| .... | ...... |
| 10.10.3.0/24 | R9->R10 |
| .... | ...... |

*FIG. 3A-1*

| R1: ILM TABLE | |
|---|---|
| LABEL | NHLFE |
| L1-1 | LOCAL |
| L2-1 | R1->R2, L2-2 |
| L3-1 | R1->R3, L3-3 |
| L4-1 | R1->R3, L4-3 |
| L5-1 | R1->R2, L5-2 |
| L6-1 | R1->R2, L6-2 |
| .... | .... |
| L7-1 | R1->R2, L7-2 |
| L8-1 | R1->R2, L8-2 |
| L9-1 | R1->R2, L9-2 |
| L10-1 | R1->R2, L10-2 |
| .... | ..... |
| L11-1 | R1->R2, L11-2 |
| L12-1 | R1->R2, L12-2 |
| L13-1 | R1->R2, L13-2 |
| L14-1 | R1->R2, L14-2 |

*FIG. 3A-2*

| R1: FTN TABLE | |
|---|---|
| FEC | NHLFE |
| 10.10.1.2/32 | R1->R2, L2-2 |
| 10.10.1.3/32 | R1->R3, L3-3 |
| 10.10.1.4/32 | R1->R3, L4-3 |
| 10.10.1.5/32 | R1->R2, L5-2 |
| 10.10.1.6/32 | R1->R2, L6-2 |
| .... | .... |
| 10.10.2.7/32 | R1->R2, L7-2 |
| 10.10.2.8/32 | R1->R2, L8-2 |
| 10.10.2.9/32 | R1->R2, L9-2 |
| 10.10.2.10/32 | R1->R2, L10-2 |
| .... | ..... |
| 10.10.3.11/32 | R1->R2, L11-2 |
| 10.10.3.12/32 | R1->R2, L12-2 |
| 10.10.3.13/32 | R1->R2, L13-2 |
| 10.10.3.14/32 | R1->R2, L14-2 |
| ... | .... |

*FIG. 3B-1*

| R6: ILM TABLE | |
|---|---|
| LABEL | NHLFE |
| L1-6 | R6->R2, L1-2 |
| L2-6 | R6->R2, L2-2 |
| L3-6 | R6->R4, L3-4 |
| L4-6 | R6->R4, L4-4 |
| L5-6 | R6->R5, L5-5 |
| L6-6 | LOCAL |
| .... | ..... |
| L7-6 | R6->R11, L7-11 |
| L8-6 | R6->R11, L8-11 |
| L9-6 | R6->R11, L9-11 |
| L10-6 | R6->R11, L10-11 |
| ..... | ..... |
| L11-6 | R6->R11, L11-11 |
| L12-6 | R6->R11, L12-11 |
| L13-6 | R6->R11, L13-11 |
| L14-6 | R6->R11, L14-11 |
| ... | ... |

*FIG. 3B-2*

| R6: FTN TABLE | |
|---|---|
| FEC | NHLFE |
| 10.10.1.1/32 | R6->R2, L1-2 |
| 10.10.1.2/32 | R6->R2, L2-2 |
| 10.10.1.3/32 | R6->R4, L3-4 |
| 10.10.1.4/32 | R6->R4, L4-4 |
| 10.10.1.5/32 | R6->R5, L5-5 |
| .... | ..... |
| 10.10.2.7/32 | R6->R11, L7-11 |
| 10.10.2.8/32 | R6->R11, L8-11 |
| 10.10.2.9/32 | R6->R11, L9-11 |
| 10.10.2.10/32 | R6->R11, L10-11 |
| ..... | ..... |
| 10.10.3.11/32 | R6->R11, L11-11 |
| 10.10.3.12/32 | R6->R11, L12-11 |
| 10.10.3.13/32 | R6->R11, L13-11 |
| 10.10.3.14/32 | R6->R11, L14-11 |
| ... | ... |

*FIG. 3C-1*

| R7: ILM TABLE | |
|---|---|
| LABEL | NHLFE |
| L1-7 | R7->R12, L1-12 |
| L2-7 | R7->R12, L2-12 |
| L3-7 | R7->R12, L3-12 |
| L4-7 | R7->R12, L4-12 |
| L5-7 | R7->R12, L5-12 |
| L6-7 | R7->R12, L6-12 |
| ...... | ...... |
| L7-7 | LOCAL |
| L8-7 | R7->R8, L8-8 |
| L9-7 | R7->R8, L9-8 |
| L10-7 | R7->R10, L10-10 |
| .... | ..... |
| L11-7 | R7->R12, L11-12 |
| L12-7 | R7->R12, L12-12 |
| L13-7 | R7->R12, L13-12 |
| L14-7 | R7->R12, L14-12 |
| .... | .... |

*FIG. 3C-2*

| R7: FTN TABLE | |
|---|---|
| FEC | NHLFE |
| 10.10.1.1/32 | R7->R12, L1-12 |
| 10.10.1.2/32 | R7->R12, L2-12 |
| 10.10.1.3/32 | R7->R12, L3-12 |
| 10.10.1.4/32 | R7->R12, L4-12 |
| 10.10.1.5/32 | R7->R12, L5-12 |
| 10.10.1.6/32 | R7->R12, L6-12 |
| ...... | ...... |
| 10.10.2.8/32 | R7->R8, L8-8 |
| 10.10.2.9/32 | R7->R8, L9-8 |
| 10.10.2.10/32 | R7->R10, L10-10 |
| .... | ..... |
| 10.10.3.11/32 | R7->R12, L11-12 |
| 10.10.3.12/32 | R7->R12, L12-12 |
| 10.10.3.13/32 | R7->R12, L13-12 |
| 10.10.3.14/32 | R7->R12, L14-12 |
| .... | ...... |

*FIG. 3D-1*

| R9: ILM TABLE | |
|---|---|
| LABEL | NHLFE |
| L1-9 | R9->R10, L1-10 |
| L2-9 | R9->R10, L2-10 |
| L3-9 | R9->R10, L3-10 |
| L4-9 | R9->R10, L4-10 |
| L5-9 | R9->R10, L5-10 |
| L6-9 | R9->R10, L6-10 |
| ...... | ...... |
| L7-9 | R9->R10, L7-10 |
| L8-9 | R9->R8, L8-8 |
| L9-9 | LOCAL |
| L10-9 | R9->R10, L10-10 |
| .... | ..... |
| L11-9 | R9->R10, L11-10 |
| L12-9 | R9->R10, L12-10 |
| L13-9 | R9->R10, L13-10 |
| L14-9 | R9->R10, L14-10 |
| .... | ...... |

*FIG. 3D-2*

| R9: FTN TABLE | |
|---|---|
| FEC | NHLFE |
| 10.10.1.1/32 | R9->R10, L1-10 |
| 10.10.1.2/32 | R9->R10, L2-10 |
| 10.10.1.3/32 | R9->R10, L3-10 |
| 10.10.1.4/32 | R9->R10, L4-10 |
| 10.10.1.5/32 | R9->R10, L5-10 |
| 10.10.1.6/32 | R9->R10, L6-10 |
| ...... | ...... |
| 10.10.2.7/32 | R9->R10, L7-10 |
| 10.10.2.8/32 | R9->R8, L8-8 |
| 10.10.2.10/32 | R9->R10, L10-10 |
| .... | ..... |
| 10.10.3.11/32 | R9->R10, L11-10 |
| 10.10.3.12/32 | R9->R10, L12-10 |
| 10.10.3.13/32 | R9->R10, L13-10 |
| 10.10.3.14/32 | R9->R10, L14-10 |
| .... | ..... |

*FIG. 5A-1*

| R1: ILM TABLE | |
|---|---|
| LABEL | NHLFE |
| L1-1 | LOCAL, FEC=10.10.1.1/32 |
| L2-1 | R1->R2, L2-2 |
| L3-1 | R1->R3, L3-3 |
| L4-1 | R1->R3, L4-3 |
| L5-1 | R1->R2, L5-2 |
| L6-1 | R1->R2, L6-2 |
| .... | .... |
| LA2-1 | R1->R2, LA2-2 |
| .... | ..... |
| LA0-1 | R1->R2, LA0-2 |
| .... | ..... |
| VL-1 | LOCAL, VPN 100 |
| .... | ...... |

*FIG. 5A-2*

| R1: FTN TABLE | |
|---|---|
| FEC | NHLFE |
| 10.10.1.2/32 | R1->R2, L2-2 |
| 10.10.1.3/32 | R1->R3, L3-3 |
| 10.10.1.4/32 | R1->R3, L4-3 |
| 10.10.1.5/32 | R1->R2, L5-2 |
| 10.10.1.6/32 | R1->R2, L6-2 |
| .... | .... |
| 10.10.2.0/24 | R1->R2, LA2-2 |
| .... | ..... |
| 10.10.3.0/24 | R1->R2, LA0-2 |
| ... | .... |

*FIG. 5B-1*

| R6: ILM TABLE | |
|---|---|
| LABEL | NHLFE |
| L1-6 | R6->R2, L1-2 |
| L2-6 | R6->R2, L2-2 |
| L3-6 | R6->R4, L3-4 |
| L4-6 | R6->R4, L4-4 |
| L5-6 | R6->R5, L5-5 |
| L6-6 | LOCAL, FEC=10.10.1.6/32 |
| LA1-6 | LOCAL, FEC=10.10.1.0/24 |
| .... | ...... |
| LA2-6 | R6->R11, LA2-11 |
| ..... | ..... |
| L11-6 | R6->R11, L11-11 |
| L12-6 | R6->R11, L12-11 |
| L13-6 | R6->R11, L13-11 |
| L14-6 | R6->R11, L14-11 |
| LA3-6 | LOCAL, FEC=10.10.3.0/24 |
| ... | ... |

*FIG. 5B-2*

| R6: FTN TABLE | |
|---|---|
| FEC | NHLFE |
| 10.10.1.1/32 | R6->R2, L1-2 |
| 10.10.1.2/32 | R6->R2, L2-2 |
| 10.10.1.3/32 | R6->R4, L3-4 |
| 10.10.1.4/32 | R6->R4, L4-4 |
| 10.10.1.5/32 | R6->R5, L5-5 |
| .... | ..... |
| 10.10.2.0/24 | R6->R11, LA2-11 |
| ..... | ..... |
| 10.10.3.11/32 | R6->R11, L11-11 |
| 10.10.3.12/32 | R6->R11, L12-11 |
| 10.10.3.13/32 | R6->R11, L13-11 |
| 10.10.3.14/32 | R6->R11, L14-11 |
| ... | ... |

*FIG. 5C-1*

| R7: ILM TABLE | |
|---|---|
| LABEL | NHLFE |
| LA1-7 | R7->R12, LA1-12 |
| ...... | ...... |
| L7-7 | LOCAL, FEC=10.10.2.7/32 |
| L8-7 | R7->R8, L8-8 |
| L9-7 | R7->R8, L9-8 |
| L10-7 | R7->R10, L10-10 |
| LA2-7 | LOCAL, FEC=10.10.2.0/24 |
| .... | ..... |
| L11-7 | R7->R12, L11-12 |
| L12-7 | R7->R12, L12-12 |
| L13-7 | R7->R12, L13-12 |
| L14-7 | R7->R12, L14-12 |
| LA3-7 | LOCAL, FEC=10.10.3.0/24 |
| .... | .... |

*FIG. 5C-2*

| R7: FTN TABLE | |
|---|---|
| FEC | NHLFE |
| 10.10.1.0/24 | R7->R12, L1-12 |
| ...... | ...... |
| 10.10.2.8/32 | R7->R8, L8-8 |
| 10.10.2.9/32 | R7->R8, L9-8 |
| 10.10.2.10/32 | R7->R10, L10-10 |
| .... | ...... |
| 10.10.3.11/32 | R7->R12, L11-12 |
| 10.10.3.12/32 | R7->R12, L12-12 |
| 10.10.3.13/32 | R7->R12, L13-12 |
| 10.10.3.14/32 | R7->R12, L14-12 |
| .... | ...... |

*FIG. 5D-1*

| R9: ILM Table | |
|---|---|
| Label | NHLFE |
| LA1-9 | R9->R10, LA1-10 |
| ...... | ...... |
| L7-9 | R9->R10, L7-10 |
| L8-9 | R9->R8, L8-8 |
| L9-9 | Local, FEC=10.10.2.9/32 |
| L10-9 | R9->R10, L10-10 |
| .... | ..... |
| LA0-9 | R9->R10, LA0-10 |
| .... | ..... |
| VL-9 | Local, VPN 100 |
| .... | ...... |

*FIG. 5D-2*

| R9: FTN TABLE | |
|---|---|
| FEC | NHLFE |
| 10.10.1.0/24 | R9->R10, LA1-10 |
| ...... | ...... |
| 10.10.2.7/32 | R9->R10, L7-10 |
| 10.10.2.8/32 | R9->R8, L8-8 |
| 10.10.2.10/32 | R9->R10, L10-10 |
| .... | ...... |
| 10.10.3.0/24 | R9->R10, LA0-10 |
| .... | ..... |

*FIG. 8A*

| PE-1: ILM TABLE | |
|---|---|
| LABEL | NHLFE |
| L1-1 | LOCAL, PWid=1 |
| L2-1 | LOCAL, PWid=2 |
| L3-1 | LOCAL, PWid=3 |
| L4-1 | LOCAL, PWid=4 |
| .... | .... |
| LY | LOCAL, PWid=100 |
| .... | .... |
| L200-1 | LOCAL, PWid=200 |
| .... | .... |
| L1100-1 | LOCAL, PWid=1100 |
| .... | .... |
| L8000-1 | LOCAL, PWid=8000 |
| .... | ...... |
| L128000-1 | LOCAL, PWid=128000 |
| .... | ...... |
| L5 | LOCAL, LSP-B |
| .... | ...... |

| PE-1: PWID TABLE | |
|---|---|
| PWid | FORWARD ACTION |
| 1 | PE-1->... |
| 2 | PE-1->.... |
| 3 | PE-1->... |
| 4 | PE-1->.... |
| .... | .... |
| 100 | PE-1->S1 |
| .... | .... |
| 200 | PE-1->.... |
| .... | .... |
| 1100 | PE-1->.... |
| .... | ...... |
| 8000 | PE-1->... |
| .... | ...... |
| 128000 | PE-1->... |
| .... | ...... |

| PE-1: FTN TABLE | |
|---|---|
| FEC | NHLFE |
| PWid=1 | PE-2, L1-2 |
| PWid=2 | PE-2, L2-2 |
| PWid=3 | PE-2, L3-2 |
| PWid=4 | PE-2, L4-2 |
| .... | .... |
| PWid=100 | PE-2, LX |
| .... | .... |
| PWid=200 | PE-2, L200-2 |
| .... | ..... |
| PWid=1100 | PE-2, L1100-2 |
| ... | .... |
| PWid=8000 | PE-2, L8000-2 |
| ... | .... |
| PWid=128000 | PE-2, L128000-2 |
| ... | .... |
| LSP-A | PE1->P1, L1 |
| ... | .... |

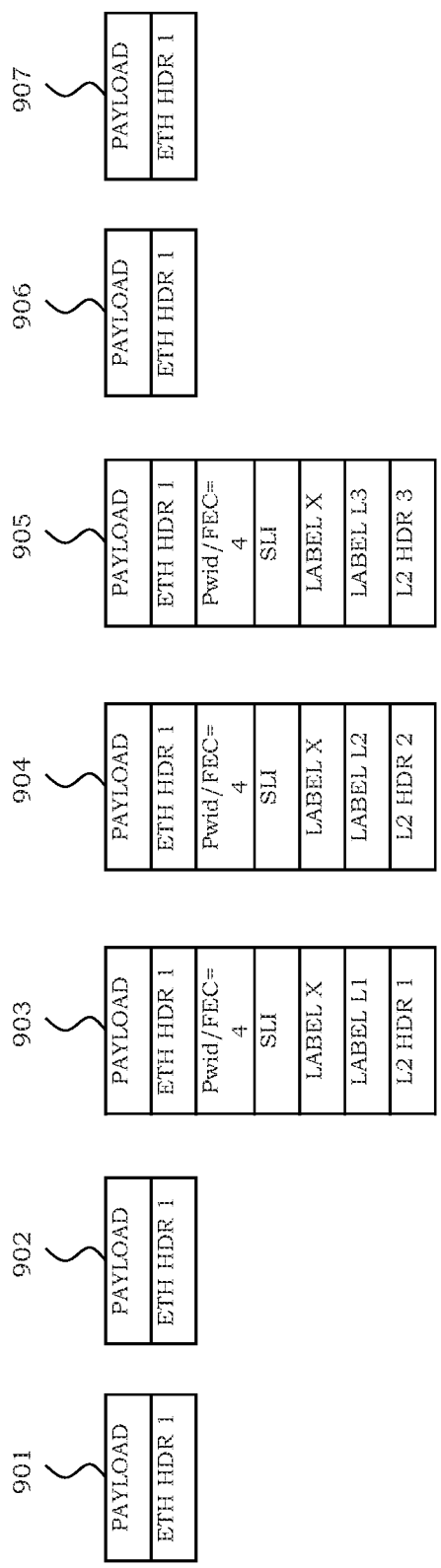
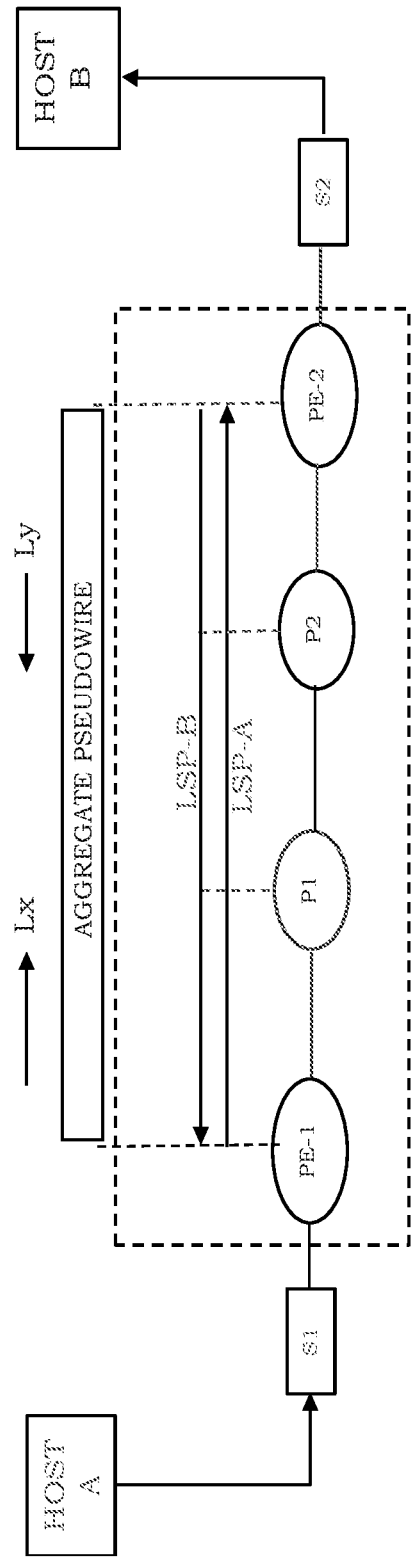
FIG. 9

FIG. 10B

| PE-2: ILM TABLE | |
|---|---|
| LABEL | NHLFE |
| .... | .... |
| Lx | LOCAL, PWid=100 |
| .... | .... |
| L3 | LOCAL, LSP-A |
| .... | ....... |

| PE-1: MEMBER PWID TABLE FOR AGGREGATE PWID 100 | |
|---|---|
| PWid | FORWARD ACTION |
| 1 | PE-2->... |
| 2 | PE-2->.... |
| 3 | PE-2->... |
| 4 | PE-2->S2 |
| .... | .... |
| 100 | PE-2->... |
| .... | .... |
| 200 | PE-2->.... |
| .... | .... |
| 1100 | PE-2->.... |
| .... | ..... |
| 8000 | PE-2->... |
| .... | ....... |
| 128000 | PE-2->... |
| .... | ....... |

| PE-2: FTN TABLE | |
|---|---|
| FEC | NHLFE |
| .... | .... |
| PWid=100 | PE-1, Ly |
| ... | .... |
| LSP-B | PE-2->P2, L4 |

*FIG. 14*

PREFIX FEC SUB-LSP
1400

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| FEC Type(1) |     Flags     |  Addr Family  | Prefix Length |
+-+-+-+-+-+-+-+-+-+-+-+-+-+-+-+-+-+-+-+-+-+-+-+-+-+-+-+-+-+-+-+-+
|                                                               |
~                        Prefix (Variable)                      ~
|                                                               |
+-+-+-+-+-+-+-+-+-+-+-+-+-+-+-+-+-+-+-+-+-+-+-+-+-+-+-+-+-+-+-+-+
```

*FIG. 15*

PWif FEC SUB-LSP
1500

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| FEC Type(2) |     Flags     |            PW id              |
+-+-+-+-+-+-+-+-+-+-+-+-+-+-+-+-+-+-+-+-+-+-+-+-+-+-+-+-+-+-+-+-+
```

*FIG. 16*

RANGE-IN-AGGREGATE
FEC SUB-LSP
1600

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| FEC Type(3) |     Flags     |          Start Offset         |
+-+-+-+-+-+-+-+-+-+-+-+-+-+-+-+-+-+-+-+-+-+-+-+-+-+-+-+-+-+-+-+-+
|            Range            |
+-+-+-+-+-+-+-+-+-+-+-+-+-+-+-+
```

LABEL SWITCHED PATH SCALABILITY

TECHNICAL FIELD

Various example embodiments relate generally to communication systems and, more particularly but not exclusively, to supporting scalability of label switched paths (LSPs) in communication system.

BACKGROUND

In many communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support communication of a packet on a sub label switched path of an aggregate label switched path based on inclusion of a forwarding equivalence class of the sub label switched path below a label of the aggregate label switched path. In at least some example embodiments, to support communication of the packet, the set of instructions is configured to, when executed by the at least one processor, cause the apparatus to determine, by an egress router of the aggregate label switched path based on the forwarding equivalence class of the sub label switched path, a next label switched path for the packet. In at least some example embodiments, the set of instructions is configured to, when executed by the at least one processor, cause the apparatus to prevent signaling, by an egress router of the aggregate label switched path, signaling of an association of the sub label switched path to the aggregate label switched path. In at least some example embodiments, the set of instructions is configured to, when executed by the at least one processor, cause the apparatus to form, by an ingress router of the aggregate label switched path, an association of the sub label switched path to the aggregate label switched path. In at least some example embodiments, the association of the sub label switched path to the aggregate label switched path is based on the forwarding equivalence class of the sub label switched path being a subset of a forwarding equivalence class of the aggregate label switched path. In at least some example embodiments, the association of the sub label switched path to the aggregate label switched path is based on a policy at the ingress router. In at least some example embodiments, the sub label switched path is based on a first version of Internet Protocol (IP) and the aggregate label switched path is based on a second version of IP, and the policy at the ingress router is configured to associate a first IP prefix of the first version of IP with a second IP prefix of the second version of IP. In at least some example embodiments, a forwarding equivalence class type of the sub label switched path and a forwarding equivalence class type of the aggregate label switched path are the same. In at least some example embodiments, the forwarding equivalence class type of the sub label switched path and the forwarding equivalence class type of the aggregate label switched path are a prefix forwarding equivalence class type. In at least some example embodiments, the forwarding equivalence class of the sub label switched path is a subset of the forwarding equivalence class of the aggregate label switched path. In at least some example embodiments, the prefix forwarding equivalence class type is an Internet Protocol version 4 (IPv4) prefix or an Internet Protocol version 6 (IPv6) prefix. In at least some example embodiments, the sub label switched path is a single segment pseudowire and the forwarding equivalence class of the sub label switched path is a numeric PWid based forwarding equivalence class type, and the aggregate label switched path is a single-segment pseudowire and the forwarding equivalence class of the aggregate label switched path is a PWid based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a PWid forwarding equivalence class type. In at least some example embodiments, a forwarding equivalence class type of the sub label switched path and a forwarding equivalence class type of the aggregate label switched path are different. In at least some example embodiments, the sub label switched path is a single segment pseudowire and the forwarding equivalence class of the sub label switched path is a PWid based forwarding equivalence class type, and the aggregate label switched path is a multi-segment pseudowire and the forwarding equivalence class of the aggregate label switched path is an {SAII, TAII} based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a single-segment pseudowire forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a multi-segment pseudowire forwarding equivalence class type. In at least some example embodiments, the sub label switched path and the aggregate label switched path have a common egress router. In at least some example embodiments, an egress router of the aggregate label switched path is a border router of a routing domain, and a forwarding equivalence class type of the aggregate label switched path is a prefix forwarding equivalence class type. In at least some example embodiments, the routing domain is an Interior Gateway Protocol (IGP) area or an Autonomous System (AS). In at least some example embodiments, the prefix forwarding equivalence class type is a prefix forwarding equivalence class that encodes an Internet Protocol (IP) route prefix summarized by the border router of the routing domain. In at least some example embodiments, an egress router of the aggregate label switched path is a provider edge router, and a forwarding equivalence class type of the aggregate label switched path is a single segment pseudowire forwarding equivalence class type. In at least some example embodiments, an egress router of the aggregate label switched path is a terminating provider edge router, and a forwarding equivalence class type of the aggregate label switched path is a multi-segment pseudowire forwarding equivalence class type. In at least some example embodiments, the set of instructions is configured to, when executed by the at least one processor, cause the apparatus to verify, by an ingress router, a validity of the sub label switched path at an egress router of the aggregate label switched path. In at least some example embodiments, the validity of the sub label switched path at the egress router of the aggregate label switched path is verified based on sending of at least one connectivity message from the ingress router to the egress router of the aggregate label switched path. In at least some example embodiments, the set of instructions is configured to, when executed by the at least one processor, cause the apparatus to signal, by an egress router of the aggregate label switched path, an indication of a set of valid sub label switched paths of the aggregate label switched path. In at least some example embodiments, to signal the indication of the set of valid sub label switched paths of the aggregate label switched path, the set of instructions is configured to, when executed by the at least one processor, cause the apparatus to include, by the egress router of the aggregate label switched path within a label mapping message of the aggregate label switched path, a bit string including a set of bit positions associated with a respective set of sub label switched paths of the aggregate label switched path. In at least some example embodiments, the forwarding equivalence class of the sub label switched path is a numeric PWid forwarding equivalence class type and a forwarding equivalence class type of the aggregate label switched path is a single segment pseudowire forwarding equivalence class type, and the bit position of the sub label switched path in the bit string is a PWid of the sub label switched path. In at least some example embodiments, the forwarding equivalence class of the sub label switched path is a numeric PWid forwarding equivalence class type and a forwarding equivalence class type of the aggregate label switched path is a multi-segment pseudowire forwarding equivalence class type, and the bit position of the sub label switched path in the bit string is a PWid of the sub label switched path. In at least some example embodiments, the forwarding equivalence class of the sub label switched path is an Internet Protocol (IP) host address within a prefix forwarding equivalence class of the aggregate label switched path, and the bit position of the sub label switched path in the bit string is an offset of the IP host address within the prefix forwarding equivalence class of the aggregate label switched path. In at least some example embodiments, an apparatus includes at least one processor and at least one memory including a set of instructions, wherein the set of instructions is configured to, when executed by the at least one processor, cause the apparatus to support communication of a packet on a sub label switched path of a label switched path based on inclusion of a forwarding equivalence class of the sub label switched path below a label of the label switched path.

In at least some example embodiments, a non-transitory computer-readable medium stores a set of instructions configured to cause an apparatus to support communication of a packet on a sub label switched path of an aggregate label switched path based on inclusion of a forwarding equivalence class of the sub label switched path below a label of the aggregate label switched path. In at least some example embodiments, to support communication of the packet, the set of instructions is configured to the apparatus to determine, by an egress router of the aggregate label switched path based on the forwarding equivalence class of the sub label switched path, a next label switched path for the packet. In at least some example embodiments, the set of instructions is configured to cause the apparatus to prevent signaling, by an egress router of the aggregate label switched path, signaling of an association of the sub label switched path to the aggregate label switched path. In at least some example embodiments, the set of instructions is configured to cause the apparatus to form, by an ingress router of the aggregate label switched path, an association of the sub label switched path to the aggregate label switched path. In at least some example embodiments, the association of the sub label switched path to the aggregate label switched path is based on the forwarding equivalence class of the sub label switched path being a subset of a forwarding equivalence class of the aggregate label switched path. In at least some example embodiments, the association of the sub label switched path to the aggregate label switched path is based on a policy at the ingress router. In at least some example embodiments, the sub label switched path is based on a first version of Internet Protocol (IP) and the aggregate label switched path is based on a second version of IP, and the policy at the ingress router is configured to associate a first IP prefix of the first version of IP with a second IP prefix of the second version of IP. In at least some example embodiments, a forwarding equivalence class type of the sub label switched path and a forwarding equivalence class type of the aggregate label switched path are the same. In at least some example embodiments, the forwarding equivalence class type of the sub label switched path and the forwarding equivalence class type of the aggregate label switched path are a prefix forwarding equivalence class type. In at least some example embodiments, the forwarding equivalence class of the sub label switched path is a subset of the forwarding equivalence class of the aggregate label switched path. In at least some example embodiments, the prefix forwarding equivalence class type is an Internet Protocol version 4 (IPv4) prefix or an Internet Protocol version 6 (IPv6) prefix. In at least some example embodiments, the sub label switched path is a single segment pseudowire and the forwarding equivalence class of the sub label switched path is a numeric PWid based forwarding equivalence class type, and the aggregate label switched path is a single-segment pseudowire and the forwarding equivalence class of the aggregate label switched path is a PWid based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a PWid forwarding equivalence class type. In at least some example embodiments, a forwarding equivalence class type of the sub label switched path and a forwarding equivalence class type of the aggregate label switched path are different. In at least some example embodiments, the sub label switched path is a single segment pseudowire and the forwarding equivalence class of the sub label switched path is a PWid based forwarding equivalence class type, wherein the aggregate label switched path is a multi-segment pseudowire and the forwarding equivalence class of the aggregate label switched path is an {SAII, TAII} based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a single-segment pseudowire forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a multi-segment pseudowire forwarding equivalence class type. In at least some example embodiments, the sub label switched path and the aggregate label switched path have a common egress router. In at least some example embodiments, an egress router of the aggregate label switched path is a border router of a routing domain, and a forwarding equivalence class type of the aggregate label switched path is a prefix forwarding equivalence class type. In at least some example embodiments, the routing domain is an Interior Gateway Protocol (IGP) area or an Autonomous System (AS). In at least some example embodiments, the prefix forwarding equivalence class type is a prefix forwarding equivalence class that encodes an Internet Protocol (IP) route prefix summarized by the border router of the routing domain. In at least some example embodiments, an egress router of the aggregate label switched path is a provider edge router, and a forwarding equivalence class type of the aggregate label switched path is a single segment pseudowire forwarding equivalence class type. In at least some example embodiments, an egress router of the aggregate label switched path is a terminating provider edge router, and a forwarding equivalence class type of the aggregate label switched path is a multi-segment pseudowire forwarding equivalence class type. In at least some example embodiments, the set of instructions is configured to cause the apparatus to verify, by an ingress router, a validity of the sub label switched path at an egress router of the aggregate label switched path. In at least some example embodiments, the validity of the sub label switched path at the egress router of the aggregate label switched path is verified based on sending of at least one connectivity message from the ingress router to the egress router of the aggregate label switched path. In at least some example embodiments, the set of instructions is configured to cause the apparatus to signal, by an egress router of the aggregate label switched path, an indication of a set of valid sub label switched paths of the aggregate label switched path. In at least some example embodiments, to signal the indication of the set of valid sub label switched paths of the aggregate label switched path, the set of instructions is configured to cause the apparatus to include, by the egress router of the aggregate label switched path within a label mapping message of the aggregate label switched path, a bit string including a set of bit positions associated with a respective set of sub label switched paths of the aggregate label switched path. In at least some example embodiments, the forwarding equivalence class of the sub label switched path is a numeric PWid forwarding equivalence class type and a forwarding equivalence class type of the aggregate label switched path is a single segment pseudowire forwarding equivalence class type, and the bit position of the sub label switched path in the bit string is a PWid of the sub label switched path. In at least some example embodiments, the forwarding equivalence class of the sub label switched path is a numeric PWid forwarding equivalence class type and a forwarding equivalence class type of the aggregate label switched path is a multi-segment pseudowire forwarding equivalence class type, and the bit position of the sub label switched path in the bit string is a PWid of the sub label switched path. In at least some example embodiments, the forwarding equivalence class of the sub label switched path is an Internet Protocol (IP) host address within a prefix forwarding equivalence class of the aggregate label switched path, and the bit position of the sub label switched path in the bit string is an offset of the IP host address within the prefix forwarding equivalence class of the aggregate label switched path. In at least some example embodiments, a non-transitory computer-readable medium stores a set of instructions configured to cause an apparatus to support communication of a packet on a sub label switched path of a label switched path based on inclusion of a forwarding equivalence class of the sub label switched path below a label of the label switched path.

In at least some example embodiments, a method includes supporting communication of a packet on a sub label switched path of an aggregate label switched path based on inclusion of a forwarding equivalence class of the sub label switched path below a label of the aggregate label switched path. In at least some example embodiments, supporting communication of the packet includes determining, by an egress router of the aggregate label switched path based on the forwarding equivalence class of the sub label switched path, a next label switched path for the packet. In at least some example embodiments, the method includes preventing signaling, by an egress router of the aggregate label switched path, signaling of an association of the sub label switched path to the aggregate label switched path. In at least some example embodiments, the method includes forming, by an ingress router of the aggregate label switched path, an association of the sub label switched path to the aggregate label switched path. In at least some example embodiments, the association of the sub label switched path to the aggregate label switched path is based on the forwarding equivalence class of the sub label switched path being a subset of a forwarding equivalence class of the aggregate label switched path. In at least some example embodiments, the association of the sub label switched path to the aggregate label switched path is based on a policy at the ingress router. In at least some example embodiments, the sub label switched path is based on a first version of Internet Protocol (IP) and the aggregate label switched path is based on a second version of IP, and the policy at the ingress router is configured to associate a first IP prefix of the first version of IP with a second IP prefix of the second version of IP. In at least some example embodiments, a forwarding equivalence class type of the sub label switched path and a forwarding equivalence class type of the aggregate label switched path are the same. In at least some example embodiments, the forwarding equivalence class type of the sub label switched path and the forwarding equivalence class type of the aggregate label switched path are a prefix forwarding equivalence class type. In at least some example embodiments, the forwarding equivalence class of the sub label switched path is a subset of the forwarding equivalence class of the aggregate label switched path. In at least some example embodiments, the prefix forwarding equivalence class type is an Internet Protocol version 4 (IPv4) prefix or an Internet Protocol version 6 (IPv6) prefix. In at least some example embodiments, the sub label switched path is a single segment pseudowire and the forwarding equivalence class of the sub label switched path is a numeric PWid based forwarding equivalence class type, and the aggregate label switched path is a single-segment pseudowire and the forwarding equivalence class of the aggregate label switched path is a PWid based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a PWid forwarding equivalence class type. In at least some example embodiments, a forwarding equivalence class type of the sub label switched path and a forwarding equivalence class type of the aggregate label switched path are different. In at least some example embodiments, the sub label switched path is a single segment pseudowire and the forwarding equivalence class of the sub label switched path is a PWid based forwarding equivalence class type, and the aggregate label switched path is a multi-segment pseudowire and the forwarding equivalence class of the aggregate label switched path is an {SAII, TAII} based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a single-segment pseudowire forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a multi-segment pseudowire forwarding equivalence class type. In at least some example embodiments, the sub label switched path and the aggregate label switched path have a common egress router. In at least some example embodiments, an egress router of the aggregate label switched path is a border router of a routing domain, and a forwarding equivalence class type of the aggregate label switched path is a prefix forwarding equivalence class type. In at least some example embodiments, the routing domain is an Interior Gateway Protocol (IGP) area or an Autonomous System (AS). In at least some example embodiments, the prefix forwarding equivalence class type is a prefix forwarding equivalence class that encodes an Internet Protocol (IP) route prefix summarized by the border router of the routing domain. In at least some example embodiments, an egress router of the aggregate label switched path is a provider edge router, and a forwarding equivalence class type of the aggregate label switched path is a single segment pseudowire forwarding equivalence class type. In at least some example embodiments, an egress router of the aggregate label switched path is a terminating provider edge router, and a forwarding equivalence class type of the aggregate label switched path is a multi-segment pseudowire forwarding equivalence class type. In at least some example embodiments, the method includes verifying, by an ingress router, a validity of the sub label switched path at an egress router of the aggregate label switched path. In at least some example embodiments, the validity of the sub label switched path at the egress router of the aggregate label switched path is verified based on sending of at least one connectivity message from the ingress router to the egress router of the aggregate label switched path. In at least some example embodiments, the method includes signaling, by an egress router of the aggregate label switched path, an indication of a set of valid sub label switched paths of the aggregate label switched path. In at least some example embodiments, signaling the indication of the set of valid sub label switched paths of the aggregate label switched path includes including, by the egress router of the aggregate label switched path within a label mapping message of the aggregate label switched path, a bit string including a set of bit positions associated with a respective set of sub label switched paths of the aggregate label switched path. In at least some example embodiments, the forwarding equivalence class of the sub label switched path is a numeric PWid forwarding equivalence class type and a forwarding equivalence class type of the aggregate label switched path is a single segment pseudowire forwarding equivalence class type, and the bit position of the sub label switched path in the bit string is a PWid of the sub label switched path. In at least some example embodiments, the forwarding equivalence class of the sub label switched path is a numeric PWid forwarding equivalence class type and a forwarding equivalence class type of the aggregate label switched path is a multi-segment pseudowire forwarding equivalence class type, and the bit position of the sub label switched path in the bit string is a PWid of the sub label switched path. In at least some example embodiments, the forwarding equivalence class of the sub label switched path is an Internet Protocol (IP) host address within a prefix forwarding equivalence class of the aggregate label switched path, and the bit position of the sub label switched path in the bit string is an offset of the IP host address within the prefix forwarding equivalence class of the aggregate label switched path. In at least some example embodiments, a method includes supporting communication of a packet on a sub label switched path of a label switched path based on inclusion of a forwarding equivalence class of the sub label switched path below a label of the label switched path.

In at least some example embodiments, an apparatus includes means for supporting communication of a packet on a sub label switched path of an aggregate label switched path based on inclusion of a forwarding equivalence class of the sub label switched path below a label of the aggregate label switched path. In at least some example embodiments, the means for supporting communication of the packet includes means for determining, by an egress router of the aggregate label switched path based on the forwarding equivalence class of the sub label switched path, a next label switched path for the packet. In at least some example embodiments, the apparatus includes means for preventing signaling, by an egress router of the aggregate label switched path, signaling of an association of the sub label switched path to the aggregate label switched path. In at least some example embodiments, the apparatus includes means for forming, by an ingress router of the aggregate label switched path, an association of the sub label switched path to the aggregate label switched path. In at least some example embodiments, the association of the sub label switched path to the aggregate label switched path is based on the forwarding equivalence class of the sub label switched path being a subset of a forwarding equivalence class of the aggregate label switched path. In at least some example embodiments, the association of the sub label switched path to the aggregate label switched path is based on a policy at the ingress router. In at least some example embodiments, the sub label switched path is based on a first version of Internet Protocol (IP) and the aggregate label switched path is based on a second version of IP, and the policy at the ingress router is configured to associate a first IP prefix of the first version of IP with a second IP prefix of the second version of IP. In at least some example embodiments, a forwarding equivalence class type of the sub label switched path and a forwarding equivalence class type of the aggregate label switched path are the same. In at least some example embodiments, the forwarding equivalence class type of the sub label switched path and the forwarding equivalence class type of the aggregate label switched path are a prefix forwarding equivalence class type. In at least some example embodiments, the forwarding equivalence class of the sub label switched path is a subset of the forwarding equivalence class of the aggregate label switched path. In at least some example embodiments, the prefix forwarding equivalence class type is an Internet Protocol version 4 (IPv4) prefix or an Internet Protocol version 6 (IPv6) prefix. In at least some example embodiments, the sub label switched path is a single segment pseudowire and the forwarding equivalence class of the sub label switched path is a numeric PWid based forwarding equivalence class type, and the aggregate label switched path is a single-segment pseudowire and the forwarding equivalence class of the aggregate label switched path is a PWid based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a PWid forwarding equivalence class type. In at least some example embodiments, a forwarding equivalence class type of the sub label switched path and a forwarding equivalence class type of the aggregate label switched path are different. In at least some example embodiments, the sub label switched path is a single segment pseudowire and the forwarding equivalence class of the sub label switched path is a PWid based forwarding equivalence class type, and the aggregate label switched path is a multi-segment pseudowire and the forwarding equivalence class of the aggregate label switched path is an {SAII, TAII} based forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a single-segment pseudowire forwarding equivalence class type. In at least some example embodiments, the sub label switched path is a single segment pseudowire and the forwarding equivalence class of the sub label switched path is a numeric PWid based forwarding equivalence class type, and the aggregate label switched path is a multi-segment pseudowire and the forwarding equivalence class of the aggregate label switched path is a multi-segment pseudowire forwarding equivalence class type. In at least some example embodiments, the sub label switched path and the aggregate label switched path have a common egress router. In at least some example embodiments, an egress router of the aggregate label switched path is a border router of a routing domain, and a forwarding equivalence class type of the aggregate label switched path is a prefix forwarding equivalence class type. In at least some example embodiments, the routing domain is an Interior Gateway Protocol (IGP) area or an Autonomous System (AS). In at least some example embodiments, the prefix forwarding equivalence class type is a prefix forwarding equivalence class that encodes an Internet Protocol (IP) route prefix summarized by the border router of the routing domain. In at least some example embodiments, an egress router of the aggregate label switched path is a provider edge router, and a forwarding equivalence class type of the aggregate label switched path is a single segment pseudowire forwarding equivalence class type. In at least some example embodiments, an egress router of the aggre-gate label switched path is a terminating provider edge router, and a forwarding equivalence class type of the aggregate label switched path is a multi-segment pseudowire forwarding equivalence class type. In at least some example embodiments, the apparatus includes means for verifying, by an ingress router, a validity of the sub label switched path at an egress router of the aggregate label switched path. In at least some example embodiments, the validity of the sub label switched path at the egress router of the aggregate label switched path is verified based on sending of at least one connectivity message from the ingress router to the egress router of the aggregate label switched path. In at least some example embodiments, the apparatus includes means for signaling, by an egress router of the aggregate label switched path, an indication of a set of valid sub label switched paths of the aggregate label switched path. In at least some example embodiments, the means for signaling the indication of the set of valid sub label switched paths of the aggregate label switched path includes including, by the egress router of the aggregate label switched path within a label mapping message of the aggregate label switched path, a bit string including a set of bit positions associated with a respective set of sub label switched paths of the aggregate label switched path. In at least some example embodiments, the forwarding equivalence class of the sub label switched path is a numeric PWid forwarding equivalence class type and a forwarding equivalence class type of the aggregate label switched path is a single segment pseudowire forwarding equivalence class type, and the bit position of the sub label switched path in the bit string is a PWid of the sub label switched path. In at least some example embodiments, the forwarding equivalence class of the sub label switched path is a numeric PWid forwarding equivalence class type and a forwarding equivalence class type of the aggregate label switched path is a multi-segment pseudowire forwarding equivalence class type, and the bit position of the sub label switched path in the bit string is a PWid of the sub label switched path. In at least some example embodiments, the forwarding equivalence class of the sub label switched path is an Internet Protocol (IP) host address within a prefix forwarding equivalence class of the aggregate label switched path, and the bit position of the sub label switched path in the bit string is an offset of the IP host address within the prefix forwarding equivalence class of the aggregate label switched path. In at least some example embodiments, an apparatus includes means for supporting communication of a packet on a sub label switched path of a label switched path based on inclusion of a forwarding equivalence class of the sub label switched path below a label of the label switched path.

BRIEF DESCRIPTION OF THE DRAWINGS

The teachings herein can be readily understood by considering the following detailed description in conjunction with the accompanying drawings, in which:

FIGS. 2A-2D depict example embodiments of IP Routing Tables of a few selected routers of the communication system of FIG. 1;

FIGS. 3A-1, 3A-2, 3B-1, 3B-2, 3C-1, 3C-2, 3D-1, and 3D-2 depict example embodiments of ILM and FTN Tables maintained by the routers of the communication system of FIG. 1;

FIGS. 5A-1, 5A-2, 5B-1, 5B-2, 5C-1, 5C-2, 5D-1, and 5D-2 depict example embodiments of ILM and FTN Tables of a few selected routers of the communication system of FIG. 4;

FIGS. 8A-8B depict ILM Tables, FTN Tables, and PWid Tables maintained by PW endpoints of the SS-PW of FIG. 7;

FIG. 9 depicts an example embodiment of an aggregate SS-PW for illustrating scalability of LSPs using an aggregate SS-PW;

FIGS. 10A-10B depict ILM Tables, FTN Tables, and PWid Tables maintained by PW endpoints of the aggregate SS-PW of FIG. 9;

FIG. 14 depicts an example embodiment of a Prefix FEC Sub-LSP for illustrating a format of the Prefix FEC Sub-LSP;

FIG. 15 depicts an example embodiment of a PWid FEC sub-LSP for illustrating a format of the PWid FEC sub-LSP;

FIG. 16 depicts an example embodiment of a Range-in-Aggregate FEC sub-LSP for illustrating a format of the Range-in-Aggregate FEC sub-LSP;

To facilitate understanding, identical reference numerals have been used herein, wherever possible, in order to designate identical elements that are common among the various figures.

DETAILED DESCRIPTION

Figure 1:
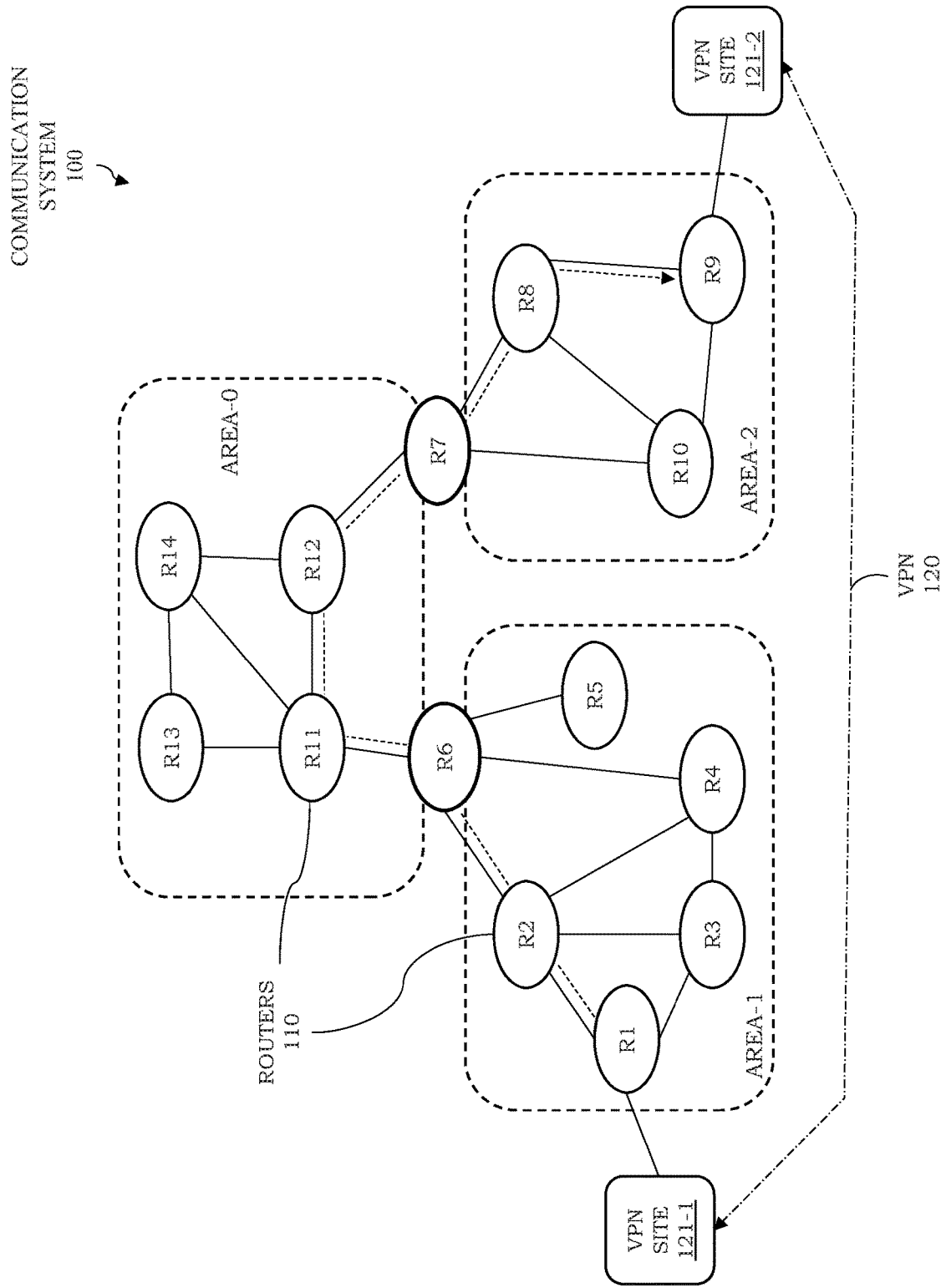
FIG. 1 depicts an example embodiment of a communication system configured to support scalability of LSPs.

Various example embodiments for supporting scalability of label switched paths (LSPs) in a label switching network are presented herein.

Various example embodiments for supporting scalability of LSPs in a label switching network may be configured to support scalability of LSPs in a Multiprotocol Label Switching (MPLS) network. In MPLS, a forwarding equivalence class (FEC) is an identifier of an LSP that describes the class of packets sent over the LSP. A Prefix FEC identifies an MPLS LSP by an IP prefix, such as IPv4 prefixes (e.g., 10.10.2.0/24, 10.10.2.7/32, or the like), IPv6 prefixes (e.g., 2001:db8:3c4d:15::/64, or the like), and so forth. Prefix FEC 10.10.2.0/24 means packets to all destinations in the range 10.10.2.1-10.10.2.254 are transported over the LSP. Prefix FEC 10.10.2.7/32 means packets to destination host 10.10.2.7 are only sent on the LSP. Typically, the path traversed by a Prefix FEC LSP is the path of its best matching IP route across the routing domains, where the path of the IP route may be determined by routing protocols such as the IGPs, BGP, or the like. Here, the "best match" may mean the IP route in the IP routing table that is the Longest Prefix Match (LPM) for the Prefix FEC. Prefix FECs are one of the classic examples of FECs that can be aggregated by a range of their values. For example, all Prefix FECs in the IPv4 address range 10.10.2.1/32-10.10.2.254/32 may be aggregated by a single Prefix FEC 10.10.2.0/24. It is noted that MPLS control protocols for distributing label mappings and setting up the Prefix FEC LSPs include Label Distribution Protocol (LDP), Border Gateway Protocol (BGP), Segment Routing (SR), and the like. In SR, Interior Gateway Protocols (IGPs)—such as Open Shortest Path First (OSPF), OSPF version 3 (OSPFv3), Intermediate-System-to-Intermediate-System (IS-IS), or the like—also may be used as control protocols for label distribution (e.g., the IGPs assign a label to each link state advertisement of an IP prefix).

Various example embodiments for supporting scalability of LSPs in an MPLS network may be configured to support scalability of LSPs of various FEC types. Various example embodiments for supporting scalability of LSPs in an MPLS network may be configured to support scalability of Prefix FEC based LSPs spanning across multiple routing domains. Here, the routing domain could be an IGP area within an autonomous system (AS), an AS, or the like. As indicated above, IGPs includes OSPF, OSPFv3, IS-IS, and the like, and an inter-AS routing protocol includes BGP. Various example embodiments for supporting scalability of LSPs may be agnostic of the MPLS control protocols used for setting up the inter-domain LSPs. Various example embodiments for supporting scalability of LSPs in an MPLS network may be configured to support scalability of LSPs for various FEC types that enable aggregation of ranges of FECs by aggregate FECs.

Various example embodiments for supporting scalability of LSPs in an MPLS network may be configured to support scalability of LSPs implemented as pseudowires (PWs). Various example embodiments for support scalability of LSPs in an MPLS network may be configured to support scalability in single-segment PWs (SS-PWs), multi-segment PWs (MS-PWs), or the like, as well as various combinations thereof.

It will be appreciated that these and various other example embodiments and advantages or potential advantages of supporting scalability of LSPs in a label switching network may be further understood by way of reference to the various figures, which are discussed further below.

FIG. 1 depicts an example embodiment of a communication system configured to support scalability of LPSs. It is noted that, for simplicity and without loss of generality, various example embodiments presented within the context of FIG. 1 include example embodiments for supporting scalability of inter-domain Prefix FEC based LSPs and, more specifically, supporting scalability of inter-area Prefix FEC based LSPs where the inter-area Prefix FEC LSPs set-up are set up by LDP an spans multiple OSPF areas. It will be appreciated that various example embodiments for supporting scalability of LSPs may be configured to support scalability of other types of LSPs, to support scalability of LSPs in other network architectures, or the like, as well as various combinations thereof.

In FIG. 1, the communication system 100 includes a set of routers 110 referred to herein as routers R1-R14, respectively) and a virtual private network (VPN) 120 established between a pair of VPN sites 121-1 and 121-2 (collectively, VPN sites 121).

In FIG. 1, the routers 110 have been separated into three OSPF areas as follows: Area 0, Area 1, and Area 2. Area 0 is the backbone area. Area 1 and Area 2 are connected by the Area 0 and are connected to Area 0 through area border routers (ABRs). It is noted that, in OSPF, two non-backbone areas are connected through a backbone area. In communication system 100, routers R1-R5 are located in Area 1, R6 is an ABR that interconnects Area 1 and Area 0, router R7 is an ABR that interconnects Area 2 and Area 0, routers R8-R10 are located in Area 2, and routers R11-R14 are located in Area 0. The routers and networks in each area are assigned the following IP subnets (IP Prefix): (a) Area 1=10.10.1.0/24, (b) Area 2=10.10.2.0/24, and (c) Area 0=10.10.3.0/24.

In FIG. 1, a host, a router, or a network within an area is allocated IP addresses from the subnet assigned to the area. An ABR may be assigned its loopback IP address from subnets of either of the adjoining areas. It is possible to allocate more than one disjoint subnet to an area; however, for simplicity of illustration, only one subnet is allocated to an area as the principles discussed herein seamlessly apply to any number of subnets. It will be appreciated that each of the areas depicted in FIG. 1 includes at least 254 hosts/routers (since an IPv4 subnet with prefix length 24 contains 254 unique addresses), but that, for simplicity, only a few of the routers (i.e., the routers R1-R14, are shown). It is noted that IP subnets are allocated to the interfaces in a router; however, for simplicity of illustration, specifics of such subnets are not described. Secondly, the subnet on an interface is allocated from an IP subnet space other than the one assigned to the area associated with the interface. A router Rx in Area 1 is assigned a loopback IPv4 address 10.10.1.x from the assigned subnet 10.10.1.0/24 (e.g., address of R1 is 10.10.1.1, address of R5 is 10.10.1.5, and so forth). A router Rx in Area 2 is assigned a loopback IPv4 address 10.10.2.x from the assigned subnet 10.10.2.0/24 (e.g., address of R7 is 10.10.2.7, address of R9 is 10.10.2.9, and so forth). A router Rx in Area 0 is assigned a loopback IPv4 address 10.10.3.x from the assigned subnet 10.10.3.0/24 (e.g., address of R12 is 10.10.3.12, address of R14 is 10.10.3.14, and so forth).

In FIG. 1, OSPF running among the routers in each area floods their assigned IP addresses and subnets of locally connected networks throughout the area as link state advertisements (LSAs). For example, router R9 will generate the router LSA 10.10.2.9/32. It is noted that router advertisements may be in the form of a prefix, so an IPv4 host address is advertised with "/32" subnet. The flooding process builds an identical link state database (LSDB) in each router in the area. The LSDB in a router is the topology graph of the area in which the router is located. In each area, every router in the area computes the shortest path to every other router by using a shortest path first (SPF) algorithm on its LSDB (e.g., using Dijkstra's algorithm). Any link failure or topology change within an area is visible to all routers in the area since the change (indicated in an associated LSA) is flooded across the entire area. Upon detecting a topology change, each router re-computes the paths by running SPF after including the topology change.

In FIG. 1, the topology details of an area are not visible to an external area. For example, the LSAs of Area 2 are not flooded by ABR R7 to Area 0 and vice versa. The key purpose of breaking down an OSPF network into multiple areas is containment of flooding and topology details within an area, which results in scalability of the OSPF domain. The ABR aggregates route prefixes learned from an area into a single "summary" LSA. Then the ABR floods the summary LSA into the other areas as if the summary LSA represents a locally connected network of ABR. For example, R7 summarizes the route prefixes learned from Area 2 into the summary LSA 10.10.2.0/24 and floods it across Area 0 indicating R7 is the originating router for the LSA. In general, whenever an ABR floods a route prefix learned from a first area to a second area, it tags itself as the originating router of the corresponding LSA. Eventually, when R6 learns the summary LSA 10.10.2.0/24 from Area 0, it floods the summary LSA to Area 1 indicating R6 is the originating router for the LSA. It is noted that R6 also aggregates other route prefixes originated in Area 0 and originates a summary LSA to Area 1. For example, R6 summarizes route prefixes originated in Area 0 into summary LSA 10.10.3.0/24 and floods summary LSA 10.10.3.0/24 to Area 1. Similarly, for example, R6 also aggregates the route prefixes learned from Area 1 into summary LSA 10.10.1.0/24 and floods summary LSA 10.10.1.0/24 to Area 0. When R7 learns the summary LSA 10.10.1.0/24 from Area 0, R7 floods the summary LSA to Area 2, with itself as the originating router. R7 also aggregates route prefixes from Area 0 to summary LSA 10.10.3.0/24 and floods to Area 2 with itself as the originating router. As a result, to all routers in an area, all LSAs learnt from external areas would be seen as directly connected network of an ABR of the area.

In FIG. 1, after computation of SPF by each router, the routing table in a router will have a route entry to every other router and network within the local area and summary route entries to reach routers in all external areas. The resultant IP Routing Tables in routers R1, R6, R7, and R9 are depicted in FIGS. 2A-2D, respectively. It is noted that each IP Routing Table has all total 254 host routes, one for each router in its affiliated area, but, for simplicity, only the host routes to the routers illustrated in FIG. 1 are shown in the routing tables. An ABR will have host routes to each router of each adjacent area. Each routing table also includes the summary routes for external areas (e.g., routing table in R1 has summary routes 10.10.2.0/24 and 10.10.3.0/24). It is noted that the route summarization by the ABRs significantly reduces the routing table size and convergence of OSPF on a topology change, by hiding out the topological details of all external areas. For example, when there is a topology change in Area 2, it does not impact the summary route 10.10.2.0/24 originated by ABR R7, so topology change does not have to be propagated beyond Area 2.

In FIG. 1, when router R1 (10.10.1.1) sends an IPv4 packet to router R9 (10.10.2.9), the packet is forwarded until reaching router R7 by matching (e.g., using LPM) the summary route entry 10.10.2.0/24 in each router along the shortest path R1→R2→R6→R11→R12→R7 of the summary route. When router R7 receives the packet, router R7 finds the exact matching route entry 10.10.2.9/32 (see FIG.

2C) for the destination of the packet and the packet is forwarded by matching the exact route entry along the path R7→R8→R9 until reaching router R9.

In FIG. 1, summarization by R7 of the individual route entries from Area 2 reduces the number of LSAs, as well as the number of routing table entries, in Area 0 and Area 1 by factor of 254. Similarly, summarization by R6 of the individual route entries from Area 1 reduces the number of LSAs, as well as the number of routing table entries, in Area 0 and Area 2 by factor of 254. For example, assuming that there are a total of 51 areas in an OSPF network and that each of the areas includes 254 routers, then, instead of 254×50=12,700 external LSAs and route entries, each area receives only 50 external summary LSAs which results in 50 corresponding prefixes in the routing tables of its routers. In other words, the external LSA and routes are reduced by factor of 254, which is quite significant. To generalize, if the N is the average number of IP addresses summarized by every area, then the number of external LSAs is reduced by a factor of N.

In FIG. 1, in order to set up an LSP to a router, the router creates a Prefix FEC for its assigned host address and allocates a label to Prefix FEC for its assigned host address. For example, R9 allocates a label L9-9 from its local label space and maps it to Prefix FEC 10.10.2.9/32. Here, the label allocated by a router Ry for the prefix FEC that is the host address of Rx is denoted as Lx-y. As an example, consider the process of set-up of the LSP for the Prefix FEC 10.10.2.9/32 alone. The same process is seamlessly applicable for LSPs to every router in the network. In FIG. 1, each router is also running the LDP control plane. The label mapping {Prefix FEC=10.10.2.9/32, L9-9} is advertised by router R9 to each of its neighbour routers (e.g., routers R8, R10, and so forth), each of the neighbor routers allocates a respective label from its respective local label space for the Prefix FEC 10.10.2.9/32 and advertises the respective label mapping to its respective neighbor routers, and so forth. In that way, the label mapping for Prefix FEC 10.10.2.9/32 is flooded across Area 2 by LDP running among the routers in Area 2. Each router determines the next-hop of the LSP as {the next-hop of its exact matching IP route 10.10.2.9/32, label advertised for the Prefix FEC by next-hop}.

In FIG. 1, the routers also maintain Incoming Label Map (ILM) and FEC to Next-Hop Label Forwarding Entry (NHLFE) (FTN) tables that maintain the states of Prefix FEC LSPs. FIGS. 3A-1, 3A-2, 3B-1, 3B-2, 3C-1, 3C-2, 3D-1, and 3D-2 depict ILM and FTN Tables at routers R1, R6, R7 and R9, respectively. More specifically, FIGS. 3A-1 and 3A-2 depict ILM and FTN Tables at router R1, respectively, FIGS. 3B-1 and 3B-2 depict ILM and FTN Tables at router R6, respectively, FIGS. 3C-1 and 3C-2 depict ILM and FTN Tables at router R7, respectively, and FIGS. 3D-1 and 3D-2 depict ILM and FTN Tables at router R9, respectively. It will be appreciated that, although FIGS. 3A-1, 3A-2, 3B-1, 3B-2, 3C-1, 3C-2, 3D-1, and 3D-2 only illustrate the states of LSPs to the routers illustrated in FIG. 1 (illustratively, routers R1-R14), state for other LSPs to other routers is programmed as well.

In FIG. 1, as discussed above, the routers maintain ILM tables. An ILM table at a router is indexed by labels advertised by the router. An ILM entry includes the forwarding state of an advertised label of an LSP in its egress router or a transit router. An ILM entry for an LSP maps to a next-hop label forwarding entry that includes the information about the next-hop and the advertised label by the next-hop for the LSP. As shown in FIG. 3D-1, router R9 programs the ILM table entry for label L9-9 with next-hop as 'local' since this is the egress router for this label allocated to Prefix FEC 10.10.2.9/32. As shown in FIG. 3C-1, router R7 programs the ILM Table entry for label L9-7 to swap to the label L9-8 advertised by the next-hop R8 for LSP 10.10.2.9/32. If router R7 receives an MPLS packet with label L9-7 then, based on its ILM entry, router R7 swaps the label with L9-8 and sends the packet to router R8.

In FIG. 1, as discussed above, the routers maintain FTN Tables. An FTN table at a router is indexed by a FEC. An FTN entry includes the forwarding state of an LSP in an ingress router. For a Prefix FEC, any router other than the egress router can be the ingress router. A FTN entry for an LSP maps to an NHLFE that includes the information about the next-hop and the advertised label by the next-hop for the LSP. For a Prefix FEC LSP, any router other than the egress router can be in ingress router so that the router can push any packet to the egress router over the LSP. As a result, the router can be both ingress as well as transit for the LSP and, in that case, programs both the ILM Table and the FTN Table for the state of the LSP with common NHLFE information. For example, for Prefix FEC 10.10.2.9/32, any router other than router R9 can be an ingress router to push packets to router R9 on the LSP. So, Prefix FEC LSPs are multipoint-to-point (MP2P) in nature. As shown in FIG. 3C-2, router R7 also programs the FTN Table entry 10.10.2.9/32 to push label L9-8 to next-hop router R8. To send a packet to router R9, router R7 pushes the label L9-8 onto the packet and sends the labelled packet to router R8. So, router R7 is both a transit router and an ingress router for Prefix FEC 10.10.2.9/32.

In FIG. 1, ABR R7 floods the label mapping for Prefix FEC 10.10.2.9/32 into Area 0. Each router in Area 0 assigns a label from its local label space for the Prefix FEC 10.10.2.9/32 and advertises the label to its neighbors. Each router in Area 0 chooses the next-hop of the LSP as {the next-hop of its best matching IP route 10.10.2.0/24, label advertised for the Prefix FEC by next-hop}. It is noted that there is no summarization of Prefix FECs by an ABR, as will be further understood based on description provided hereinbelow. Essentially, every router has an LSP to every other router across the multi-domain network, i.e., there is a full mesh of LSPs among the routers. When ABR R6 receives label mapping for Prefix FEC 10.10.2.9/32 from neighbouring routers in Area 0, it sets up the LSP and floods the label mapping into Area 1. Each router in Area 1 assigns a label from its local label space for the Prefix FEC 10.10.2.9/32 and advertises to its neighbors. Each router in Area 1 chooses the next-hop of the LSP as {the next-hop of its best matching IP route 10.10.2.0/24, label advertised for the Prefix FEC by next-hop}. FIG. 3A-2 shows the FTN Table in R1 that includes the entry for Prefix FEC 10.10.2.9/32.

In FIG. 1, to send a packet P from router R1 to router R9 on the LSP, router R1 looks up the FTN entry and, based on the FTN entry, pushes the label L9-2 and sends the MPLS packet {L9-2, P} to router R2. Router R2, upon receiving the packet, looks up the topmost label L9-2 in its ILM Table (omitted for purposes of clarity) and, based on the ILM entry, swaps the label L9-2 with the label L9-6 and sends the packet {L9-6, P} to next-hop router R6. Router R6, upon receiving the packet, looks up the topmost label L9-6 in its ILM Table (FIG. 3B-1) and, based on the ILM entry, swaps the label L9-6 with the label L9-11 and sends the packet {L9-11, P} to next-hop router R11. Router R11, upon receiving the packet, looks up the label L9-11 in its ILM Table (omitted for purposes of clarity) and, based on the ILM entry, swaps the label L9-11 with the label L9-12 and sends the packet {L9-12, P} to next-hop router R12. Router R12, upon receiving the packet, looks up the topmost label L9-12 in its ILM Table (omitted for purposes of clarity) and, based on the ILM entry, swaps the label L9-12 with the label L9-7 and sends the packet {L9-7, P} to next-hop router R7. Router R7, upon receiving the packet, looks up the topmost label L9-7 in its ILM Table (FIG. 3C-1) and, based on the ILM entry, swaps the label L9-7 with the label L9-8 and sends the packet {L9-8, P} to next-hop router R8. Router R8, upon receiving the packet, looks up the topmost label L9-8 in its ILM Table (omitted for purposes of clarity) and, based on the ILM entry, swaps the label L9-8 with the label L9-9 and sends the packet {L9-9, P} to next-hop router R9. Router R9, upon receiving the packet, looks up the topmost label L9-9 in its ILM Table (FIG. 3D-1) and, since the NHLFE in the ILM entry is programmed as local, pops the label L9-9 from the packet and further handles the packet P based on its underlying headers. In the same way, each router will have a Prefix FEC LSP to every other router across the areas.

It is noted that the procedure described above may be followed by SR for setting up inter-area LSPs. In FIG. 1, OSPF in each router also allocates a label for each LSA, wherein each LSA becomes the Prefix FEC. So, the label mapping is flooded along with LSA. To be able to set-up inter-area LSPs, OSPF in an ABR may leak label mappings for routes learned from an area to other adjoining areas. For example, in R7, OSPF would leak the label mapping of each route learned from Area 2 to Area 0.

It is noted that a similar procedure may be used to describe inter-AS LSPs by BGP. In that case, consider Area 0, Area 1, and Area 2 as ASes and each router is running BGP. Consider an ABR as an Autonomous System Border Router (ASBR). Then, BGP allocates a label for host addresses and subnetworks and advertises the label mappings to its neighboring BGP routers within the AS. To be able to set-up inter-AS LSPs, BGP in an ASBR may leak label mappings for routes learned from an AS, to other adjoining ASes. For example, in R7, BGP would leak the label mapping of each route learned from Area 2 (AS 2) to Area 0 (AS 0).

In FIG. 1, although the ABRs summarize the IP routes across areas, the Prefix FEC LSPs run flat across the areas. In the case of SR, since label mappings are flooded along with the LSAs, ABRs cannot summarize the IP routes. As a result, each router needs to maintain both control plane and dataplane states of an LSP to every router in external routing domains. In the example of FIG. 1, each router maintains states for 254 intra-area LSPs and 508 inter-area LSPs. The states for intra-area LSPs are unavoidable, but various example embodiments may be applied to support scalability of inter-area LSPs. Due to route summarization across areas, the maximum number of inter-area routes in any router in FIG. 1 is, at most, 2. Here, for purposes of clarity in further understanding scalability of LSPs, assume that an OSPF network includes 51 areas and that each area includes 254 routers. Each router needs to maintain states for 254×50=12, 700 inter-area LSPs. To generalize, if there are M routing domains and an average of N routers per domain, the number of inter-area LSPs in a router is M×N. In a given router, the state of an LSP in the router consumes label(s) from the local label space of the router, consumes FTN and ILM table entries of the router, adds to signalling overhead and memory in the control plane protocol, and so forth. The linear growth of inter-area LSPs with the number of routers across areas also impacts convergence time of LSPs in the event of changes in dependent routing paths. It is noted that one mechanism to help check the linear growth of inter-area LSPs is to make the MPLS control protocol (e.g., LDP or the lie) aware of the route summarization in ABRs. When the MPLS control protocol finds a summary route is originated by the routing protocol in the router towards an area, then it does not flood label mappings to the area for the Prefix FECs that matches the summary route; rather, the MPLS control protocol initiates a Prefix FEC encoding the summary route and floods its label mapping to the neighbors in that area. It is noted that a Prefix FEC encoding a summary router is referred to as an aggregate Prefix FEC (unless indicated otherwise herein). This is described in FIG. 4, which inherits the topology of FIG. 1, but which demonstrates inter-area aggregate LSPs using an Aggregate Prefix FEC.

Figure 4:
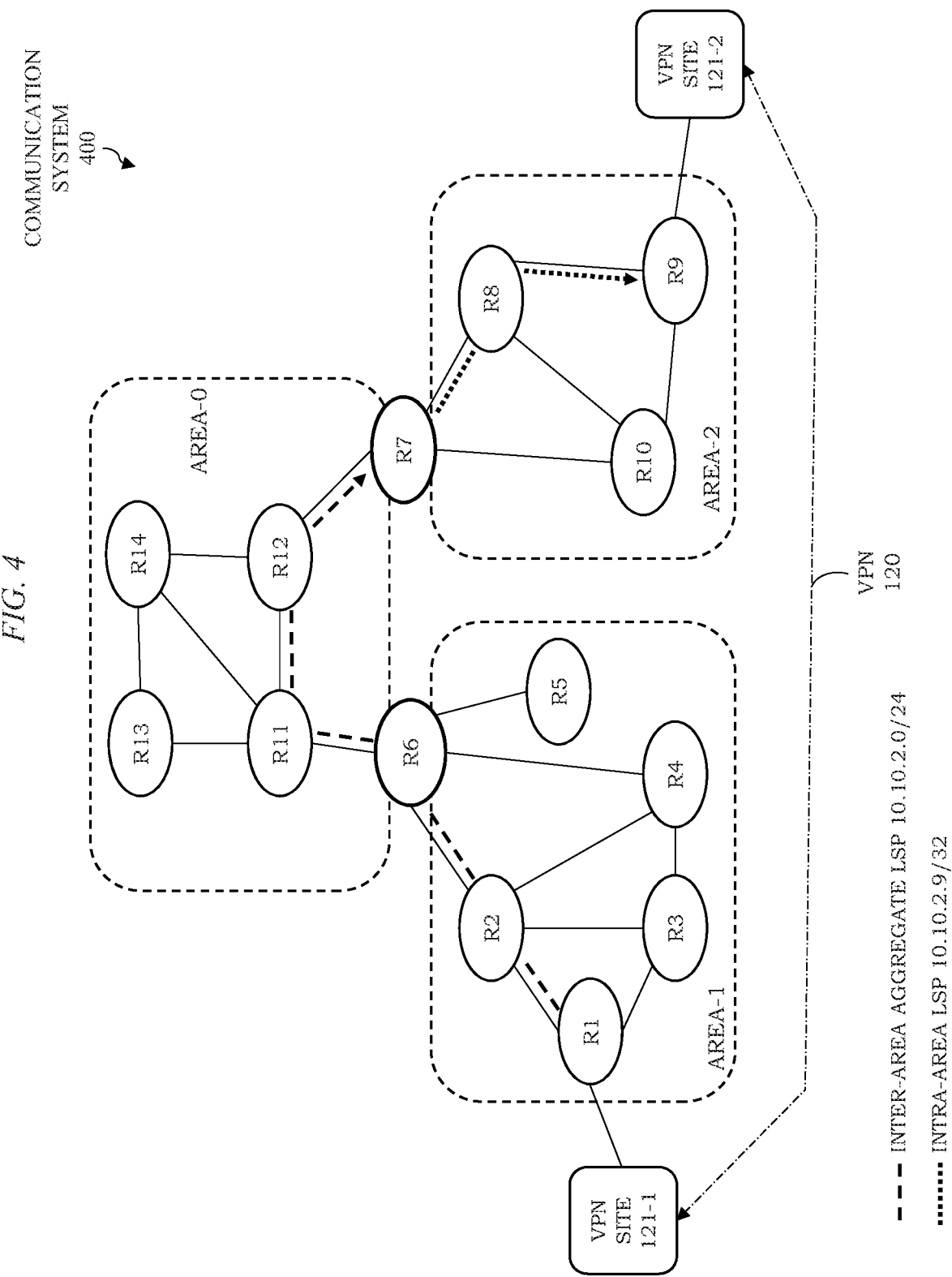
FIG. 4 depicts an example embodiment of a communication system configured to support scalability of LSPs.

FIG. 4 depicts an example embodiment of a communication system configured to support scalability of LSPs.

The communication system 400 of FIG. 4 is similar to the communication system 100 of FIG. 1, with the exception that the communication system 400 of FIG. 4 employs inter-area aggregate LSPs using an Aggregate Prefix FEC.

In FIG. 4, router R7 does not distribute the label mappings of the Prefix FECs learned from Area 2 to Area 0; rather, router R7 will originate the aggregate Prefix FEC 10.10.2.0/ 24. Following this method, each router will maintain states of Prefix FECs to each router in its area and aggregate Prefix FECs for all external areas. Here, assume that LAy-x represents the label allocated by router Rx for the aggregate Prefix FEC of area y (e.g., LA2-7 is the label allocated by R7 for the aggregate Prefix FEC 10.10.2.0/24).

In FIG. 4, the routers maintain ILM and FTN tables that maintain the states of Prefix FEC LSPs and aggregate Prefix FEC LSPs. FIGS. 5A-1, 5A-2, 5B-1, 5B-2, 5C-1, 5C-2, 5D-1, and 5D-2 depict ILM and FTN Tables at routers R1, R6, R7 and R9, respectively. The ILM and FTN Tables of FIGS. 5A-1, 5A-2, 5B-1, 5B-2, 5C-1, 5C-2, 5D-1, and 5D-2 are updated versions of the ILM and FTN Tables of FIGS. 3A-1, 3A-2, 3B-1, 3B-2, 3C-1, 3C-2, 3D-1, and 3D-2, respectively. More specifically, FIGS. 5A-1 and 5A-2 depict ILM and FTN Tables at router R1, respectively, FIGS. 5B-1 and 5B-2 depict ILM and FTN Tables at router R6, respectively, FIGS. 5C-1 and 5C-2 depict ILM and FTN Tables at router R7, respectively, and FIGS. 5D-1 and 5D-2 depict ILM and FTN Tables at router R9, respectively. It will be appreciated that, although FIGS. 5A-1, 5A-2, 5B-1, 5B-2, 5C-1, 5C-2, 5D-1, and 5D-2 only illustrate the states of LSPs to the routers illustrated in FIG. 4 (illustratively, routers R1-R14), state for other LSPs to other routers is programmed as well. The IP Route Tables in the routers remain the same as in FIGS. 2A-2D. Here, for purposes of clarity in further understanding scalability of LSPs, assume that an OSPF network includes 51 areas and that each area includes 254 routers. Without the use of aggregate Prefix FECs, each router needs to maintain states for 254×50=12,700 inter-area LSPs. To generalize, if there are M routing domains and an average of N routers per domain, the number of inter-area LSPs in a router is M×N. The use of aggregate Prefix FECs enables the number of inter-area LSPs in a router to be reduced by a factor of N, which may be quite significant.

In FIG. 4, router R1 may send an IP packet P to router R9 on the LSP. R1 looks up the "best matching LSP" to the destination 10.10.2.9 in its FTN Table and finds the LSP for aggregate Prefix FEC 10.10.2.0/24 (FIG. 5A-2). R1 pushes the label LA2-2 of the aggregate LSP to send to next-hop router R2. The resultant MPLS packet {LA2-2, P} is sent to router R2. The packet traverses the LSP along the path R1→R2→R6→R11→R12→R7. When the packet is received on the LSP by router R7, router R7 pops the label of the LSP since it is the egress router of the LSP. Since there are no more labels in the packet, the router R7 expects packet P to be an IP packet. Router R7 looks up the destination address of the IP packet (10.10.2.9) in the FTN Table to find the "best matching LSP" to the destination address. Router R7 finds the exact LSP for Prefix FEC 10.10.2.9/32. Then, the packet P is forwarded along the LSP until reaching router R9. So, router R7 is the disaggregating router that pushes the packet on the appropriate sub-LSP. It is noted that the end-to-end path could be a chain of any number of LSPs where each subsequent LSP is a "sub-LSP" of the previous LSP. Each subsequent LSP is a subset aggregate of the previous aggregate LSP. The last LSP in the chain is the LSP to the host IP address of the destination router.

Various example embodiments for supporting scalability of LSPs may be configured to support transport of packets over aggregate LSPs in various contexts, which may be further understood by first considering various aspects of using aggregate LSPs for network scaling. In general, an LSP is a general-purpose construct to send any type of packets to a destination included by its FEC.

Various example embodiments for supporting scalability of LSPs may be configured to support transport of packets over aggregate LSPs in various contexts, including contexts in which an LSP is transporting labelled packets over an MPLS hierarchy. It will be appreciated that one of the most common usages of an LSP is transporting labelled packets on the LSP, i.e., packets over an MPLS hierarchy. One example of labelled packets on an LSP is when multiple LSPs are laid upon one another, such as where the indirect next-hop of a BGP LSP is reachable by an LDP LSP, and where the next-hops of the LDP LSP are directly connected. In FIG. 1, assume that router R1 and router R9 are two indirectly connected next hops of a BGP LSP (so R1 and R9 are BGP peers), and that router R9 is reachable by the inter-area aggregate LDP LSP 10.10.2.0/24 until router R7 and then by the intra-area LDP LSP 10.10.2.9/32 until router R9. When router R1 sends the packets on the BGP LSP, it first pushes the label for the BGP LSP to the next-hop router R9 and then pushes the label of the aggregate LDP LSP 10.10.2.0/24 to the immediate next-hop router R2. The resultant packet {LA2-2, BGP LSP label, P} is sent to router R2. The packet is forwarded along the aggregate LDP LSP until router R7, which pops the label. Then, the next label is the label of the BGP LSP, which is meaningful to router R9 but not router R7. So, either the packet is forwarded by router R7 in the wrong context (if the BGP label matches a locally allocated label in R7 for another context) or the packet is dropped. Basically, the egress router of the aggregate LSP fails to push the packet on the appropriate sub-LSP since the packet does not carry any indication of the sub-LSP. Various example embodiments presented herein may be configured to overcome at least some such limitations, without having to leak the label mapping of a Prefix FEC representing the host address of a router across all routing domains, based on support for a flexible scope of the relationship between an aggregate LSP and the sub-LSPs of the aggregate LSP, as discussed further below.

Various example embodiments for supporting scalability of LSPs may be configured to support transport of packets over aggregate LSPs in various contexts, including contexts in which an LSP is transporting labelled packets on a VPN. A VPN can be of any type, such as IP-VPN, VPLS, Pseudowire (PW), Ethernet-VPNs, and the like. An IP-VPN offers remote connectivity between two VPN sites over a public network. In FIG. 1, VPN sites 121-1 and 121-2 are two remote sites of a VPN (namely, VPN 120) which are connected over a public network. VPN site 121-1 is directly connected to provider edge (PE) router R1 and VPN site 121-2 is directly connected to PE router R9. In order to setup connectivity for a VPN, a PE router allocates an MPLS label from its local label space and advertises the label against the VPN Identifier (VPN-ID) to the PE router connected to a remote site of the VPN. A VPN-ID is a FEC which uniquely identifies a VPN among the PE routers participating in the VPN. The MPLS label allocated for a VPN is denoted as a "VPN-Label" of the VPN. An ingress PE router sending a packet for the VPN to an egress PE router would encapsulate the packet with the VPN-Label advertised by the egress PE router and, on receipt of the packet, the egress PE router would uniquely associate the packet with its VPN based on the received VPN-Label. Typically, VPN-Labels are exchanged between PE routers by BGP, so in FIG. 1, router R1 and router R9 would be BGP peers for exchanging VPN-Labels. Here, for example, assume that the VPN-Labels advertised for VPN 120 by router R1 and router R9 are VL-1 and VL-9, respectively. Router R1 programs VL-1 in its ILM Table which maps to its local VPN site 121-1 of VPN 120 (FIG. 5A-1). Router R9 programs VL-9 in its ILM Table which maps to its local VPN site 121-2 of VPN 120 (FIG. 5D-1). Since the PE routers are not directly connected, a VPN-labelled packet is sent to the remote PE router over an MPLS LSP terminating at the remote PE router. Router R1, upon receiving a packet P from local VPN site 121-1 to be sent to remote VPN site 121-2, pushes the VPN-Label VL-9 assigned by router R9 for the VPN 120, pushes the label LA2-2 of the aggregate LSP 10.10.2.0/24 to the immediate next-hop router R2, and sends the resultant MPLS packet {LA2-2, VL-9, P} to router R2. The packet is forwarded along the aggregate LDP LSP until router R7, which pops the aggregate LSP label. Then, the next label is the VPN-Label, which is meaningful to router R9 but not router R7. So, either the packet is forwarded by router R7 in the wrong context (if the VPN-label matches a locally allocated label in router R7 for another context) or the packet is dropped. Basically, the egress router on the aggregate LSP fails to push the packet on the appropriate sub-LSP since the packet does not carry any indication of the sub-LSP. Various example embodiments presented herein may be configured to overcome at least some such limitations, without having to leak the label mapping of a Prefix FEC representing the host address of a router across all routing domains, based on support for a flexible scope of the relationship between an aggregate LSP and the sub-LSPs of the aggregate LSP, as discussed further below.

Various example embodiments for supporting scalability of LSPs may be configured to support scalability of LSPs based on use of aggregate LSPs. The IETF submission entitled Network Scaling with Aggregate LSPs describes a solution for setting up aggregate inter-area prefix FEC LSPs such that the egress router of the aggregate LSP can determine the appropriate sub-LSP on which a packet arrived. This solution may be further understood by way of reference to FIG. 4.

Figure 6A:
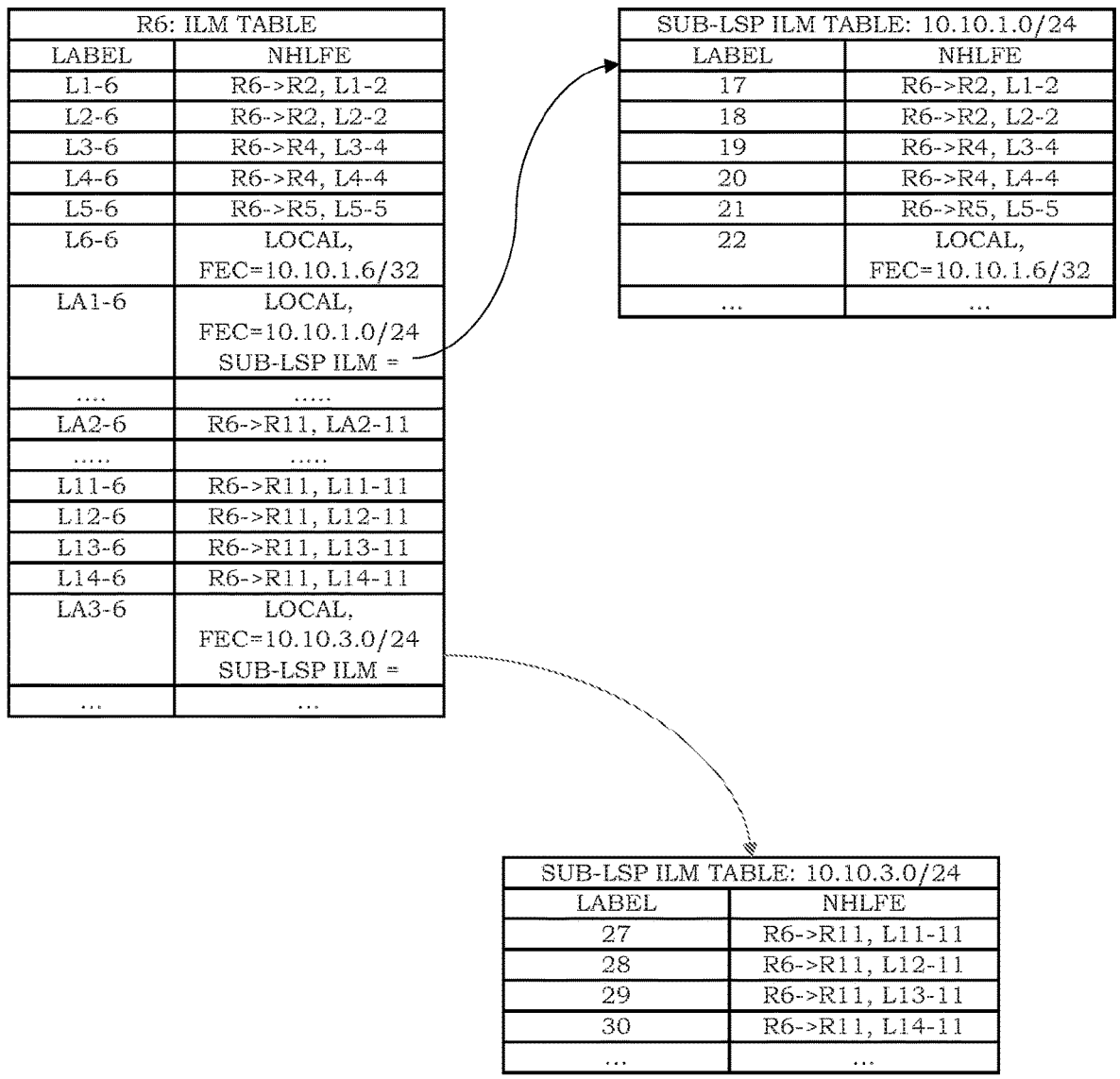
FIGS. 6A-6B depict example embodiments of ILM and FTN Tables, including sub-LSP ILM Tables, of a few selected routers of the communication system of FIG. 4.
Figure 6B:
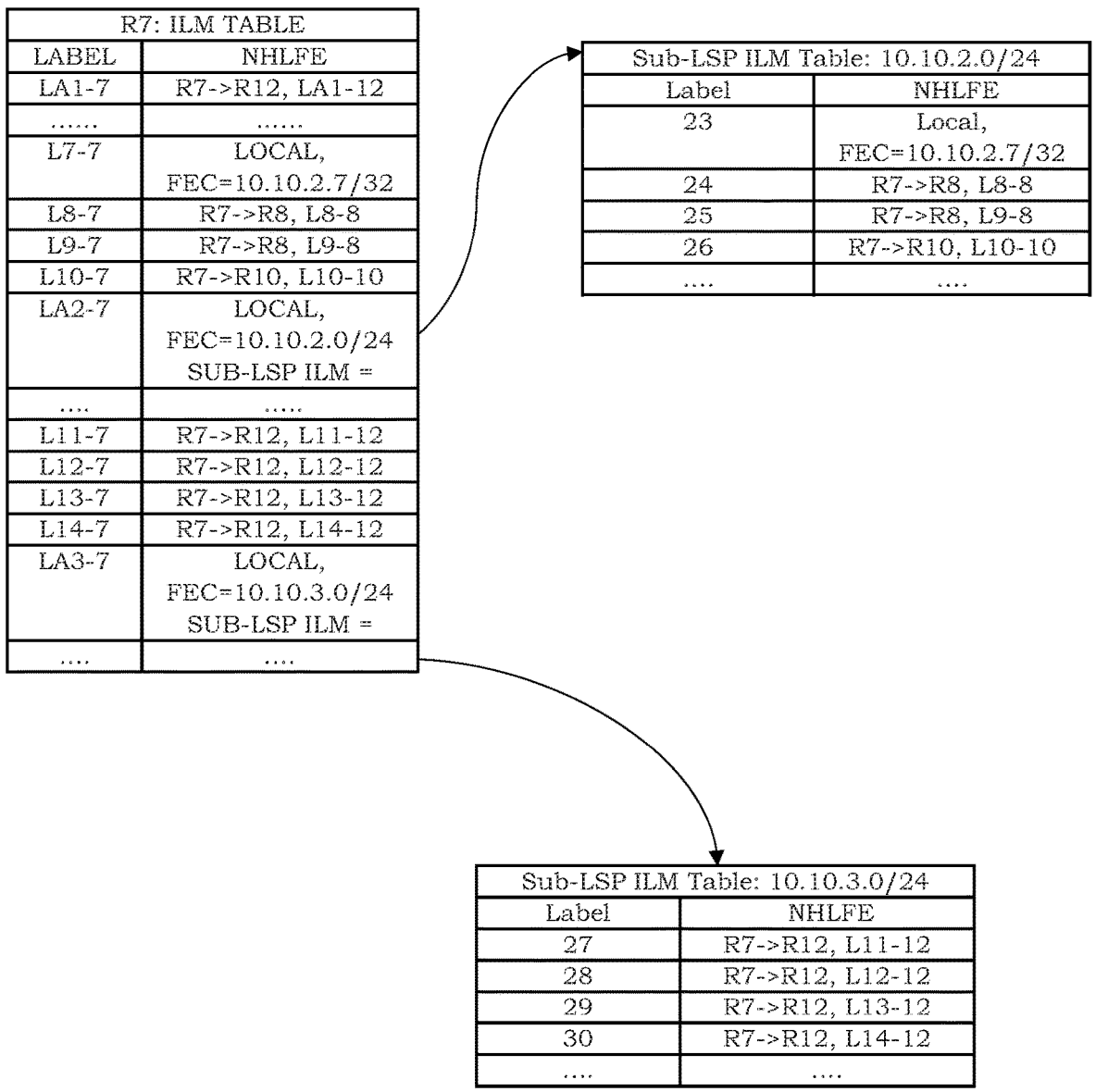

In FIG. 4, based on use of the submission entitled Network Scaling with Aggregate LSPs, the communication system may be configured as follows. LDP may be used as the MPLS control plane for setting up inter-area aggregate LSPs. The egress router of an aggregate LSP allocates a label to each sub-LSP within the aggregate LSP. Each sub-LSP is a host address, such as 10.10.2.9/32. The sub-LSP is not a subset prefix, such as 10.10.2.32/28, within Aggregate Prefix FEC 10.10.2.0/24. However, the label of the sub-LSP is not allocated from traditional MPLS label spaces; rather the value of the label is algorithmically derived from the host address of the sub-LSP as follows. The network mask of the FEC of the aggregate LSP is inverted and applied to mask off the high-order bits of the address. For example, for sub-LSP 10.10.2.9/32 in aggregate LSP 10.10.2.0/24, this operation will zero out the higher order 24 bits in 10.10.2.9, which results in 0.0.0.9. The remaining bits are treated as an integer, to which 16 is added. So, in case of sub-LSP 10.10.2.9/32, the value becomes 25 (=9+16). This value represented as a 20-bit integer becomes the label value. The value 16 is added in the algorithm in order to bypass the reserved label range (label 0 to label 15). In other words, the label value is offset of the host address within the Aggregate Prefix FEC plus 16. Applying this concept, sub-LSPs 10.10.2.1-10.10.10.2.254 are assigned labels 17-270, respectively. The labels are programmed in a sub-LSP ILM Table which is specific to the context of an Aggregate Prefix FEC LSP, because the algorithmically derived labels are unique within the context of the Aggregate Prefix FEC LSP. So, ABR R7 will have a sub-LSP ILM table specific to Aggregate Prefix FEC LSP 10.10.2.0/24. The labels 17-270 are programmed into that sub-LSP ILM table with the next-hop label forwarding information of corresponding sub-LSPs. The algorithmically derived labels of sub-LSPs are not advertised by the egress router of the aggregate LSP; rather, the label mapping for the Aggregate Prefix FEC is advertised. This means that, if an ingress router needs to send a packet on a sub-LSP over an Aggregate LSP, the ingress router pushes the algorithmically derived label of the sub-LSP before pushing the aggregate LSP label. It is noted that the Aggregate Prefix FEC in the context of LDP label advertisement is not a regular Prefix FEC in LDP, but a new type of FEC introduced by the IETF submission entitled Network Scaling with Aggregate LSPs. The encoding is same as a regular Prefix FEC, but the new Aggregate Prefix FEC indicates to a recipient of the label mapping that any packet sent on its label must bear the algorithmically derived sub-LSP label. Similarly, in FIG. 4, each of the ABRs allocates labels for sub-LSPs of each Aggregate Prefix FEC that it originates and programs those labels into the ILM Table specific to the Aggregate Prefix FEC LSP. FIGS. 6A and 6B depict updated versions of the ILM Tables of ABR R6 (updated version of the ILM Table from FIG. 5B-1) and ABR R7 (updated version of the ILM Table from FIG. 5C-1), respectively, including the sub-LSP ILM Tables for the aggregate Prefix FECs originated by ABR R6 and ABR R7, respectively. More specifically, FIG. 6A is updated version of the ILM Table in ABR R6 (from FIG. 5B-1) that now includes the sub-LSP ILM Tables for the aggregate Prefix FECs originated by router R6 and FIG. 6B is the updated version of the ILM Table in ABR R7 (from FIG. 5C-1) that now includes the sub-LSP ILM Tables for the aggregate Prefix FECs originated by R7. It is noted that the remaining forwarding tables are same as in FIGS. 5A-1, 5A-2, 5B-1, 5B-2, 5C-1, 5C-2, 5D-1, and 5D-2. It is further noted that, in a sub-LSP ILM Table, entries for only the routers highlighted in FIG. 4 are depicted, even though entries for all sub-LSPs within the Aggregate Prefix FEC LSP are programmed.

In FIG. 4, based on use of the submission entitled Network Scaling with Aggregate LSPs, the communication system may be configured to support routing of packets as follows. For example, consider the example of router R1 sending a packet P in VPN 100 to router R9 (10.10.2.9) over the aggregate LSP. Router R1 first pushes the VPN-Label VL-9 assigned by R9 for VPN 100. Router R1 then looks up the "best matching LSP" to the destination 10.10.2.9 in its FTN Table and finds the Aggregate LSP for Prefix FEC 10.10.2.0/24. So, router R1 pushes algorithmically derived sub-LSP label 25 before pushing the Aggregate LSP label LA-2 onto the packet. The resultant MPLS packet {LA-2, 25, VL-9, P} is sent to next-hop of the aggregate LSP, i.e., router R2. The packet traverses the aggregate LSP along the path R1→R2→R6→R11→R12→R7, wherein each router in the path switches the aggregate LSP label. When the packet is received by router R7 on the aggregate LSP, router R7 pops the label of the aggregate LSP since it is the egress router of the LSP. Then, in the remaining packet {25, VL-9, P}, router R7 expects the topmost label to be the sub-LSP label. So, router R7 looks up the label in the sub-LSP ILM Table attached to aggregate LSP 10.10.2.0/24. Router R7, based on the sub-LSP ILM entry, swaps the label 25 with label L9-8 (see FIG. 20C-1) and the resultant packet {L9-8, VL-9, P} is sent to the next-hop of the LSP, i.e., router R8. The packet is forwarded along the LSP until reaching router R9. Router R9, upon receiving the packet, it pops the LSP label since it is the egress router of the LSP. In the resultant packet {VL-9, P}, router R9 finds the next label VL-9, which maps to VPN-100. So, router R9 pops the label and forwards the packet to VPN site 100-2.

While various aspects of the submission entitled Network Scaling with Aggregate LSPs may support various features, it will be appreciated that various aspects of the submission entitled Network Scaling with Aggregate LSPs may have various limitations or potential limitations which, as discussed further below, may be addressed by various example embodiments presented herein. For example, one aspect which may be addressed by various example embodiments presented herein may be that the submission entitled Network Scaling with Aggregate LSPs is applicable to only IPv4-based Prefix FECs and, further that the applicability in IPv4 also is limited (e.g., limitations are imposed by the 20-bit sub-LSP label value which limits the maximum offset of the host address in the aggregate Prefix FEC to $2^{20}-16$ and which means that the concept does not work when prefix length of the Aggregate FEC Prefix is less than 12-bits (=32-20), and for a 128-bit IPv6 Prefix FEC the inability to support prefix lengths less than 108-bits (=128-20) makes the concept inapplicable). For example, one aspect which may be addressed by various example embodiments presented herein may be that the submission entitled Network Scaling with Aggregate LSPs may not be applied to other FEC types, where a FEC may represent aggregation of a set of sub-LSPs. For example, one aspect which may be addressed by various example embodiments presented herein may be that the submission entitled Network Scaling with Aggregate LSPs may require the FEC of a sub-LSP must be a host IP address and not a subnet (e.g., sub-LSP 10.10.2.32/28 within aggregate LSP 10.10.2.0/24). For example, one aspect which may be addressed by various example embodiments presented herein may be that the submission entitled Network Scaling with Aggregate LSPs may only be applicable to LDP-signalled Prefix FECs. For example, one aspect which may be addressed by various example embodiments presented herein may be that the submission entitled Network Scaling with Aggregate LSPs may require modification to the LDP control plane (e.g., a new FEC type as the Aggregate Prefix FEC). It will be appreciated that various other limitations or potential limitations of the submission entitled Network Scaling with Aggregate LSPs may be addressed by various example embodiments presented herein.

Various example embodiments for supporting scalability of LSPs are configured to support various example embodiments for building aggregate LSPs for transporting any type of packets in the context of its sub-LSPs. It is noted that various example embodiments may be agnostic of the FEC types of the aggregate LSPs, as well as the control plane used to set-up the aggregate LSPs. It is noted that various example embodiments may be generic enough to be applicable to any "aggregable" FEC types in any aggregation scenario, such as where the egress router of an aggregate LSP does not have to be a border router in a multi-domain routing network.

Various example embodiments may be configured to support scalability of LSPs based on various techniques which may be applied in the MPLS data plane. In at least some example embodiments, for example, the FEC that identifies a sub-LSP to be traversed by a packet is directly encoded into the packet below the aggregate LSP label. Here, "below" means farthest from the outermost header of the packet. To indicate that the FEC of the sub-LSP is encoded below the aggregate LSP label, a Sub-LSP Label Indicator (SLI) may be inserted immediately below the aggregate LSP label and above the sub-LSP label. Various example embodiments may be configured to utilize such mechanisms at ingress routers when the ingress routers send packets over sub-LSPs and at egress routers when the egress routers receive packets over sub-LSPs.

Various example embodiments may be configured to support scalability of LSPs based on various techniques which may be applied in the MPLS data plane for supporting sending of packets over sub-LSPs. When an ingress router sends a packet P on a sub-LSP over an aggregate LSP, the ingress router first pushes the encoding of the FEC of the sub-LSP to be traversed by the packet, and then pushes the SLI and label of the aggregate LSP. So, the MPLS packet {Aggregate LSP Label, SLI, sub-LSP FEC, P} is forwarded to the next-hop of the aggregate LSP. It is noted that the FEC type of the sub-LSP does not have to be same as the FEC type associated with the aggregate LSP, as long as the egress router of the aggregate LSP has the forwarding states for the sub-LSP (e.g., as long as the egress router of the aggregate LSP has ingress state of an exact matching LSP or has ingress state of another aggregate LSP that "best matches" the sub-LSP). This flexibility broadens the scope of relationship between an aggregate LSP and the sub-LSPs of the aggregate LSP. For example, the FEC of the sub-LSP can be an IPv4 Prefix FEC whereas the FEC of the aggregate LSP is an IPv6 FEC, or vice-versa, as long as some rule can bind the sub-LSP to the aggregate LSP. It is noted that similar flexibility also may be achieved with various types of PWs, such as SS-PWs, MS-PWs, or the like, as well as various combinations thereof.

Various example embodiments may be configured to support scalability of LSPs based on various techniques which may be applied in the MPLS data plane for supporting sending of packets over sub-LSPs. When a packet is received by an egress router of the aggregate LSP, the egress router of the aggregate LSP pops the aggregate LSP label. The egress router of the aggregate LSP, upon finding that the next label is an SLI, pops the SLI and then parses the FEC of the sub-LSP encoded at the top of the packet. The egress router of the aggregate LSP then looks up a forwarding state for the sub-LSP, either the exact matching LSP or another aggregate LSP that best matches the sub-LSP FEC. If the packet is pushed onto the exact matching LSP, then the FEC of the sub-LSP encoded at the top of the packet is popped before pushing the label of the LSP. If the packet is pushed onto another aggregate LSP then the SLI is pushed onto the packet before pushing the label of the aggregate LSP which results in the MPLS packet {New Aggregate LSP's Label, SLI, sub-LSP FEC, P}. Then, the MPLS packet {label of New Aggregate LSP, SLI, sub-LSP FEC, P} is forwarded along the new LSP. It is noted that, if the FEC of the sub-LSP is subsumed by the FEC of the aggregate LSP, then the sub-LSP may be encoded in the packet by its offset and range within the FEC of the aggregate LSP, which provides compact encoding of the sub-LSP in the packet.

Various example embodiments for supporting scalability of LSPs may be configured to support visibility by ingress routers of the set of sub-LSPs active within an aggregate LSP at an egress router of the sub-LSP. Generally, due to aggregation of FECs by the egress router of an aggregate LSP, an ingress router no longer has the visibility as to whether a sub-LSP on which the ingress router sends a packet actually exists at the egress router of the aggregate LSP. In such cases, an ingress router may use various OAM or continuity check messages on the sub-LSP to verify the connectivity of the sub-LSP to the egress router of the sub-LSP before using the sub-LSP for sending data packets. In certain aggregable FEC types or as demanded by applications that sends packets on its sub-LSP, there may be situations in which it may be necessary or desirable for the ingress router to have a predetermined state that a sub-LSP exists at the egress router of an aggregate LSP. Various example embodiments for supporting scalability of LSPs, as indicated above, may be configured to support visibility by ingress routers of the set of sub-LSPs active within an aggregate LSP at an egress router of the sub-LSP. Various example embodiments are configured to enable any MPLS control protocol to support indication, by the egress router of an aggregate LSP, the exact set of sub-LSPs active within the aggregate LSP at the egress router. For example, when a router originates the label mapping of an aggregate FEC, the originating router also includes in the label mapping a bit string, wherein a bit position in the bit string indicates an index (or offset) of an active sub-LSP within the aggregate LSP. It will be appreciated that various schemes may be used for advertising bit strings encoding the set of active sub-LSPs of an aggregate LSP. It will be appreciated that different schemes may be applied for advertising bit strings encoding the set of active sub-LSPs of an aggregate LSP based on the numbers of sub-LSPs within the aggregate LSPs.

In at least some example embodiments, when the number of sub-LSPs within an aggregate LSP is relatively large, then the following scheme may be applied to efficiently advertise bit string including indications of the active sub-LSPs of an aggregate LSP. The indices of sub-LSPs are separated into blocks of 256 (although it will be appreciated that other block sizes may be used). Each block is assigned unique identifiers in their ascending orders in the entire range of indices. For example, sub-LSPs with index range 1-256 are in block 1, sub-LSPs with index range 257-512 are in block 2, and so forth. A label mapping message of an aggregate FEC includes one or more blocks, where each block is encoded as {block identifier, bit string}. For example, bit position 30 in block identifier 10 means the FEC of the sub-LSP at the index ((10×256)+30)=2590 in the aggregate LSP. If the label mapping message cannot accommodate all the blocks for the entire range of the sub-LSPs, then the blocks may be sent in multiple label mapping messages, where each label mapping message carries the same aggregate FEC and label, but a disjoint set of blocks. During the lifetime of an aggregate LSP, if the set of active sub-LSPs changes, then the change is reflected by egress router of the aggregate LSP by resending the label mapping (e.g., a full label mapping including the changed blocks or a label mapping with the changed blocks only). An ingress router, based on the bit string, is able to determine whether or not a given sub-LSP is active within the aggregate LSP.

It will be appreciated that the foregoing scheme to advertise bit strings including indications of the active sub-LSPs of an aggregate LSP is merely one type of scheme which may be used and, thus, that various other schemes may be applied to advertise bit strings including indications of the active sub-LSPs of an aggregate LSP and, in many instances, to efficiently advertise bit strings including indications of the active sub-LSPs of an aggregate LSP It will be appreciated that, in at least some example embodiments, MPLS control protocols may be enhanced for inclusion of bit string blocks in their label mapping messages for supporting advertising of bit string including indications of the active sub-LSPs of an aggregate LSP.

Various example embodiments may be configured to support scalability of LSPs while overcoming various limitations or potential limitations generally associated with use of aggregate LSPs.

For example, various example embodiments for supporting scalability of LSPs may be configured to enable any Prefix FEC value to be encoded as the sub-LSP (e.g., since the FEC of sub-LSP is encoded into the packet, the identification of the sub-LSP is explicit and any IPv4 or IPv6 Prefix FEC value can be encoded as the sub-LSP). In other words, the concept is not limited to only being applicable to IPv4-based Prefix FECs and also may be used for IPv6-based Prefix FECs. For example, the applicability in IPv4 is not limited by the 20-bit sub-LSP label value as in the submission entitled Network Scaling with Aggregate LSPs, which limits the maximum offset of the host address in the aggregate Prefix FEC to 2^20−16 and, thus, limits the prefix length of the Aggregate FEC Prefix to being greater than or equal to 12-bits (=32-20). For example, the applicability for IPv6 is not limited due to an inability to support prefix lengths less than 108-bits (=128-20) (e.g., where a 128-bit IPv6 Prefix FEC is used).

For example, various example embodiments for supporting scalability of LSPs may be configured to enable any FEC type to be used (e.g., there is applicability to any FEC type since the FEC of the sub-LSP is encoded into the packet) and also may offer the flexibility that the FEC of the sub-LSP can be different from the FEC of the aggregate LSP. In other words, various FEC types may be used to represent the aggregation, or association, of a set of sub-LSPs.

For example, various example embodiments for supporting scalability of LSPs may be configured to enable the FEC of a sub-LSP to be a host address or a subnet (e.g., sub-LSP 10.10.2.32/28 within aggregate LSP 10.10.2.0/24). It will be appreciated that this may be enabled by the encoding of the Prefix FEC of the sub-LSP into the packets. In other words, the FEC of the sub-LSP is not limited to being a host IP address and, alternatively, may be a subnet.

For example, various example embodiments for supporting scalability of LSPs may be configured to support scalability of LSPs while remaining agnostic of control plane types. In other words, various example embodiments for supporting scalability of LSPs are not limited to LDP-signalled Prefix FECs and may be supported using various other control plane types.

For example, various example embodiments for supporting scalability of LSPs may be configured to support scalability of LSPs while obviating a need for mandatory modifications to the LDP control plane (e.g., obviating the need for a new FEC type as the aggregate Prefix FEC), although it will be appreciated that such modifications may be used under various conditions (e.g., when requested or demanded by applications, as needed or desired, or the like, as well as various combinations thereof).

For example, various example embodiments for supporting scalability of LSPs may be configured to support various generic solutions for aggregate MPLS LSPs, agnostic of the FEC Type and the MPLS control protocol, in a manner configured to support scalability of inter-domain Prefix FEC LSPs and, thus, which reduces or eliminates limits on the size of multi-domain networks (e.g., in terms of the number of routers).

Various example embodiments may be configured to support scalability of LSPs while overcoming various other limitations or potential limitations generally associated with use of aggregate LSPs.

Various example embodiments for supporting scalability of LSPs may be further understood by way of reference to FIG. 4.

In FIG. 4, the ABRs advertise the aggregate Prefix FECs to facilitate inter-area LSPs. For example, ABR R7 aggregates the Prefix FECs from Area 2 and advertises the aggregate Prefix FEC 10.10.2.0/24 to Area 0. The aggregate Prefix FEC 10.10.2.0/24 in turned is advertised to Area 1 by ABR R6. The forwarding states in the routers are reused (e.g., as in FIGS. 5A-1, 5A-2, 5B-1, 5B-2, 5C-1, 5C-2, 5D-1, and 5D-2) such that modifications to the forwarding states in the routers (e.g., as in FIGS. 6A-6D) are not needed in order to support scalability of LSPs.

In FIG. 4, consider an example in which the router R1 intends to send a packet P to router R9. It is noted that packet P could be a VPN-labelled packet for VPN-100 assigned by router R9.

In this example, router R1 looks for the LSP to 10.10.2.9/32 in its FTN Table (FIG. 5A-2) and finds the aggregate LSP 10.10.2.0/24 as the best matching LSP. So, router R1 encodes the FEC of the intended LSP as the sub-LSP (i.e., 10.10.2.9/32) and pushes the FEC of the intended LSP onto the packet. Router R1 pushes the SLI onto the packet to indicate the presence of the FEC of the sub-LSP. Then, router R1, based on the FTN entry of aggregate LSP 10.10.2.0/24, pushes the label LA2-2 to next-hop router R2 onto the packet. The resultant MPLS packet {LA2-2, SLI, sub-LSP FEC=10.10.2.9/32, P} is sent to router R2.

In this example, router R2, upon receiving the packet {LA2-2, SLI, sub-LSP FEC=10.10.2.9/32, P}, looks up the label LA2-2 in its ILM Table (omitted for purposes of clarity), swaps the label LA2-2 with the label LA2-6, and sends the packet {LA2-6, SLI, sub-LSP FEC=10.10.2.9/32, P} to router R6. Router R6, upon receiving the packet {LA2-6, SLI, sub-LSP FEC=10.10.2.9/32, P}, looks up the label LA2-6 in its ILM Table (FIG. 5B-1), swaps the label LA2-6 with the label LA2-11, and sends the packet {LA2-11, SLI, sub-LSP FEC=10.10.2.9/32, P} to the next-hop router R11. Router R11, on receiving the packet {LA2-11, SLI, sub-LSP FEC=10.10.2.9/32, P}, looks up the label LA2-11 in its ILM Table (omitted for purposes of clarity), swaps the label LA2-11 with the label LA2-12, and sends the packet {LA2-12, SLI, sub-LSP FEC=10.10.2.9/32, P} to the router R12. Router R12, on receiving the packet {LA2-12, SLI, sub-LSP FEC=10.10.2.9/32, P}, looks up the label LA2-12 in its ILM Table (omitted for purposes of clarity), swaps the label LA2-12 with the label LA2-7, and sends the packet {LA2-7, SLI, sub-LSP FEC=10.10.2.9/32, P} to router R7.

In this example, router R7, upon receiving the packet {LA2-7, SLI, sub-LSP FEC=10.10.2.9/32, P}, looks up the label LA2-7 in its ILM Table (FIG. 5C-1), which is programmed with indication that this is the egress router for the label. So, router R7 pops the label LA2-7 and finds the SLI underneath. So, R7 pops the SLI and then parses the sub-LSP FEC 10.10.2.9/32. Router R7 looks up its FTN Table (FIG. 5C-2) for the LSP 10.10.2.9/32 and finds the exact matching LSP. So, router R7 pops the sub-LSP FEC from the packet and, based on the FTN entry of the LSP, pushes the label L9-8 onto the packet. The resultant packet {L9-8, P} is sent to the next-hop router R8.

In this example, router R8, upon receiving the packet {L9-8, P}, looks up the label L9-8 in its ILM Table (omitted for purposes of clarity), swaps the label L9-8 with the label L9-9, and sends the packet {L9-9, P} to the router R9. Router R9, upon receiving the packet {L9-9, P}, looks up the label L9-9 in its ILM Table (FIG. 5D-1). Router R9, since the NHLFE in the ILM entry is programmed as local, pops the label L9-9 from the packet and further handles the packet P based on its underlying headers (e.g., a VPN label or the like).

It is noted that, if the FEC of sub-LSP is subsumed by the FEC of the aggregate LSP, then the FEC of the sub-LSP may be efficiently encoded into the packet as the offset and range of the sub-LSP FEC in the aggregate LSP. For example, sub-LSP 10.10.2.9/32 is at the offset 9 in the aggregate LSP 10.10.2.0/24 and its range is 1 (since there is only one host address). This approach offers a compact encoding of the FEC of a sub-LSP in the packet. Following this approach, in the example of FIG. 4, router R1 would send the MPLS packet as {LA2-2, SLI, sub-LSP FEC={offset=9, range=1}, P}. The egress router R7 of the aggregate LSP receives the packet as {LA2-7, SLI, sub-LSP FEC={offset=9, range=1}, P} and pops the label LA2-7 since this is egress router for the label. The egress router R7, after popping the SLI, finds the sub-LSP FEC as the {offset=9, range=1} to the FEC associated with label LA2-7, which is 10.10.2.0/24. The egress router R7 computes the sub-LSP FEC as (10.10.2.0+9)/32=10.10.2.9/32. The prefix length is /32 since the range is 1.

It is noted that, in certain applications, the ingress router, before sending a packet on a sub-LSP over an aggregate LSP, may want to ensure that the sub-LSP exists at the egress router of the aggregate LSP. First, the ingress router may want to ensure that the sub-LSP exists at the egress router of the aggregate LSP, because the ingress router may not have direct visibility as to whether the sub-LSP actually exists. Secondly, the ingress router may want to ensure that the sub-LSP exists at the egress router of the aggregate LSP, because the egress router of aggregate LSP may have "holes" within the aggregate LSP (e.g., meaning that one or more sub-LSPs may not be active). For example, in the example of FIG. 4, the router R7 may be configured to originate summary route 10.10.2.0/24 from Area 2 to Area 0, irrespective of whether or not each of the host addresses (routers) within the summary route are reachable. This is required to avoid instability of the summary route by the outages within Area 2, which makes a subset of routers unreachable. It will be appreciated that various mechanisms may be used to enable the ingress router to ensure that the sub-LSP exists at the egress router of the aggregate LSP.

In at least some example embodiments, when the FECs of the sub-LSP are not subsumed by the FEC of the aggregate LSP, various mechanisms may be used to enable the ingress router to ensure that the sub-LSP exists at the egress router of the aggregate LSP. For example, the ingress router may send Operations, Administration, and Maintenance (OAM) packets, such as LSP Ping packets or other suitable OAM packets, on the sub-LSP over the aggregate LSP for testing the end-to-end connectivity. Here, the OAM packet may be forwarded in the same way as packet P described before (with the packet P being substituted with the LSP Ping packet or other OAM packet) and an LSP Trace functionality may be used to trace all the routers traversed by the packet. Each router along the end-to-end path evaluates the LSP Trace packet and sends a response to the ingress router. For example, example, the ingress router may periodically send Bidirectional Forwarding Detection (BFD) packets on the sub-LSP over the aggregate LSP. Here, the BFD packet may be forwarded in the same way as packet P described before (with the packet P being substituted with the LSP Ping packet or other OAM packet).

In at least some example embodiments, when the FECs of the sub-LSP are subsumed by the FEC of the aggregate LSP, an ingress router of an aggregate LSP may ensure that a sub-LSP of the aggregate LSP exists at the egress router of the aggregate LSP based on configuration of MPLS control protocols (e.g., (LDP, BGP, OSPF, OSPFv3, IS-IS, or the like) to enable the egress router of the aggregate LSP to indicate the exact set of sub-LSPs active within the aggregate LSP. When a router originates the label mapping of an aggregate FEC, the router includes a bit string within the label mapping, where a bit position in the bit string indicates offset of the active sub-LSP. In the example of FIG. 4, router R7 includes a bit string of size 256-bits in the label mapping of aggregate FEC 10.10.2.0/24 since it subsumes the possibility of all 254 sub-LSPs. If the range of an aggregate FEC is very large, such as 10.10.0.0/16, the number of maximum possible sub-LSPs is 255×254. To efficiently advertise bit strings of such a large range, the following scheme may be used. The range of an aggregate FEC is separated into blocks of 256. Each block is assigned unique identifiers in their ascending orders in the range. For example, sub-LSPs in offset range 1-256 are in block 1, sub-LSPs in offset range 257-512 are in block 2, and so forth. A label mapping message for an aggregate FEC includes one or more blocks, where each block is encoded as {block identifier, bit string}. For example, bit position 30 in block identifier 10 means the FEC of the sub-LSP at the offset ((10×256)+30)=2590 within the range of the aggregate FEC. If the label mapping message cannot accommodate all of the blocks for the range of the aggregate FEC, then the blocks should be sent in multiple label mapping messages, where each message carries the same aggregate FEC and label but a disjoint set of blocks. During the lifetime of an aggregate LSP, if the set of active sub-LSPs changes, then the change is reflected across the network by the aggregating router resending the label mapping with the affected blocks. Based on the bit string, an ingress router becomes aware as to whether or not a sub-LSP is active. For example, in FIG. 4 router R7 includes one block with block identifier 1 in the label mapping message for the aggregate FEC 10.10.2.0/24. It is noted that, as indicated above, various MPLS control protocols (LDP, BGP, OSPF, OSPFv3, IS-IS or the likes) may be configured to support inclusion of bit string blocks in their label mapping messages.

Various example embodiments for supporting scalability of LSPs may be configured to support scalability of LSPs using single-segment PWs.

In general, a PW offers emulation of a Layer-1 or Layer-2 connection across a public network. For example, two Ethernet links in two remote sites can be interconnected by an Ethernet PW across a public network. A PW is an MPLS overlay atop an IP or MPLS transport network. An example of a PW, which is a SS-PW over an MPLS network with Ethernet as the Layer-2 service, is presented with respect to FIG. 7 and FIGS. 8A and 8B. An example of a PW, which is an aggregate SS-PW over an MPLS network with Ethernet as the Layer-2 service, is presented with respect to FIG. 9 and FIGS. 10A and 10B.

Figure 7:
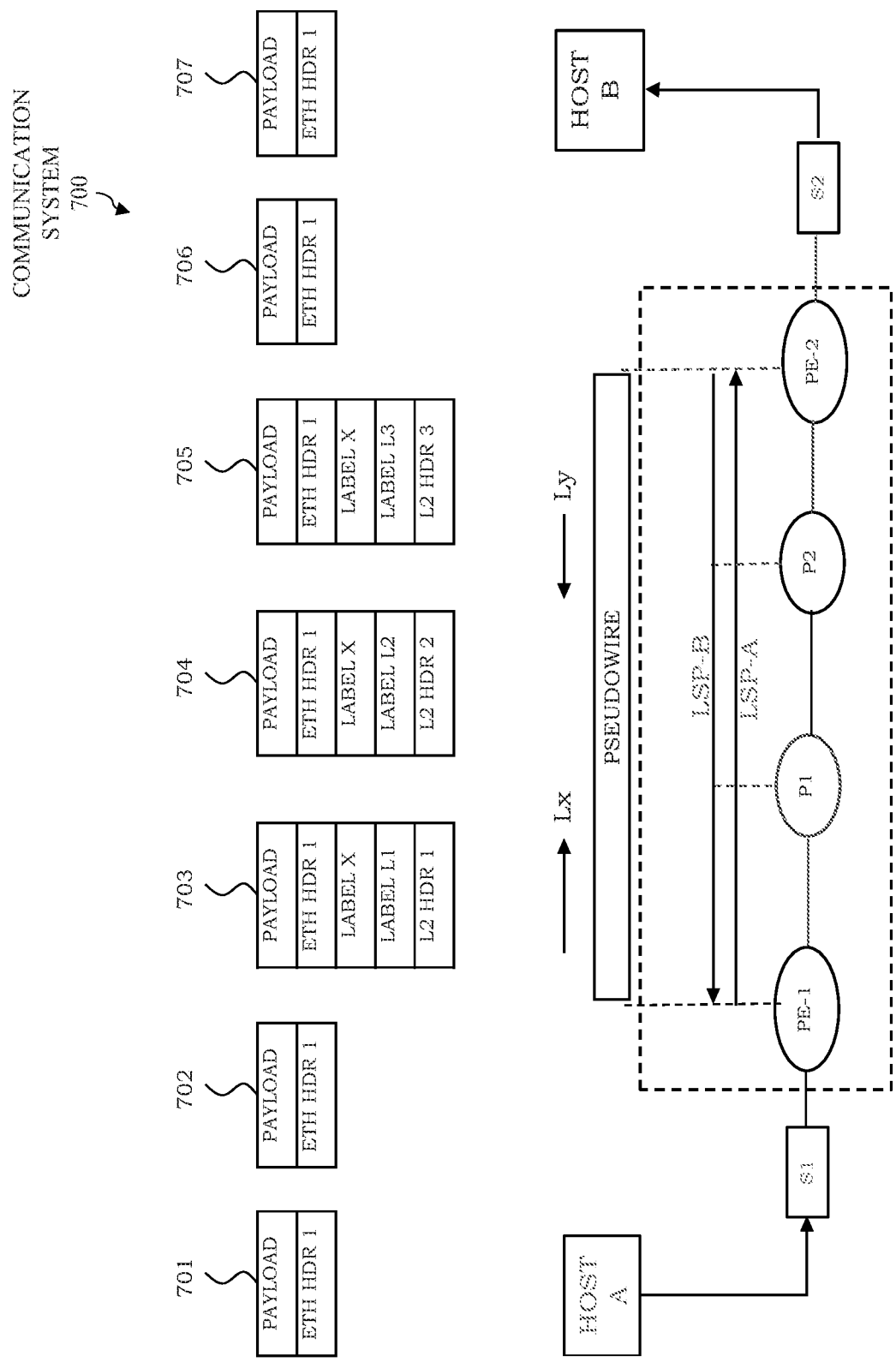
FIG. 7 depicts an example embodiment of an SS-PW for illustrating scalability of LSPs using an SS-PW.

Various example embodiments for supporting scalability of LSPs using SS-PWs are presented with respect to FIG. 7.

FIG. 7 depicts an example embodiment of an SS-PW for illustrating scalability of LSPs using an SS-PW.

In communication system 700, the PW provides P2P Layer-2 connectivity between host-A and host-B at the Ethernet/Layer-2 level, thereby providing a mechanism for the hosts to see each other as if connected by a single Ethernet link even though the hosts span across a layer-3/MPLS packet switched network. The PW is composed of two single-hop LSPs (one in each direction) between PE-1 and PE-2. PE-1 and PE-2 are referred to as provider edge (PE) routers, which are access points to the PW. Ethernet packets can be sent on the PW from PE-1 to PE-2 using label Lx and vice versa using label Ly. Since PE-1 and PE-2 are not directly connected, the PW packets may "tunneled" between PE-1 and PE-2 via tunneling over an MPLS LSP (one for each direction), via IP-based tunneling methods (e.g., GRE/IP, VXLAN, MPLSoUDP, or the like), or the like. In the example of FIG. 7, MPLS LSP is the tunneling method. For example, PW packets sent from PE-1 to PE-2 are tunneled over LSP-A and PW packets sent from PE-2 to PE-1 are tunneled over LSP-B. Multiple PWs between two remote-ends can be multiplexed over a single MPLS LSP (or other form of PSN tunnel) connecting the remote endpoints. The PW labels are typically exchanged between the PE routers by LDP or BGP running between the PE routers. LDP based control plane for set-up and maintenance of PWs is described in RFC 4447 and BGP based control plane for set-up and maintenance of PWs is described in. In RFC 8214, each PW is identified by a PWid FEC, where the PWid is a 32-bit identifier. The FEC also includes various parameters on the PW such as MTU and so forth.

Figure 8B:
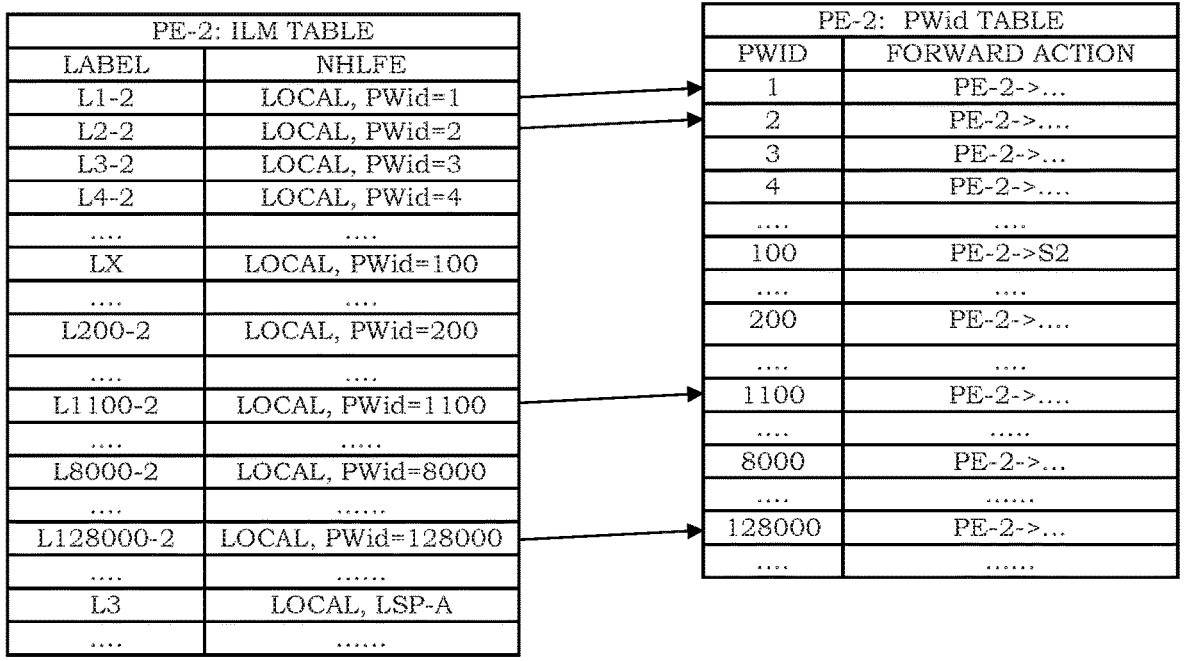

In FIG. 7, consider an example in which the PW is set up by LDP and the PWid is 100. PE-1 and PE-2 run a targeted LDP session among them. PE-1 advertises the label mapping {FEC/Pwid=100, Ly} to PE2. PE-2 advertises the label mapping {FEC/Pwid=100, Lx} to PE1. FIGS. 8A and 8B depict the ILM Tables and the FTN Tables at PE-1 and PE-2, respectively, which include the forwarding states for Pwid 100, including various other PWs and LSP-A and LSP-B. FIGS. 8A and 8B also depict the PWid Tables at PE-1 and PE-2, respectively, which include mappings of PWids to the forwarding actions to local links for the PWids.

In FIG. 7, packets 701-707 illustrate the transmission of a packet from host-A to host-B. Host-A generates the packet 701 to send to host-B. The packet 701 is an Ethernet packet including a payload and an Ethernet header. It is noted that the payload of the packet 701 can be a TCP/IP packet, ARP, or the like. A PW is agnostic of the payload type of the Ethernet header, so the payload type is shown as opaque. Host-A sends the packet 701 to Ethernet switch S1, which forwards the packet 701 to PE-1 as packet 702. The packet 702 is the same as the packet 701 (i.e., the packet 701 is the Ethernet packet originated by host-A). PE-1 receives the packet 702 and generates the packet 703 to send to P1. PE-1 associates the packet 702 with the PWid 100 (e.g., the S1<—→PE-1 link is mapped to the PWid 100) and, based on the FTN entry for PWid 100 at PE-1 (e.g., as in FIG. 8A), pushes the PW label Lx to send to PE-2. Based on the FTN entry for LSP-A to PE-2 (e.g., as in FIG. 8A), PE-1 further pushes the label L1 to transport the PW label Lx to PE-2. Label L1 is the label for the LSP-A advertised by its next-hop P1. PE-1 sends the packet {L1, Lx, P} to P1 by adding the Layer-2 header towards P1 to form the packet 703 and sending the packet 703 to P1. P1 receives the packet 703 and generates the packet 704 to send to P2. P1 swaps the label of LSP-A from L1 to L2 and swaps the Layer-2 header L2 HDR 1 with the Layer-2 header L2 HDR 2. P1 sends the packet 704 to P2. P2 receives the packet 704 and generates the packet 705 to send to PE-2. P2 swaps the label of LSP-A from L2 to L3 and swaps the Layer-2 header L2 HDR 2 with the Layer-2 header L2 HDR 3. P2 sends the packet 705 to PE-2. PE-2 receives the packet 705 and generates the packet 706 to send to Ethernet switch S2. PE-2, upon receiving the packet {L3, Lx, P} with label L3, pops the label L3 since this is end of LSP-A (e.g., as determined by the ILM table in FIG. 8B). PE-2, based on a determination that the label L3 indicates that there are more labels below the label L3 (i.e., the BOS bit in label L3 is 0), looks up the next label Lx in the ILM Table (e.g., using the ILM table in FIG. 8B). PE-2 pops the label Lx, since the label Lx indicates the end of the PWid 100. At PE-2, the PWid 100 is mapped to link PE-2<—→52, so PE-2 sends the packet to Ethernet switch S2 as packet 706 (which is equivalent to packets 702 and 701). Ethernet switch S2 receives the packet 706 and sends the packet 707 (which is equivalent to packet 706 and, thus, to packets 702 and 701) to host-B.

It is noted that there could be a very large number of PWs between two PE routers such as PE-1 and PE-2, such as 128K PWs (e.g., see the states of 128K PWs in FIGS. 8A and 8B). The PE routers maintain both control plane and data plane states for each PW. The 128K PWs require 128K MPLS labels at each PE router. The PE routers exchange 128K label mappings and other maintenance messages therebetween. It will be appreciated that, in many cases, a large subset of PWs within the total set of PWs may bear the same characteristics, such as having the same PW type (e.g., Ethernet, ATM, Frame Relay or the like), having the same MTU, sharing the same PSN tunnel in each direction, or the like, as well as various combinations thereof. It is noted that, in such cases, the control plane and data plane overheads can be significantly minimized by using various example embodiments presented herein.

In various example embodiments for supporting scalability of LSPs, the PE routers no longer exchange label mappings for PWs; rather, the PE routers set up a single aggregate PW that shares the characteristics of a subset of PWs (e.g., PW type, MTU, sharing the same PSN tunnel, or the like, as well as various combinations thereof). The aggregate PW is set up by the control protocol (LDP, BGP, or like) based on label mapping exchanges using PWid FEC. However, the label mapping also includes one or more blocks of bit strings, where a bit position in a bit string is the identifier of a PW (sub-LSP) transported atop the aggregate PW. For example, bit position 100 in block 10 is the PW with PWid 2570 (=10×256+10). The PWid of the aggregate PW is unique among the PE routers, but the PWid of a member PW is unique within the aggregate PW only. If the label mapping message of an aggregate PW cannot accommodate all of the blocks then the blocks may be sent in multiple label mapping messages, where each message carries the same aggregate PWid FEC and label but a disjoint set of blocks. For example, assuming that there are 4K PWs transported atop the aggregate PW, then the 4K PWs can be indicated by 16 blocks of bit strings. This approach reduces the overhead in the control plane and the data plane by a factor of 4K. The approach also improves the set-up time for PWs since, instead of 4K label mapping exchanges between PE routers, the 16-bit string blocks may be included in one or two aggregate PW label mapping messages. If the operational status of a PW changes, then it is reflected by a PE router by resending the label mapping of the aggregate PW that includes only the bit string block including the changing PW.

Various example embodiments for supporting scalability of LSPs using aggregate single-segment PWs are presented with respect to FIG. 9.

FIG. 9 depicts an example embodiment of an aggregate SS-PW for illustrating scalability of LSPs using an aggregate SS-PW.

In communication system 900, the PW provides P2P Layer-2 connectivity between host-A and host-B at the Ethernet/Layer-2 level, thereby providing a mechanism for the hosts to see each other as if connected by a single Ethernet link even though the hosts span across a layer-3/MPLS packet switched network. The communication system 900 has the same topology and PSN tunnels from the communication system 700 of FIG. 7. In FIG. 9, the aggregate PW provides P2P connectivity between PE-1 and PE-2 for transporting packets for member PWs that share identical characteristics such as PW type, MTU, PSN tunnel, and the like. The common characteristics are signaled during the set-up of the aggregate PW. Packets can be sent on the Aggregate PW from PE-1 to PE-2 using label Lx and vice versa using label Ly. Since PE-1 and PE-2 are not directly connected, the aggregate PW packets may "tunneled" between PE-1 and PE-2 via tunneling over an MPLS LSP (one for each direction), via IP-based tunneling methods (e.g., GRE/IP, VXLAN, MPLSoUDP, or the like), or the like. In the example of FIG. 10, MPLS LSP is the tunneling method. For example, aggregate PW packets sent from PE-1 to PE-2 are tunneled over LSP-A and PW packets sent from PE-2 to PE-1 are tunneled over LSP-B. Multiple Aggregate PWs between two remote-ends can be multiplexed over a single MPLS LSP (or other form of PSN tunnel) connecting the remote endpoints. The aggregate PW labels are typically exchanged between the PE routers by LDP or BGP running between the PE routers. LDP based control plane for set-up and maintenance of aggregate PWs may be based on use of bit string blocks in PW label mapping messages and BGP based control plane for set-up and maintenance of PWs may be based on use of bit string blocks in PW label mapping messages.

Figure 10A:
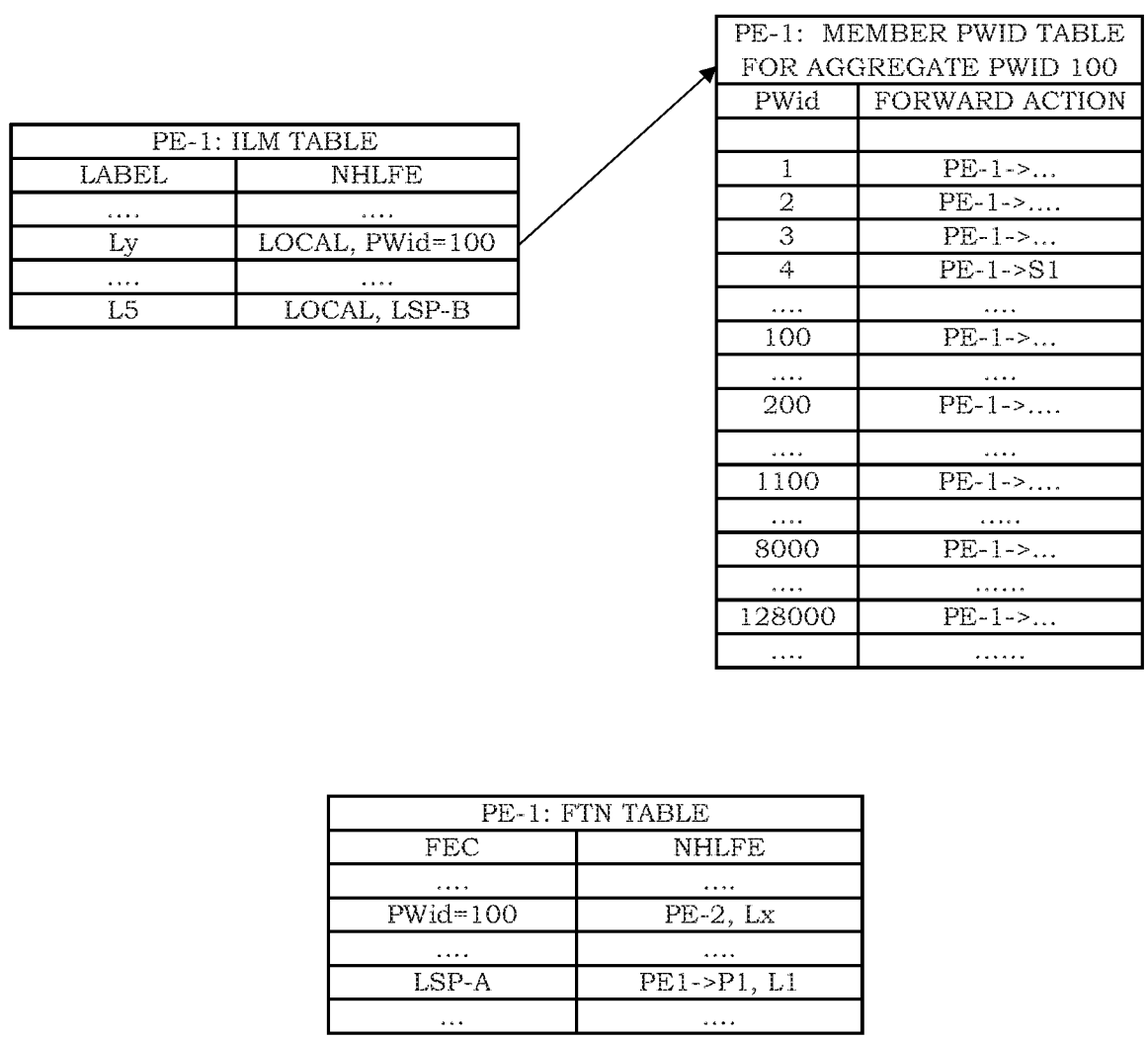

In FIG. 9, consider an example in which the aggregate PW is set up by LDP and the PWid is 100. PE-1 and PE-2 run a targeted LDP session among them. PE-1 advertises the label mapping {FEC/Pwid=100, Ly, bit string blocks} to PE2. PE-2 advertises the label mapping {FEC/Pwid=100, Lx, bit string blocks} to PE1. The bit positions that are set to 1 in the bit string blocks indicate the PWid of the member PWs overlaid atop the Aggregate PW. It is possible that, at the time of set-up of the aggregate PW, none of the member PWs are provisioned. In that case, no bit string blocks would be exchanged initially and then later, when member PWs are provisioned at a PE router, the label mapping of the Aggregate PW would be resent including the bit string blocks for member PWs. In FIG. 7, for purposes of clarity, only one aggregate PW is provisioned for all 128K member PWs between PE-1 and PE-2. Advertisement of 128K PWs requires 500 bit string blocks. The maximum size of an LDP message is 4096B, and assuming that at least 4000B is available for bit string blocks, then the label mapping message of the Aggregate PW can accommodate 15 blocks. Thus, in this case, 34 label mapping messages on the aggregate PW would be needed to advertise 128K member PWs (thereby providing a 99.97% reduction of control plane messaging overhead as compared to the scenario of FIG. 7). FIGS. 10A and 10B depict the ILM Tables and the FTN Tables at PE-1 and PE-2, respectively, which include only the state for the aggregate PW (thereby freeing up 128K-1 labels in the PE routers for other applications). FIGS. 10A and 10B also depict the Member PWid Tables at PE-1 and PE-2, respectively, which include the forwarding states of the member PWs overlaid atop the aggregate PWid 100 (it is noted that there will be one Member PWid Table per aggregate PW).

In FIG. 9, packets 901-907 illustrate the transmission of a packet from host-A to host-B. Host-A generates the packet 901 to send to host-B. The packet 901 is an Ethernet packet including a payload and an Ethernet header. It is noted that the payload of the packet 901 can be a TCP/IP packet, ARP, or the like. A PW is agnostic of the payload type of the Ethernet header, so the payload type is shown as opaque. Host-A sends the packet 901 to Ethernet switch 51, which forwards the packet 901 to PE-1 as packet 902. The packet 902 is the same as the packet 901 (i.e., the packet 901 is the Ethernet packet originated by host-A). PE-1 receives the packet 902 and generates the packet 903 to send to P1. PE-1 associates the packet 902 with the member PWid 4 of the aggregate PWid 100 (e.g., the S1<→PE-1 link is mapped to the PWid 4 in Aggregate PWid 100). So, PE-1 pushes the PWid 4 onto the packet. PE-1 then pushes the SLI to indicate that a PWid FEC is encoded below it in the packet. PE-1, based on the FTN entry for aggregate PWid 100 at PE-1 (e.g., as in FIG. 10A), pushes the PW label Lx to send to PE-2. Based on the FTN entry for LSP-A (e.g., as in FIG. 10A), PE-1 further pushes the label L1 to transport the PW label Lx to PE-2. PE-1 sends the packet {L1, Lx, SLI, PWid=4, P} to P1 by adding the Layer-2 header towards P1 to form the packet 903 and sending the packet 903 to P1. P1 receives the packet 903 and generates the packet 904 to send to P2. P1 swaps the label of LSP-A from L1 to L2 and swaps the Layer-2 header L2 HDR 1 with the Layer-2 header L2 HDR 2. P1 sends the packet 904 to P2. P2 receives the packet 904 and generates the packet 905 to send to PE-2. P2 swaps the label of LSP-A from L2 to L3 and swaps the Layer-2 header L2 HDR 2 with the Layer-2 header L2 HDR 3. P2 sends the packet 905 to PE-2. PE-2 receives the packet 905 and generates the packet 906 to send to Ethernet switch S2. PE-2, upon receiving the packet {L3, Lx, SLI, PWid=4, P} with label L3, pops the label L3 since this is end of LSP-A (e.g., as determined by the ILM table in FIG. 10B). PE-2, based on a determination that the label L3 indicates that there are more labels below the label L3 (i.e., the BOS bit in label L3 is 0), looks up the next label Lx in the ILM Table (e.g., using the ILM table in FIG. 8B). PE-2 pops the label Lx, since the label Lx indicates the end of the PWid 100. At PE-2, the PWid 100 is mapped to its Member PWid Table, which indicates that this PW is an aggregate PW, so PE-2 finds the next label which is the SLI. PE-2 pops the SLI and then reads and pops the PWid FEC underneath, which is member PWid 4. PE-2 looks up the PWid 4 in the Member PWid Table of Aggregate PWid 100. Based on the member entry for PWid 4, PE-2 sends the packet to S2 as packet 906 (which is equivalent to packets 902 and 901). Ethernet switch S2 receives the packet 906 and sends the packet 907 (which is equivalent to packet 906 and, thus, to packets 902 and 901) to host-B.

It is noted that, although primarily presented with respect to an example in which all of the PWs are overlaid atop a single aggregate PW (i.e., all 128K PWs are overlaid atop a single aggregate PW), a pair of PE routers may set up multiple aggregate PWs having disjoint characteristics therebetween. For example, a pair of PE routers may have one aggregate PW per PW type (e.g., Ethernet, ATM, or the like). For example, multiple Aggregate PWs may be set-up, each with a different QoS profile. An Aggregate PW with a specific QoS demand may be transported on a PSN tunnel that guarantees the QoS, so aggregate PWs with different QoS profiles may be transported along different paths in the PSN. It is noted that the QoS profile of an aggregate PW is cumulative of the QoS profiles of the member PWs of the aggregate PW. It will be appreciated that various other parameters or combinations of parameters may be used as the basis for defining aggregate PWs.

It is noted that, in FIG. 9, LSP-A or LSP-B could be also aggregate if PE-1 and PE-2 are in different IP routing domains. This would be the case of PW-over-Aggregate PW-over-sub-LSP-over-Aggregate-LSP. It is noted that, since the sub-LSP carries the aggregate PW label after it, the FEC of the sub-LSP will set the S-flag to 0. It will be appreciated that various other combinations of LSPs and sub-LSPs may be used in combination with aggregate PWs and member PWs to support various example embodiments for supporting scalability of LSPs.

Various example embodiments for supporting scalability of LSPs may be configured to support scalability of LSPs using aggregate multi-segment PWs.

In general, when a PW spans across more than two PE routers then it is called an MS-PW. The pair of PE routers where the PW terminates are called terminating PE (T-PE) routers and intermediate PE routers are called switching PE (S-PE) routers. There are various reasons for setting up MS-PWs, such as to avoid full mesh of the control protocol sessions (e.g., LDP, BGP, or the like) between each pair of T-PE routers, to provide a direct control protocol session between a pair of T-PE routers not permitted for security reasons since each T-PE resides in a different routing domain where each routing domain is under separate administrative control, or the like. An example embodiment of an MS-PW is presented in FIG. 11.

Figure 11:
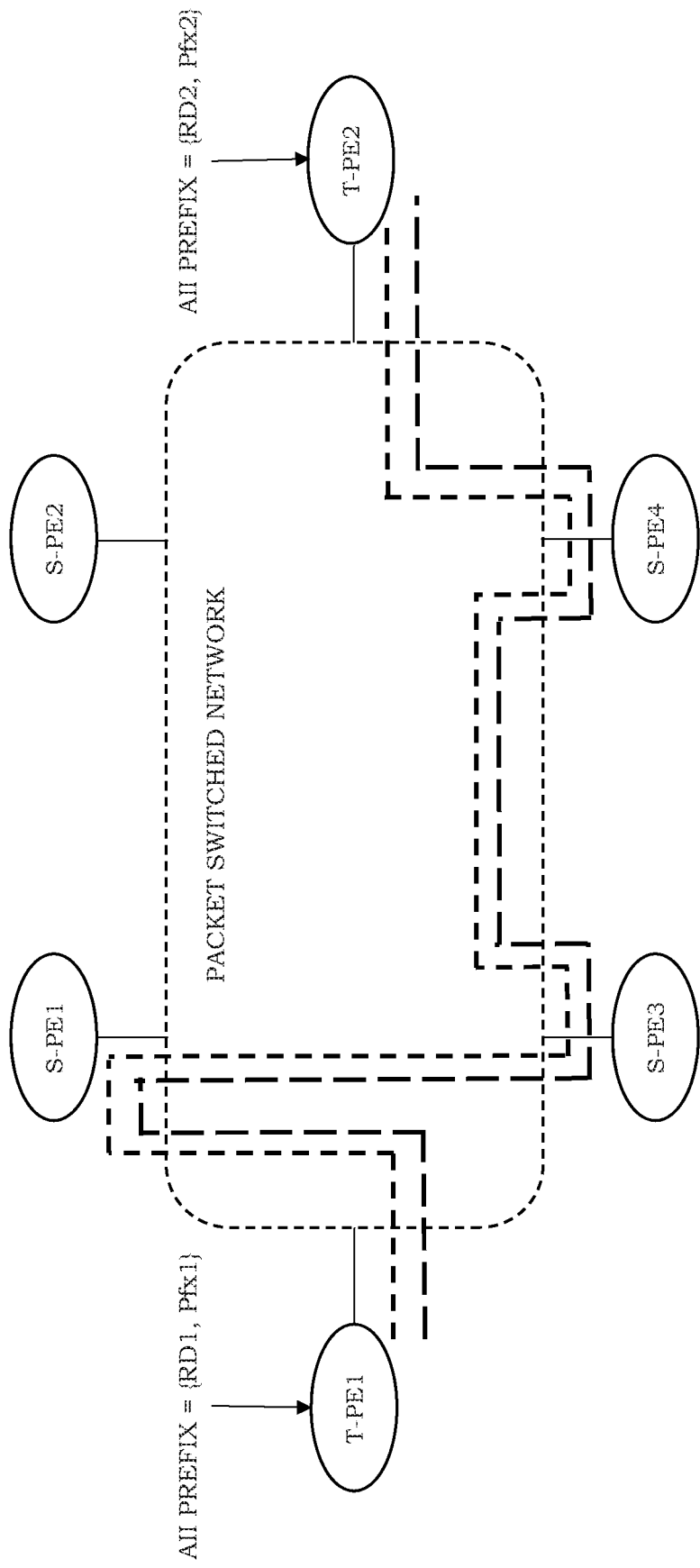
FIG. 11 depicts an example embodiment of a dynamic MS-PW for illustrating scalability of LSPs using a dynamic aggregate MS-PW.

FIG. 11 depicts an example embodiment of a dynamic aggregate MS-PW for illustrating scalability of LSPs using a dynamic aggregate MS-PW.

In communication system 1100, the dynamic MS-PWs are established between T-PE1 and T-PE2 by LDP as the signalling protocol. S-PE1, S-PE2, S-PE3, S-PE4 are potential S-PEs between the T-PEs. The T-PEs and S-PEs are interconnected through a packet switched network. Each PW segment is overlaid atop a PSN tunnel to reach the next-hop S-PE or T-PE. BGP-based routing of MS-PW endpoint addresses may be supported and an LDP-based control plane may be supported for set-up and maintenance of the MS-PW. An endpoint of a MS-PW is identified by an Attachment Individual Identifier (AII). There two different addressing schemes of AII-AII Type 1 (also referred to as AII-1) and AII Type 2 (also referred to as AII-2). Dynamic MS-PW uses AII-2, which is in the format of the tuple {Route Distinguisher (RD), Prefix, Attachment Circuit (AC) Identifier (ID)}. Each T-PE is assigned a unique {RD, Prefix}, out of which it assigns an AC ID to each MS-PW terminating thereat. So, all MS-PWs terminating at a T-PE are aggregable by a common {RD, Prefix} which is referred to as an "AII-2 Prefix". An AII-2 Prefix may be thought of as being equivalent to an IP subnet that includes all PWs that share the AII-2 Prefix. In FIG. 11, assume that T-PE1 is assigned AII-2 Prefix {RD1, Pfx1} and that T-PE2 is assigned {RD2, Pfx2}. The prefixes are distributed as routes across all T-PEs and S-PEs by BGP as the AII-2 routing protocol. Accordingly, BGP in each T-PE or S-PE computes the next-hop S-PE or T-PE for an AII-2 Prefix and programs the AII-2 Prefix in the AII-2 Routing Table.

In FIG. 11, consider an example in which it is assumed that an MS-PW needs to be provisioned between T-PE1 and T-PE2. In this example, AII-2s for the MS-PW assigned at T-PE1 and T-PE2 are {RD1, Pfx1, 100} and {RD2, Pfx2, 100}, respectively. The T-PE with the larger AII-2 value initiates signalling of the MS-PW. Here, assume that the initiator is T-PE1.

In this example, T-PE1 allocates a label L100 for MS-PW FEC={SAII={RD1, Pfx1, 100}, TAII={RD2, Pfx2, 100}}. SAII means "source" AII and TAII means "target" AII. T-PE1 looks up the TAII in the AII-2 routing table, which finds the best matching (based on LPM) AII-2 Prefix {RD2, Pfx2} with next-hop as S-PE1. Then, the label mapping {FEC={SAII={RD1, Pfx1, 100}, TAII={RD2, Pfx2}}, Label=L100} is sent to S-PE1. It is noted that, since T-PE1 and S-PE1 are not directly connected, the packet is tunneled to S-PE1 via a PSN tunnel (GRE tunnel, MPLS LSP, or the like). So, the packet is further encapsulated by a PSN tunnel encapsulation and the packet is sent to the next-hop of the tunnel in PSN. For simplicity, PSN tunneling between a T-PE and S-PE is not described here.

In this example, on receiving the label mapping from T-PE1, S-PE1 looks up the TAII in the AII-2 routing table, which finds the best matching AII-2 Prefix {RD2, Pfx2} with next-hop as S-PE3. Then, S-PE1 allocates a label L200 for MS-PW FEC={SAII={RD1, Pfx1, 100}, TAII={RD2, Pfx2, 100}} and sends the label mapping {FEC={SAII={RD1, Pfx1, 100}, TAII={RD2, Pfx2}}, Label=L200} to S-PE3. This means that, when S-PE1 receives a PW packet with label L200, it will swap with label L300 and send the packet to T-PE1. In this example, on receiving the label mapping from S-PE1, S-PE3 looks up the TAII in the AII-2 routing table, which finds the best matching AII-2 Prefix {RD2, Rfx2} with next-hop as S-PE4. Then, S-PE3 allocates a label L300 for MS-PW FEC={SAII={RD1, Pfx1, 100}, TAII={RD2, Pfx2, 100}} and sends the label mapping {FEC={SAII={RD1, Pfx1, 100}, TAII={RD2, Pfx2}}, Label=L300} to S-PE4.

In this example, on receiving the label mapping from S-PE3, S-PE4 looks up the TAII in the AII-2 routing table, which finds the best matching AII-2 Prefix {RD2, Pfx2} with next-hop as T-PE2. Then, S-PE4 allocates a label L400 for MS-PW FEC={SAII={RD1, Pfx1, 100}, TAII={RD2, Pfx2, 100}} and sends the label mapping {FEC={SAII={RD1, Pfx1, 100}, TAII={RD2, Pfx2}}, Label=L400} to T-PE2.

In this example, T-PE2, upon receiving the label mapping, looks up the TAII in the AII-2 routing table, which indicates that the AII-2 Prefix {RD2, Pfx2} is local and that this is the termination of the PW. In this example, the T-PE2 initiates signalling of the MS-PW in the reverse direction.

In this example, in the reverse direction, the SAII and TAII values are reversed in the MS-PW FEC. So, reverse signalling is performed with MS-PW FEC={SAII={RD2, Pfx2, 100}, TAII={RD1, Pfx1, 100}}. The reverse signalling until T-PE1 follows the same path (of S-PEs) as in the forward direction. Here, assume that labels assigned by T-PE2, S-PE4, S-PE3, and S-PE1 in the reverse direction are L500, L600, L700, and L800 respectively.

In this example, once the signalling is complete in both directions, packets can be sent on the MS-PW.

In this example, T-PE1, to send a packet P on the MS-PW, pushes the label L800 onto the packet and then further pushes the encapsulation of a PSN tunnel that terminates at S-PE2. Then T-PE1 sends the packet {PSN tunnel encapsulation to S-PE2, L800, P} to the immediate next-hop of the PSN tunnel. After traversing the tunnel, the packet is received by S-PE2. S-PE2 removes the PSN encapsulation, swaps the label L800 with the label L700 based on the data plane state of the MS-PW, and then pushes the encapsulation of a PSN tunnel that terminates at S-PE3. S-PE3 sends the packet {PSN tunnel encapsulation to S-PE3, L700, P} to the immediate next-hop of the PSN tunnel. After traversing the tunnel, the packet is received by S-PE3. S-PE3 removes the PSN encapsulation, swaps the label L700 with the label L600 based on the data plane state of the MS-PW, and then pushes the encapsulation of a PSN tunnel that terminates at S-PE4. S-PE4 sends the packet {PSN tunnel encapsulation to S-PE4, L600, P} to the immediate next-hop of the PSN tunnel. After traversing the tunnel, the packet is received by S-PE4. S-PE4 removes the PSN encapsulation, swaps the label L600 with the label L500 based on the data plane state of the MS-PW, and pushes the encapsulation of a PSN tunnel that terminates at T-PE2. S-PE4 sends the packet {PSN tunnel encapsulation to T-PE2, L500, P} to the immediate next-hop of the PSN tunnel. After traversing the tunnel, the packet is received by T-PE2. T-PE2 removes the PSN encapsulation, pops label L500 based on the data plane state of the MS-PW, and forwards the packet P to the AC associated with the MS-PW.

In AII-2, the AC field is 16-bits. So, a single AII-2 Prefix can be shared by 64K MS-PWs in a T-PE. S-PEs maintain both control and data plane state of each of the MS-PWs traversing through it. It is noted that this model of dynamic MS-PW may have certain limitations as follows. First, an S-PE needs to allocate labels from its local label space for setting up each MS-PW routed through that S-PE. Since the S-PE label space is shared by many MPLS based applications, including the MPLS-based PSN tunnels, the S-PE generally needs to maintain a high volume of control plane and data plane states for the MS-PWs stitched at the S-PE (e.g., a pair of T-PEs alone can have 128K MS-PWs among them). Second, since each S-PE does PW segment stitching, each S-PE generally needs to participate in PW OAM functions. Third, the MS-PW set-up and maintenance procedure generally causes control plane congestion at S-PEs. For example, an S-PE needs to participate in PW Status Signaling for various maintenance procedures on each MS-PW routed therethrough. Further, if an S-PE needs to handle network events (e.g., failure of PW next-hops or the like) or needs re-routing, then the S-PE incurs a relatively very high volume of control plane exchanges between participating S-PE devices. LDP is the default signaling protocol for MS-PWs and is a TCP-based protocol, and a high volume of LDP protocol exchanges may cause TCP congestion at S-PEs and impact other essential services that use same LDP session. Fourth, each S-PE needs to maintain an ever-larger number of control plane states as the number of PWs routed through the S-PE grows. The control plane has limited memory and thus, limits, the number of MS-PW services that can be offered by an AS. It is noted that at least some such potential limitations may be resolved by various example embodiments presented herein.

In various example embodiments for supporting scalability of LSPs, the T-PEs no longer set-up each MS-PW individually. Rather a pair of T-PEs set-up an aggregate MS-PW. The aggregate MS-PW is set-up by the control protocol (e.g., LDP, BGP, or like) as discussed above, using the AII-2 addressing for the endpoints of the aggregate MS-PW. However, the label mappings of the aggregate MS-PW also include one or more blocks of bit strings, where a bit position in a bit string is the identifier of an SS-PW overlaid atop the aggregate MS-PW. For example, bit position 100 in block 10 is the SS-PW with PWid 2660 (=10× 256+100). It is noted that the PWid is unique within the aggregate PW. Since the SS-PWs are overlaid atop the aggregate MS-PW, the S-PEs along the path of the aggregate PW do not maintain any states of the SS-PWs. For example, assuming that there are 4K SS-PWs associated with the aggregate MS-PW, then the PWs can be indicated by 16 blocks. This alone reduces the control plane and data plane overhead by a factor of 4K at T-PEs and S-PEs. T-PEs do not need to allocate 4K labels for the SS-PWs. The data plane of a T-PE simply keeps the list of PWids associated with an Aggregate MS-PW to identify the overlaid SS-PWs. This approach also improves the set-up time for SS-PWs since, instead of 4K label mapping exchanges between T-PE routers, the 16-bit string blocks may be included in one or two Aggregate MS-PW label mapping messages. If the operational status of a SS-PW changes, then it may be reflected by a T-PE router by resending the label mapping of the aggregate MS-PW that includes only the bit string block including the changing SS-PW. S-PE only needs to reroute the Aggregate MS-PWs in the event of the failure.

Various example embodiments for supporting scalability of LSPs using aggregate multi-segment PWs are presented with respect to FIG. 11. It will be appreciated that various example embodiments may be further understood by considering the following example.

In this example, before setting up any PWs between T-PE1 and T-PE2, at least one Aggregate MS-PW is provisioned therebetween. For example, assume that AII-2s for the Aggregate MS-PW assigned at T-PE1 and T-PE2 are {RD1, Pfx1, 100} and {RD2, Pfx2, 100}, respectively. Then, the T-PE with the larger AII-2 value initiates signalling of the Aggregate MS-PW. Here, the initiator is T-PE1. T-PE1 allocates a label L100 for Aggregate MS-PW FEC={SAII={RD1, Pfx1, 100}, TAII={RD2, RFx2, 100}}. Assume that T-PE also needs to set-up 200 SS-PWs atop the aggregate MS-PW. Then, the SS-PWs are assigned PWids 1-200 and a 256-bit bit string block is created with block identifier 1 and the bit positions 1-200 set to 1. This bit string block represents the sub-FECs of the aggregate MS-PW FEC. T-PE1 looks up the TAII in the AII-2 routing table, which finds the best matching (based on LPM) AII-2 Prefix {RD2, Rfx2} with the next-hop as S-PE1. Then, the label mapping {FEC={SAII={RD1, Pfx1, 100}, TAII={RD2, RFx2}}, Label=L100, Sub-FECs=bit string} is sent to S-PE1.

In this example, upon receiving the label mapping from T-PE1, S-PE1 looks up the TAII in the AII-2 routing table, which finds the best matching AII-2 Prefix {RD2, Rfx2} with the next-hop as S-PE3. Then, S-PE1 allocates a label L200 for Aggregate MS-PW FEC={SAII={RD1, Pfx1, 100}, TAII={RD2, RFx2, 100}} and sends the label mapping {FEC={SAII={RD1, Pfx1, 100}, TAII={RD2, RFx2}}, Label=L200, Sub-FECs=bit string} to S-PE3. This means that, when S-PE1 receives a PW packet with label L200, it will swap the label L200 with label L300 and send the packet to T-PE1.

In this example, upon receiving the label mapping from S-PE1, S-PE3 looks up the TAII in the AII-2 routing table, which finds the best matching AII-2 Prefix {RD2, Rfx2} with the next-hop as S-PE4. Then, S-PE3 allocates a label L300 for Aggregate MS-PW FEC={SAII={RD1, Pfx1, 100}, TAII={RD2, RFx2, 100}} and sends the label mapping {FEC={SAII={RD1, Pfx1, 100}, TAII={RD2, RFx2}}, Label=L300, Sub-FECs=bit string} to S-PE4. In this example, upon receiving the label mapping from S-PE3, S-PE4 looks up the TAII in the AII-2 routing table, which finds the best matching AII-2 Prefix {RD2, Rfx2} with the next-hop as T-PE2. Then, S-PE4 allocates a label L400 for Aggregate MS-PW FEC={SAII={RD1, Pfx1, 100}, TAII={RD2, RFx2, 100}} and sends the label mapping {FEC={SAII={RD1, Pfx1, 100}, TAII={RD2, RFx2}}, Label=L400, Sub-FECs=bit string} to T-PE2.

In this example, upon receiving the label mapping from S-PE4, T-PE2 looks up the TAII in the AII-2 routing table, which indicates that the AII-2 Prefix {RD2, Rfx2} is local and that this is the termination of the aggregate MS-PW. Then, T-PE2 initiates signalling of the aggregate MS-PW in the reverse direction.

In this example, in the reverse direction, SAII and TAII values are reversed in the aggregate MS-PW FEC. So, reverse signalling is performed with aggregate MS-PW FEC={SAII={RD2, Pfx2, 100}, TAII={RD1, RFx1, 100}}. The reverse signalling to T-PE1 follows the same path (of S-PEs) as in the forward direction and the bit string is included in label mapping messages as Sub-FECs. Here, assume that labels assigned by T-PE2, S-PE4, S-PE3, and S-PE1 in the reverse direction are L500, L600, L700, and L800 respectively.

In this example, once the signalling is complete in both directions, packets can be sent on an SS-PW over the aggregate MS-PW. It is noted that if, at some point after the set-up of the aggregate MS-PW, overlaid SS-PWs need to be added or deleted by a T-PE then the change may simply be reflected by the T-PE by resending the label mapping of the aggregate MS-PW with the updated bit string block of Sub-FECs.

In this example, T-PE1, to send a packet P on the SS-PW with PW id 100, first pushes the PW id 100 on the packet P, then pushes the SLI onto the packet to indicate the presence of the PW id, then pushes the aggregate MS-PW label L800 onto the packet, and then further pushes the encapsulation of a PSN tunnel that terminates at S-PE2. Then, the T-PE1 sends the packet {PSN tunnel encapsulation to S-PE2, L800, SLI, FEC=PWid 100, P} to the immediate next-hop of the PSN tunnel. After traversing the tunnel, the packet is received by S-PE2. S-PE2 removes the PSN encapsulation, swaps the label L800 with the label L700 based on the data plane state of the aggregate MS-PW, and pushes the encapsulation of a PSN tunnel that terminates at S-PE3. Then S-PE3 sends the packet {PSN tunnel encapsulation to S-PE3, L700, SLI, FEC=PWid 100, P} to the immediate next-hop of the PSN tunnel. After traversing the tunnel, the packet is received by S-PE3. S-PE3 removes the PSN encapsulation. swaps the label L700 with the label L600 based on the data plane state of the aggregate MS-PW, and pushes the encapsulation of a PSN tunnel that terminates at S-PE4. Then S-PE4 sends the packet {PSN tunnel encapsulation to S-PE4, L600, SLI, FEC=PWid 100, P} to the immediate next-hop of the PSN tunnel. After traversing the tunnel, the packet is received by S-PE4. S-PE4 removes the PSN encapsulation, swaps the label L600 with the label L500 based on the data plane state of the aggregate MS-PW, and pushes the encapsulation of a PSN tunnel that terminates at T-PE2. Then S-PE4 sends the packet {PSN tunnel encapsulation to T-PE2, L500, SLI, FEC=PWid 100, P} to the immediate next-hop of the PSN tunnel. After traversing the tunnel, the packet is received by T-PE2. T-PE3 removes the PSN encapsulation, pops the label L500 based on the data plane state of the aggregate MS-PW, finds the SLI and PWid and looks up the forwarding state of PWid 100, and forwards the packet P to the AC associated with PWid 100.

It is noted that a pair of T-PE routers may have one aggregate MS-PW per PW type (e.g., Ethernet, ATM, or the like). It is noted that multiple aggregate MS-PWs may be set-up, each with different QoS profiles. It is noted that an aggregate MS-PW with a specific QoS demand will be further transported on a PSN tunnel that guaranteed the QoS. So, aggregate MS-PWs with different QoS profiles may be transported along different paths of S-PEs and the QoS profile of an aggregate MS-PW is the cumulative QoS profiles of all member SS-PWs.

In the example of FIG. 11, a PSN LSP within a segment also could be an aggregate LSP if the neighboring T-PE/S-PEs are in different IP routing domains. This would be the case of a PW-over-Aggregate MS-PW/PW-over-sub-LSP-over-Aggregate-LSP. Since the sub-LSP carries the aggregate MS-PW label, the FEC of the sub-LSP will set the S-flag to 0 (meaning that there are more labels to follow).

While various aspects of Aggregate MS-PWs may support various features, it will be appreciated that various aspects of Aggregate MS-PWs may have various limitations or potential limitations which, as discussed further below, may be addressed by various example embodiments presented herein. An Aggregate MS-PW may be established between a pair of T-PEs without association of the SS-PWs overlaid atop the Aggregate MS-PW. Once the Aggregate MS-PW is ready, then each of the overlaid SS-PWs are signalled by the control protocol in the context of the Aggregate MS-PW. This means that label is allocated by a T-PE for the SS-PW and the label mapping is sent as {Aggregate MS-PW FEC, SS-PW FEC, Label}. The label mapping traverses the path of the Aggregate MS-PW; S-PEs in the path transparently forwards the label mapping to the next-hop S-PE or T-PE of the Aggregate MS-PW. So, no control and dataplane state is maintained in the S-PEs for the overlaid SS-PWs. Then, to send a packet on a SS-PW, a T-PE pushes the SS-PW label, the Aggregate MS-PW label, and encapsulation for the PSN tunnel to next-hop S-PE. Then, then packet is sent to the immediate next-hop of the PSN tunnel. However, this solution does not reduce the overhead of control plane messages since each SS-PW is set-up and maintained independently in the context of the Aggregate MS-PW and does not reduce the control plane and data plane states in T-PEs since the T-PEs allocate a label for each SS-PW which is programmed into dataplane. Various example embodiments presented herein, as discussed further below, may be configured to address such limitations.

Various example embodiments for supporting scalability of LSPs using aggregate MS-PWs may reduce the overhead of control plane messages since each SS-PW is set up and maintained independently in the context of the aggregate MS-PW, reduces the control plane and data plane states in T-PEs since the T-PEs allocate a label for each SS-PW that is programmed into the data plane, or the like, as well as various combinations thereof.

Figure 12:
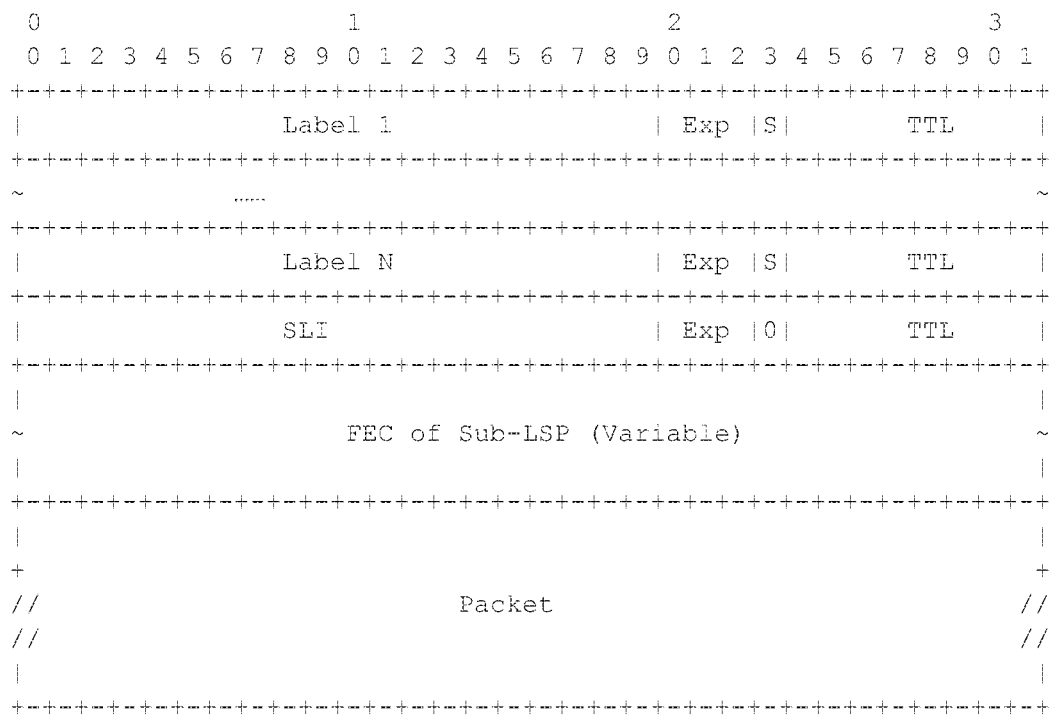
FIG. 12 depicts an example embodiment of a packet for illustrating a packet encoding for a packet communicated over a sub-LSP over an aggregate LSP.

FIG. 12 depicts an example embodiment of a packet for illustrating a packet encoding for a packet communicated over a sub-LSP over an aggregate LSP. The packet 1200 includes a label stack (including N labels), a Sub-LSP Indicator (SLI) label below the label stack, and a sub-LSP FEC field the SLI label, and the packet below the sub-LSP FEC.

The label stack is a label stack associated with the aggregate LSP. The case of multiple labels may arise when the aggregate LSP is, in turn, sent over another LSP (i.e., in an LSP-in-LSP fashion.). For example, if the aggregate LSP is a BGP-signalled LSP over an LDP LSP and the LDP LSP is over a SR LSP, then N would be at least 3 since SR can push more than one label). The EXP and TTL fields in the labels may be set to values based on the underlying packet being transported, and the bottom-of-the-stack (BOS) bit or the S-bit will be set to 0 in each of these labels since none of them are the bottommost label.

The SLI is configured to enable the egress router of the aggregate LSP to unambiguously distinguish that a sub-LSP is encoded in the packet by its FEC. To accomplish this, the SLI is encoded such that it immediately precedes the sub-LSP FEC, where preceding means closer to the top of the label stack (farther from bottom of stack indication). It will be appreciated that, if standardized, a value for SLI may be reserved on the IANA registry on special-purpose labels. It is noted that the EXP and TTL fields in SLI may be set to 0, and the S-bit is set to 1 since no more subsequent labels follow the SLI (i.e., the SLI directly encapsulates the packet).

Figure 13:
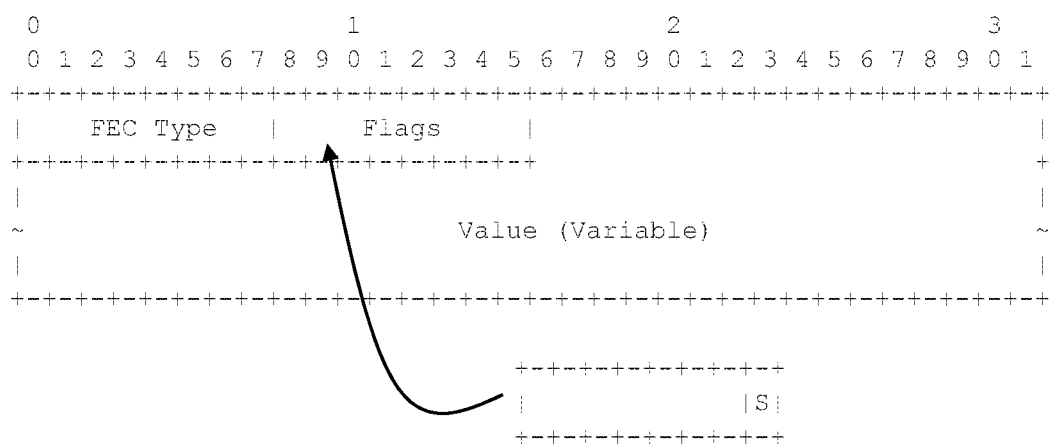
FIG. 13 depicts an example embodiment of a FEC of a sub-LSP for illustrating a format of the FEC of the sub-LSP.

FIG. 13 depicts an example embodiment of a FEC of a sub-LSP for illustrating a format of the FEC of the sub-LSP.

The Sub-LSP FEC 1300 may be encoded into a packet below SLI. The sub-LSP FEC 1300 includes a FEC Type field, a Flags field, and a Value field.

The FEC Type field, which is a 1-octet field, indicates the type of FEC. For example, the following FEC types may be defined and used: (a) 1=Prefix FEC (an example of which is presented in FIG. 14), (b) 2=PWid FEC (an example of which is presented in FIG. 15), and (C) 3=Offset in Aggregate FEC (an example of which is presented in FIG. 16). It will be appreciated that few or more types, including different types) may be defined and/or defined in other ways.

The Flags field, which is an 8-bit field, indicates various supplementary information of the FEC. The Flags field may include an S-bit which may be provided in the least significant bit of the Flags field. The S-bit is configured to indicate whether more labels follow the FEC of the sub-LSP (e.g., S-bit=0 means that more labels follow the FEC of the sub-LSP and S-bit=1 means that no labels follow the FEC of the sub-LSP, or vice versa). For example, when a VPN labelled packet is transported on the sub-LSP then there will be at least one label after the FEC. The encoding of the Flags field is dependent on the FEC Type.

The Value field, which is a variable length field, includes the value that identifies the FEC.

FIG. 14 depicts an example embodiment of a Prefix FEC Sub-LSP for illustrating a format of the Prefix FEC Sub-LSP.

The Prefix FEC Sub-LSP 1400 may be encoded into a packet below SLI. It is noted that this format is used for sub-LSPs of inter-domain Prefix FEC Aggregate LSPs. The Prefix FEC Sub-LSP 1400 includes a FEC Type field, a Flags field, an Address Family field, a Prefix Length field, and a Prefix field.

The FEC Type field, which is a 1-octet field, is encoded with value 1 to indicate Prefix FEC Sub-LSP.

The Flags field, which is an 8-bit field, indicates various supplementary information of the FEC. The Flags field may include an S-bit which may be provided in the least significant bit of the Flags field. The S-bit is configured to indicate whether more labels follow the FEC of the sub-LSP (e.g., S-bit=0 means that more labels follow the FEC of the sub-LSP and S-bit=1 means that no labels follow the FEC of the sub-LSP, or vice versa). For example, when a VPN labelled packet is transported on the sub-LSP then there will be at least one label after then FEC. The encoding of the Flags field is dependent on the FEC Type.

The Address Family field, which is a 1-octet field, indicates the address family of the Prefix FEC. Following two sub-types are defined. For example, the following two sub-types may be defined: 1=IPv4, 2=IPv6.

The Prefix Length, which is a 1-octet field, encodes the prefix length for the sub-LSP. For example, within the Aggregate LSP 10.10.2.0/24, the sub-LSP 10.10.2.9/32 is of Prefix Length 32 and sub-LSP 10.10.2.16/28 is of Prefix Length 28.

The Prefix field is either a 4-octet value or a 16-octet value depending on the Address Family. If the Address Family is 1, then this is a 4-octet field that encodes an IPv4 prefix and, in that case, the Prefix Length field encodes the prefix length of the IPv4 prefix. If the Address Family is 2, then this is a 16-octet field that encodes an IPv6 prefix and, in that case, the Prefix Length field encodes the prefix length of the IPv6 prefix.

FIG. 15 depicts an example embodiment of a PWid FEC sub-LSP for illustrating a format of the PWid FEC sub-LSP.

The PWid FEC sub-LSP 1500 may be encoded into a packet below SLI. It is noted that this format is used for PWs overlaid atop an Aggregate PW (e.g., as in FIG. 7) and SS-PWs overlaid atop an Aggregate MS-PW (e.g., as in FIG. 9). The PWid FEC sub-LSP 1500 includes a FEC Type field, a Flags field, and a PWid field.

The FEC Type field, which is a 1-octet field, is encoded with value 2 to indicate PW id FEC Sub-LSP.

The Flags field, which is an 8-bit field, indicates various supplementary information of the FEC. The Flags field may include an S-bit which may be provided in the least significant bit of the Flags field. The S-bit is configured to indicate whether more labels follow the FEC of the sub-LSP (e.g., S-bit=0 means that more labels follow the FEC of the sub-LSP and S-bit=1 means that no labels follow the FEC of the sub-LSP, or vice versa). For example, when a PW flow label labelled packet is transported on the sub-LSP then there will be at least one label after the PWid FEC. A PW label is used to colour different traffic flows being transported over a PW. The encoding of the Flags field is dependent on the FEC Type.

The PWid field, which is a 2-octet field, encodes the PW identifier assigned to the sub-LSP.

FIG. 16 depicts an example embodiment of a Range-in-Aggregate FEC sub-LSP for illustrating a format of the Range-in-Aggregate FEC sub-LSP.

The Range-in-Aggregate FEC sub-LSP 1600 may be encoded into a packet below SLI. It is noted that the Range-in-Aggregate FEC sub-LSP is not a true FEC type for the LSP, but, rather, represents the range within the FEC of the aggregate LSP which represents the FEC of the sub-LSP. This enables compact encoding of the FEC of the sub-LSP. The Range-in-Aggregate FEC sub-LSP 1600 includes a FEC Type field, a Flags field, a Start Offset field, and a Range field.

The FEC Type field, which is a 1-octet field, is encoded with value 3 to indicate Range-in-Aggregate FEC sub-LSP.

The Flags field, which is an 8-bit field, indicates various supplementary information of the FEC. The Flags field may include an S-bit which may be provided in the least significant bit of the Flags field. The S-bit is configured to indicate whether more labels follow the FEC of the sub-LSP (e.g., S-bit=0 means that more labels follow the FEC of the sub-LSP and S-bit=1 means that no labels follow the FEC of the sub-LSP, or vice versa). For example, when a VPN labelled packet is transported on the sub-LSP then there will be at least one label after the FEC. The encoding of the Flags field is dependent on the FEC Type.

The Start Offset field, which is a 2-octet field, encodes the offset within the FEC of the Aggregate LSP which is the starting value of the FEC of the Sub-LSP. So, the starting value will be at an offset less than 65535 (the max offset of this 2-octet field).

The Range field includes the range of values in the FEC of the sub-LSP from the Start Offset. So, the maximum range will be less than 65535 (the max range of this 2-octet field).

It is noted that this approach offers compact encoding of a sub-LSP of Prefix FEC based Aggregate LSP when the FEC of sub-LSP is subsumed by the FEC of Aggregate LSP. For example, sub-LSP 10.10.2.9/32 can be encoded as Offset-in-Aggregate FEC of 10.10.2.0/24 with both Start Offset 9 and Range as 0. For example, sub-LSP 10.10.2.32/28 can be encoded as Offset-in-Aggregate FEC of 10.10.2.0/24 with Start Offset 32 and range 16. If the Prefix FEC is of type IPv6 then the format of FIG. 14 requires 20 octets to encode the FEC of sub-LSP, but the format of FIG. 16 requires 6 octets if both the starting value and range of the sub-LSP are within 65535.

Figure 17:
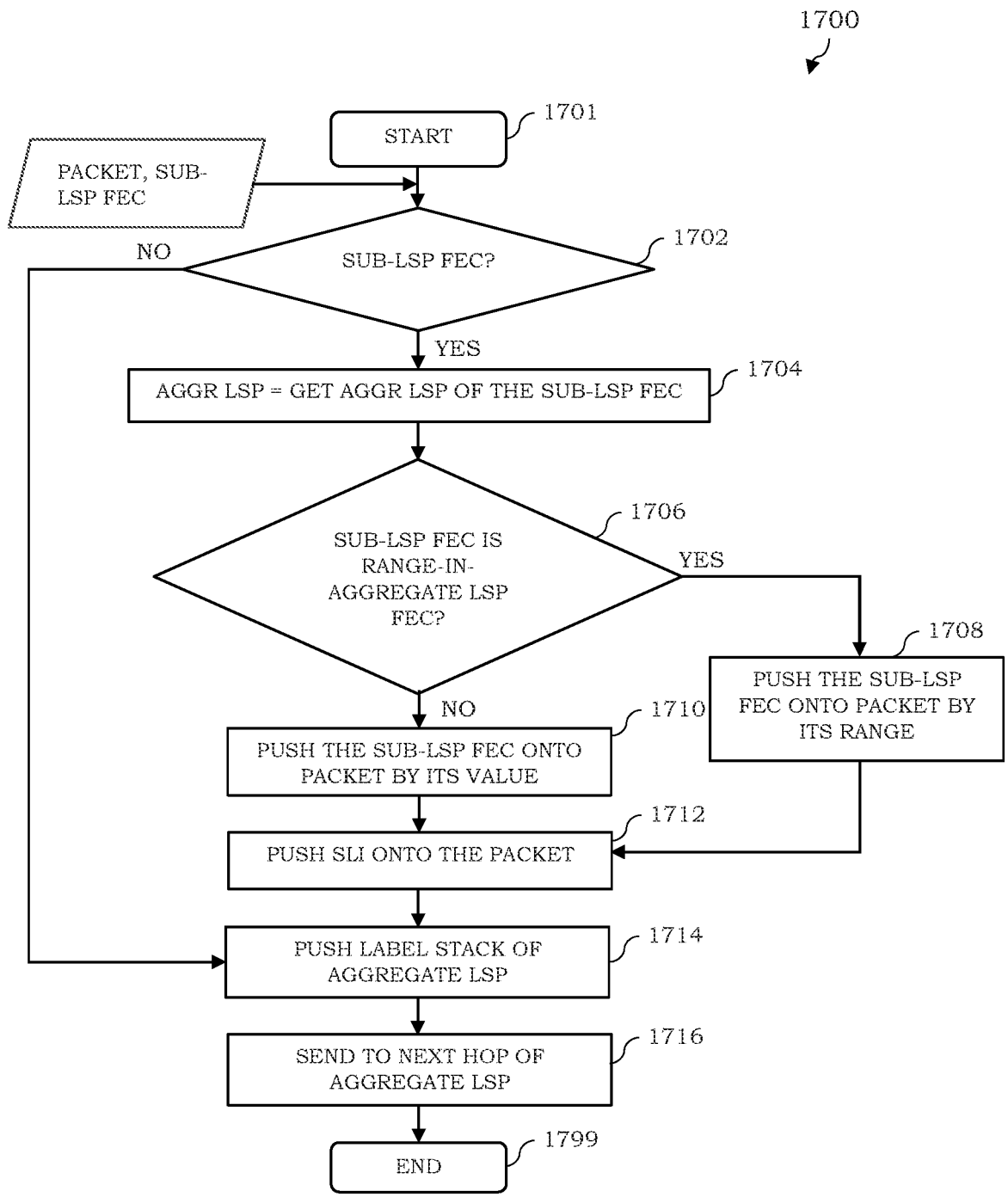
FIG. 17 depicts an example embodiment of a method for use by an ingress router of an aggregate LSP for sending a packet on the aggregate LSP.

FIG. 17 depicts an example embodiment of a method for use by an ingress router of an aggregate LSP for sending a packet on the aggregate LSP. It will be appreciated that, although primarily presented as being performed serially, at least a portion of the blocks of method 1700 may be performed contemporaneously or in a different order than as presented in FIG. 17. The inputs to method 1700 include a packet to be sent on the aggregate LSP and, if the packet is to be sent on a sub-LSP of the aggregate LSP, the FEC of the sub-LSP of the aggregate LSP. At block 1701, the method 1700 begins. Block 1702 checks if the FEC of sub-LSP is provided as input. It is noted that a sub-LSP may not be provided if the packet needs to be directly sent over the aggregate LSP. For example, if an IP4 packet with destination address 10.10.2.9 in the IPv4 header needs to be sent on the aggregate LSP of FEC 10.10.2.0/24 then the IPv4 packet may be directly sent on the aggregate LSP since the egress router on the aggregate LSP can appropriately handle the IPv4 packet. If the FEC of sub-LSP is not provided then the method 1700 proceeds to block 1714, otherwise the method 1700 proceeds to block 1704. Block 1704 retrieves the aggregate LSP associated with the sub-LSP, and the method 1700 then proceeds to block 1706. Block 1706 checks if the FEC of the sub-LSP is within a range of the FEC of the aggregate LSP that can encoded as a Range-in-Aggregate FEC (FIG. 16). For example, if the FEC of the sub-LSP is 10.10.2.9/32 and the FEC of the aggregate LSP is 10.10.2.0/24 then the FEC of the sub-LSP is a range in the FEC of the aggregate LSP with Start Offset 9 and Range 0. If the FEC of sub-LSP is to be encoded as Range-in-Aggregate FEC then the method 1700 proceeds to block 1708, otherwise the method 1700 proceeds to block 1710. Block 1708 pushes the FEC of sub-LSP onto the packet as a Range-in-Aggregate FEC, i.e. using the encoding presented in FIG. 16). From block 1710, the method 1700 proceeds to block 1712. Block 1710 pushes the FEC of the sub-LSP onto the packet. For example, this may involve encoding based on the FEC type of the sub-LSP (e.g., as in FIG. 14, FIG. 15, or the like). From block 1710, the method 1700 proceeds to block 1712. Block 1712 pushes SLI onto the packet to indicate that the FEC of sub-LSP follows the SLI, and the method 1700 then proceeds to block 1714. Block 1714 pushes the label stack of the aggregate LSP onto the packet. From block 1714, the method 1700 proceeds to block 1716. Block 1716 sends the packet to the next-hop of the aggregate LSP. This involves pushing the appropriate encapsulation(s) for transporting the packet to the next-hop of the aggregate LSP. For example, if the next-hop of the aggregate LSP is the immediate next-hop router, then this block pushes the data link layer encapsulation (e.g., Ethernet header) to the next-hop router. For example, if the next-hop of the aggregate LSP is an indirect next-hop then this block pushes the tunnelling encapsulations to the next-hop of the aggregate LSP. For example, if the aggregate LSP is an aggregate PW then this block pushes the encapsulation(s) for the PSN tunnel to next-hop (S-PE or T-PE) of the aggregate PW and sends the packet to the immediate next-hop of the PSN tunnel. From block 1716, the method 1700 proceeds to block 1799 where the method 1700 ends. At block 1700, the method 1700 ends.

Figure 18:
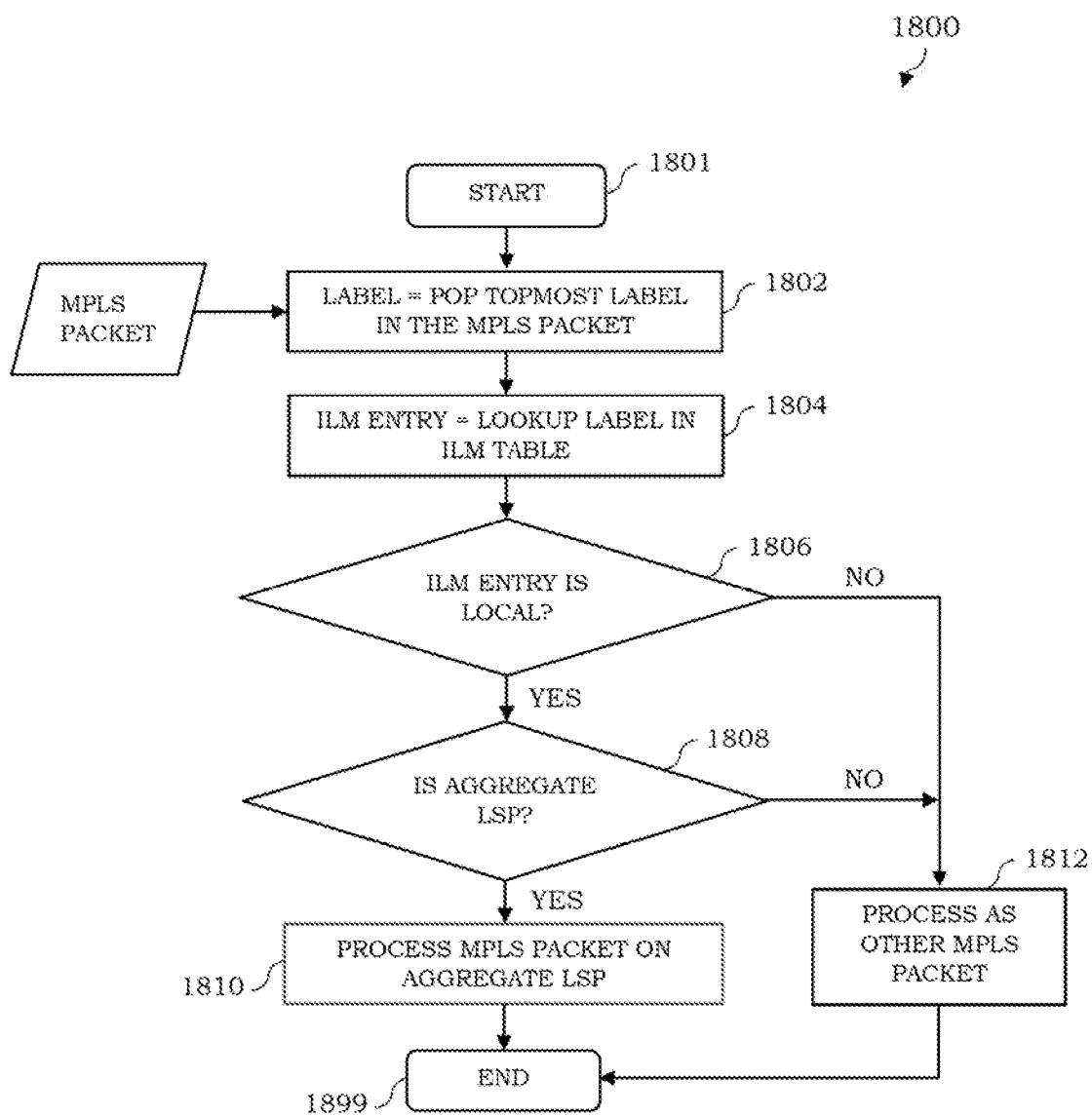
FIG. 18 depicts an example embodiment of a method for use by an egress router of an aggregate LSP for processing an MPLS packet.

FIG. 18 depicts an example embodiment of a method for use by an egress router of an aggregate LSP for processing an MPLS packet. It will be appreciated that, although primarily presented as being performed serially, at least a portion of the blocks of method 1800 may be performed contemporaneously or in a different order than as presented in FIG. 18. The input to method 1800 includes an MPLS packet received by the router. At block 1801, the method 1800 begins. Block 1802 pops the topmost label in the packet, and the method 1800 then proceeds to block 1804. Block 1804 looks up the label in the ILM table, and then the method 1800 proceeds to block 1806. Block 1806 checks if the ILM entry is marked as local, which means that the router is the egress router for the label. If the router is not the egress router for the label then the method 1800 proceeds to block 1812, otherwise the method 1800 proceeds to block 1808. Block 1808 checks if the FEC for the ILM entry is an aggregate FEC. If the FEC for the ILM entry is not an aggregate FEC then the method 1800 proceeds to block 1812, otherwise the method 1800 proceeds to block 1810. Block 1810 processes the packet in the context of the aggregate LSP, and then the method 1800 proceeds to block 1899 where the method 1800 ends. Block 1812 processes the packet based on the ILM entry, as this is not the packet terminating on an aggregate LSP, and then the method 1800 proceeds to block 1899 where the method 1800 ends. At block 1899, the method 1800 ends.

Figure 19:
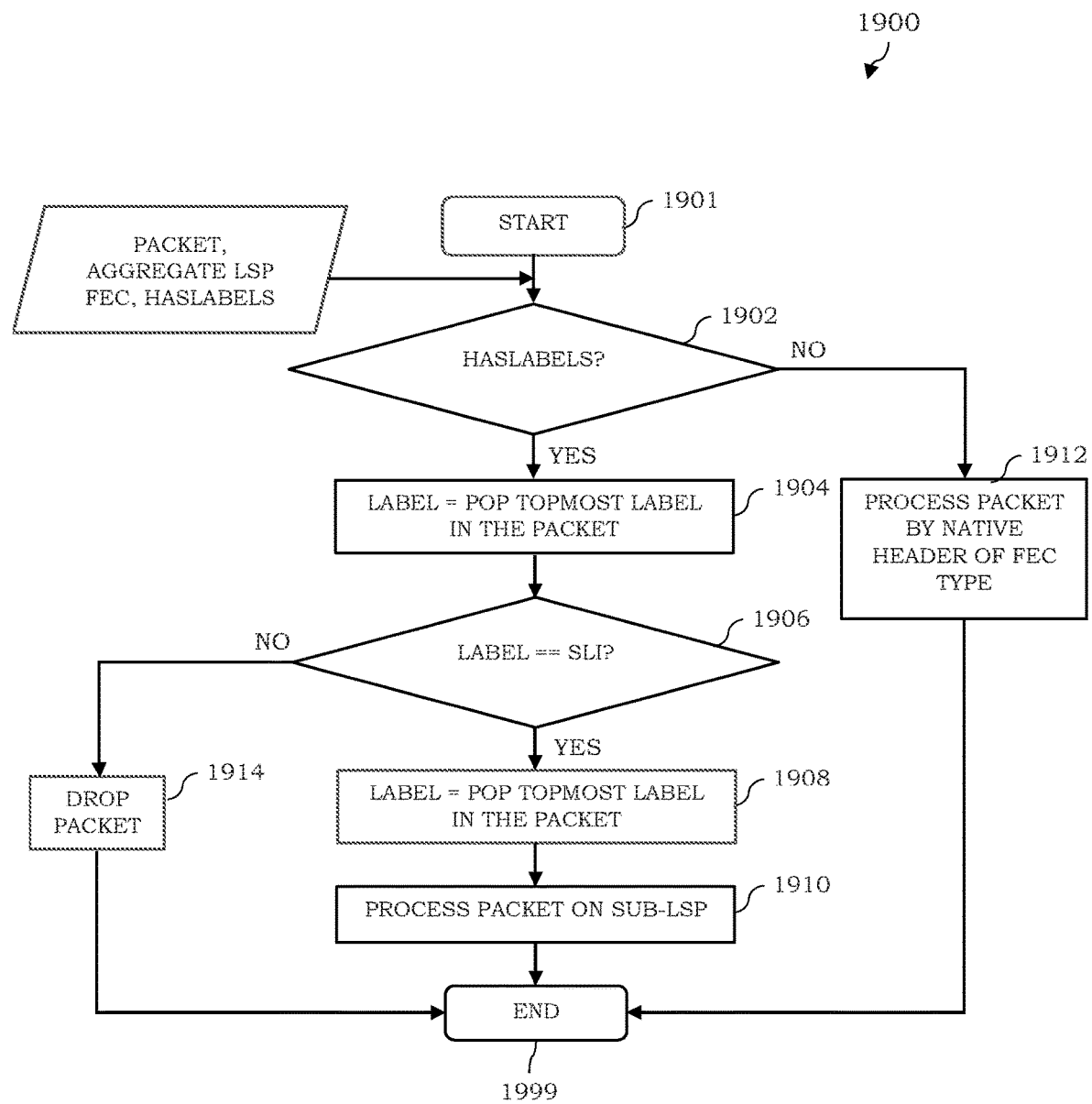
FIG. 19 depicts an example embodiment of a method for processing a packet terminating on an aggregate LSP.

FIG. 19 depicts an example embodiment of a method for processing a packet terminating on an aggregate LSP. It is noted that the packet is processed in the context of the FEC of the aggregate LSP. It is noted that the method 1900 may provide an implementation of block 1810 of method 1800 of FIG. 18. It will be appreciated that, although primarily presented as being performed serially, at least a portion of the blocks of method 1900 may be performed contemporaneously or in a different order than as presented in FIG. 19. The inputs to method 1900 include a packet received on an aggregate LSP, the FEC of the aggregate LSP, and an indication as to whether the packet is an MPLS packet. It is noted that the indication as to whether the packet is an MPLS may be provided by a HasLabels parameter (e.g., based on the BOS bit in the Aggregate LSP Label) which, if true, indicates that the packet is an MPLS packet. At block 1901, the method 1900 begins. Block 1902 checks if the packet is an MPLS packet. This condition may be checked by determining whether the input HasLabels parameter is true. If the packet is not an MPLS packet then the method 1900 proceeds to block 1912, otherwise the method 1900 proceeds to block 1904. Block 1912 processes the packet based on its native header, where the native header is determined based on the FEC type of the aggregate LSP. For example, if the FEC type of aggregate LSP is Prefix FEC, then the packet is treated as IP packet and processed accordingly. For example, if the FEC of aggregate LSP is 10.10.2.0/24, then the IP packet could be an IPv4 packet to destination 10.10.2.9. Block 1904 pops the topmost label in the packet and the method 1900 then proceeds to block 1906. Block 1906 checks if the label is SLI. If the label is not SLI then the method 1900 proceeds to block 1914, otherwise the method 1900 proceeds to block 1908. Block 1914 drops the packet since any labelled packet on an aggregate LSP belongs to a sub-LSP and so a SLI must have been present. From block 1914, the method proceeds to block 1999 where the method 1900 ends. Block 1908 pops the SLI from the packet and the method 1900 then proceeds to block 1910. Block 1910 processes the packet as a sub-LSP packet, and then the method 1900 proceeds to block 1999 where the method 1900 ends.

Figure 20:
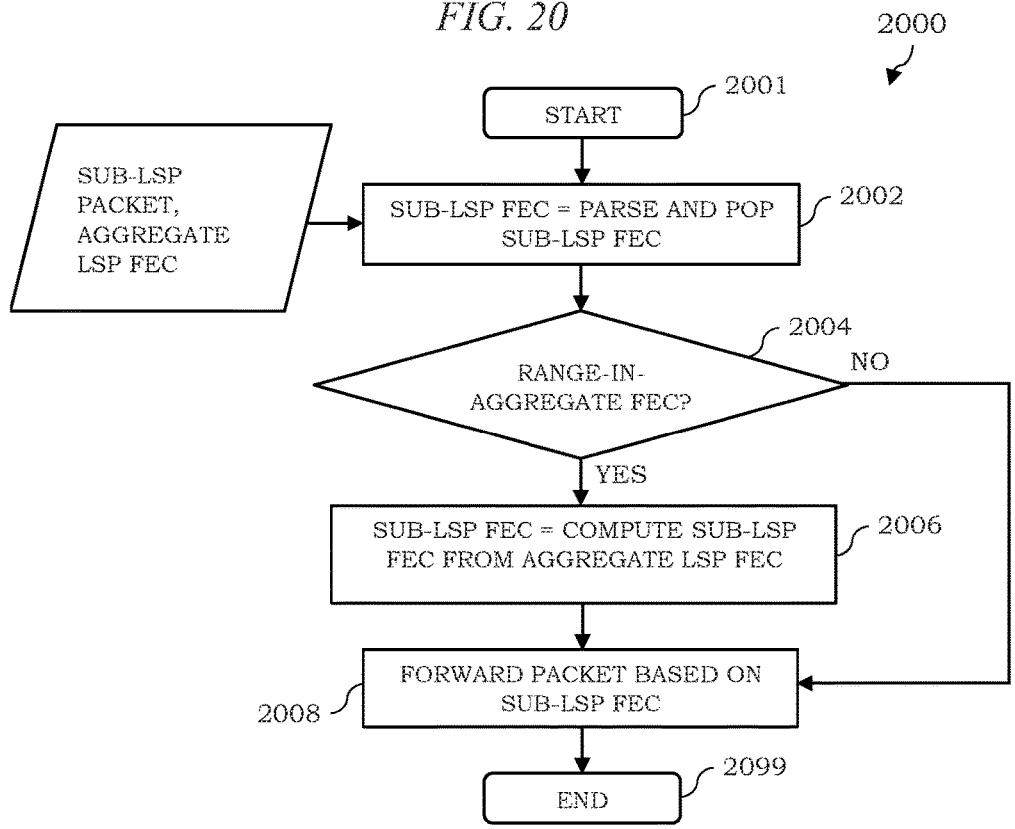
FIG. 20 depicts an example embodiment of a method for processing a packet received on a sub-LSP in the context of an aggregate LSP.

FIG. 20 depicts an example embodiment of a method for processing a packet received on a sub-LSP in the context of an aggregate LSP. It is noted that the method 2000 may provide an implementation of block 1910 of method 1900 of FIG. 19. It will be appreciated that, although primarily presented as being performed serially, at least a portion of the blocks of method 2000 may be performed contemporaneously or in a different order than as presented in FIG. 20. The inputs to method 2000 include a packet with the FEC of a sub-LSP as its topmost header and the FEC of the aggregate LSP on which the packet arrived. At block 2001, the method 2000 begins. Block 2002 parses and pops the sub-LSP FEC from the top of the packet, and the method 2000 then proceeds to block 2004. Block 2004 checks if the sub-LSP FEC is of type Range-in-Aggregate FEC (FIG. 16). If the sub-LSP FEC is of type Range-in-Aggregate FEC then the method 2000 proceeds to block 2006, otherwise the method 2000 proceeds to block 2008. Block 2006 computes the actual FEC of the sub-LSP by mapping the Range-in-Aggregate FEC to the FEC of the aggregate LSP. For example, if the FEC of aggregate LSP is the Prefix FEC 10.10.2.0/24 and Start Offset, and Range fields in Range-in-Aggregate FEC are 32 and 16, respectively, then the computed FEC of the sub-LSP is 10.10.2.32/28. From block 2006, the method 2000 proceeds to block 2008. Block 2008 forwards the packet in the context of the FEC of the sub-LSP, and then the method 2000 proceeds to block 2099 where the method 2000 ends. At block 2099, the method 200 ends.

Figure 21:
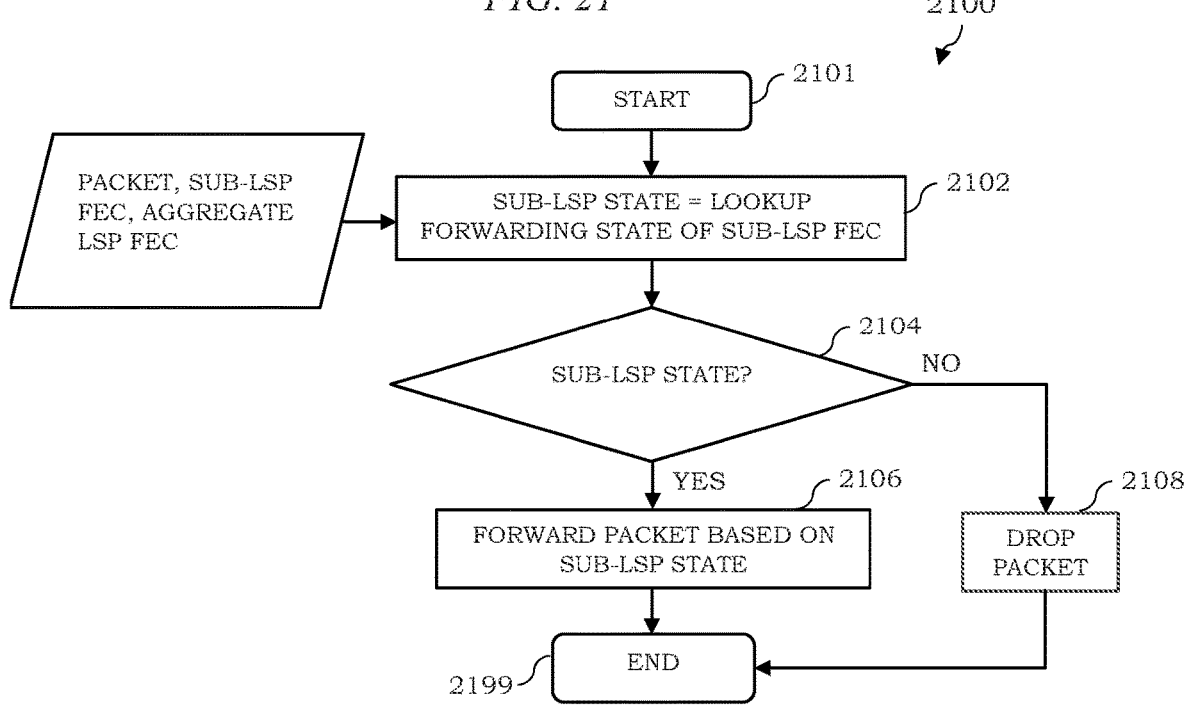
FIG. 21 depicts an example embodiment of a method for forwarding a packet on a sub-LSP FEC.

FIG. 21 depicts an example embodiment of a method for forwarding a packet on a sub-LSP FEC. It is noted that the method 2100 may provide an implementation of block 2008 of method 2000 of FIG. 20. It will be appreciated that, although primarily presented as being performed serially, at least a portion of the blocks of method 2100 may be performed contemporaneously or in a different order than as presented in FIG. 21. The inputs to method 2100 include a packet to be forwarded on a sub-LSP, a sub-LSP FEC, and an Aggregate LSP FEC. At block 2101, the method 2100 begins. Block 2102 looks up the FEC of the sub-LSP in the appropriate forwarding table of the FEC type. For example, if the FEC is a Prefix FEC (FIG. 14) then the lookup of the FEC may be in the FTN Table. For example, if the FEC is a PWid (FIG. 15) then the lookup of the FEC may be in the PWid forwarding table. From block 2102, the method 2100 proceeds to block 2104. Block 2104 checks if the forwarding state exists for the sub-LSP. If the forwarding state does not exist for the sub-LSP then the method 2100 proceeds to block 2108, otherwise the method 2100 proceeds to block 2106. Block 2106 forwards the packet on the sub-LSP and then the method 2100 proceeds to block 2199 where the method 2100 ends. Block 2108 drops the packet and then the method 2100 proceeds to block 2199 where the method 2100 ends. At block 2199, the method 2100 ends.

Figure 22:
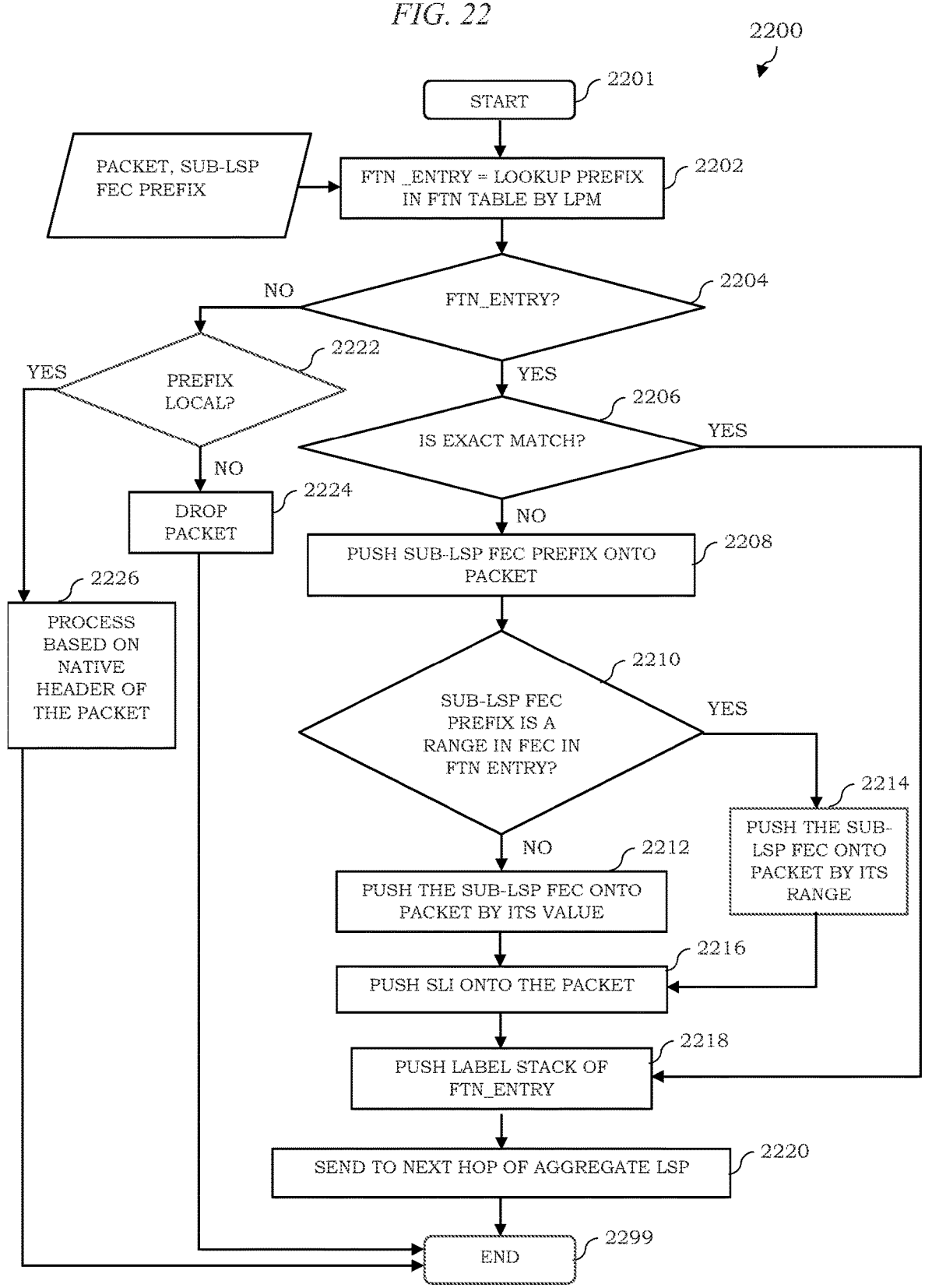
FIG. 22 depicts an example embodiment of a method for forwarding a packet on a sub-LSP when the FEC is of type Prefix.

FIG. 22 depicts an example embodiment of a method for forwarding a packet on a sub-LSP when the FEC is of type Prefix. It is noted that the method 2200 may provide an implementation of method 2100 of FIG. 21 when the sub-LSP FEC is of type Prefix. It will be appreciated that, although primarily presented as being performed serially, at least a portion of the blocks of method 2200 may be performed contemporaneously or in a different order than as presented in FIG. 22. The inputs to method 2200 include a packet to be forwarded on a sub-LSP and the sub-LSP FEC Prefix. At block 2201, the method 2200 begins. Block 2202 looks up the entry in the FTN Table that best matches the sub-LSP FEC Prefix. The best match here means the longest prefix match (LPM). From block 2202, the method 2200 proceeds to block 2204. Block 2204 checks if the matching FTN entry is found. If the matching FTN entry is not found then the method 2200 proceeds to block 2222, otherwise the method 2200 proceeds to block 2206. Block 2206 checks if the FEC Prefix in the FTN entry is an exact match of the sub-LSP FEC Prefix. If the FEC Prefix in the FTN entry is an exact match of the sub-LSP FEC Prefix then the method 2200 proceeds to block 2218, otherwise the method 2200 proceeds to block 2208. Block 2222 checks if the sub-LSP FEC Prefix is a local IP address or a local subnet. This determination can be made by looking up the Prefix in IP routing table. If the sub-LSP FEC Prefix is not local then the method 2200 proceeds to block 2224, otherwise the method 2200 proceeds to block 2226. Block 2224 drops the packet since a matching LSP is not found, then the method 2200 proceeds to block 2299 where the method 2200 ends. Block 2226 processes the packet based on its native header, since the router is also the egress router of the sub-LSP. If the packet is an MPLS packet (e.g., if this is a VPN packet then there will be one or more MPLS labels, as indicated by S-flag in the sub-LSP FEC), then the packet is re-inserted to method 1800 of FIG. 18. If the packet is not an MPLS packet, then the packet is processed as a local IP packet. From block 2226, the method 2200 proceeds to block 2299 where the method 2200 ends. Block 2208 pushes the sub-LSP FEC Prefix onto the packet, since the packet needs to be transported on an aggregate LSP, as an exact matching entry for the sub-LSP FEC Prefix is not found in FTN Table. From block 2208, the method 2200 proceeds to block 2210. Block 2210 checks if the sub-LSP FEC Prefix is within such a range in the FEC Prefix in the FTN entry that the sub-LSP FEC can be encoded in a compact form as a Range-in-Aggregate FEC (as depicted in FIG. 16). If the sub-LSP FEC Prefix is not within such a range in the FEC Prefix in the FTN entry that the sub-LSP FEC can be encoded in a compact form as a Range-in-Aggregate FEC then the method 2200 proceeds to block 2212, otherwise the method 2200 proceeds to block 2214. Block 2214 computes the Start Offset and Range of the sub-LSP FEC prefix in FEC Prefix in FTN Entry and encodes the Range-in-Aggregate FEC, which is pushed onto the top of the packet. For example, if the sub-LSP FEC Prefix is 10.10.2.32/28 and FEC Prefix in FTN entry is 10.10.2.0/24 then Range-in-Aggregate FEC is encoded with Start Offset 32 and Range 16. From block 2214, the method 2200 proceeds to block 2216. Block 2212 pushes the sub-LSP FEC prefix onto the packet, and then the method 2200 proceeds to block 2216. Block 2216 pushes the SLI onto the packet, and then the method 2200 proceeds to block 2218. Block 2218 pushes the label stack of the aggregate LSP, i.e., the label stack associated with FTN entry. It is noted that the aggregate LSP itself may be overlaid on other LSPs (e.g., LDPoverRSVP, BGPoverLD-PoverSR, or the like), which may require pushing of labels for each level, and, thus, that block 2218 may need to push the entire label stack. From block 2218, the method 2200 proceeds to block 2220. Block 2220 sends the MPLS packet to the next hop of the aggregate LSP. From block 2220, the method 2200 proceeds to block 2299 where the method 2200 ends.

Figure 23:
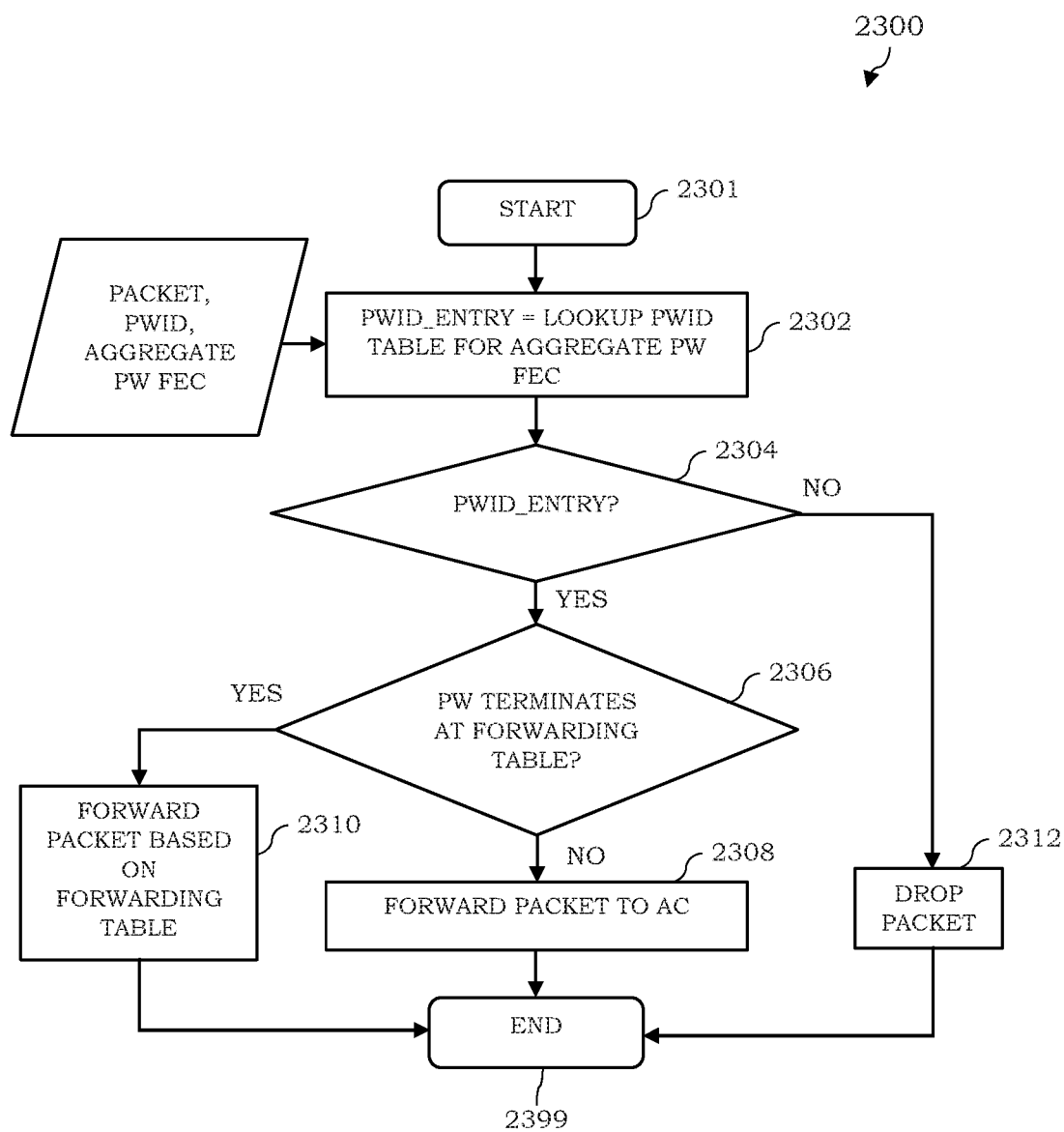
FIG. 23 depicts an example embodiment of a method for forwarding a packet on a sub-LSP when the FEC is of type PWid.

FIG. 23 depicts an example embodiment of a method for forwarding a packet on a sub-LSP when the FEC is of type PWid. It is noted that the method 2300 may provide an implementation of method 2100 of FIG. 21 when the sub-LSP FEC is of type PWid. It will be appreciated that, although primarily presented as being performed serially, at least a portion of the blocks of method 2300 may be performed contemporaneously or in a different order than as presented in FIG. 23. The inputs to method 2300 include a packet received on the PW (sub-LSP), the PWid of the PW, and the FEC of the aggregate PW on which the PW is overlaid. At block 2301, the method 2300 begins. Block 2302 looks up the PWid Table associated with the FEC of the Aggregate PW, by using PWid as the index, and the method 2300 then it proceeds to block 2304. Block 2304 checks if a matching PWid Table entry is found. If a matching PWid Table entry is not found then the method 2300 proceeds to block 2312, otherwise the method 2300 proceeds to block 2306. Block 2312 drops the packet and then the method 2300 proceeds to block 2399 where the method 2300 ends. Block 2306 checks if the PW terminates in a forwarding table, which is indicated by a field in PWid Table entry. For example, if the PW is used for connecting VPLS sites, then the PW terminates in a MAC forwarding table. If the PW terminates in a forwarding table then the method 2300 proceeds to block 2310, otherwise the method 2300 proceeds to block 2308. Block 2310 forwards the packet based on processing of the native header in the context of the forwarding table. For example, if the packet is an Ethernet packet in a VPLS, then the destination address of the Ethernet header is looked up in the MAC forwarding table of the VPLS and the packet is forwarded to the appropriate next-hop. From block 2310, the method 2300 proceeds to block 2399 where the method 2300 ends. Block 2308 forwards the packet to the AC programmed in the PWid Table entry, and then the method 2300 proceeds to block 2399 where the method 2300 ends. At block 2399, the method 2300 ends.

Figure 24:
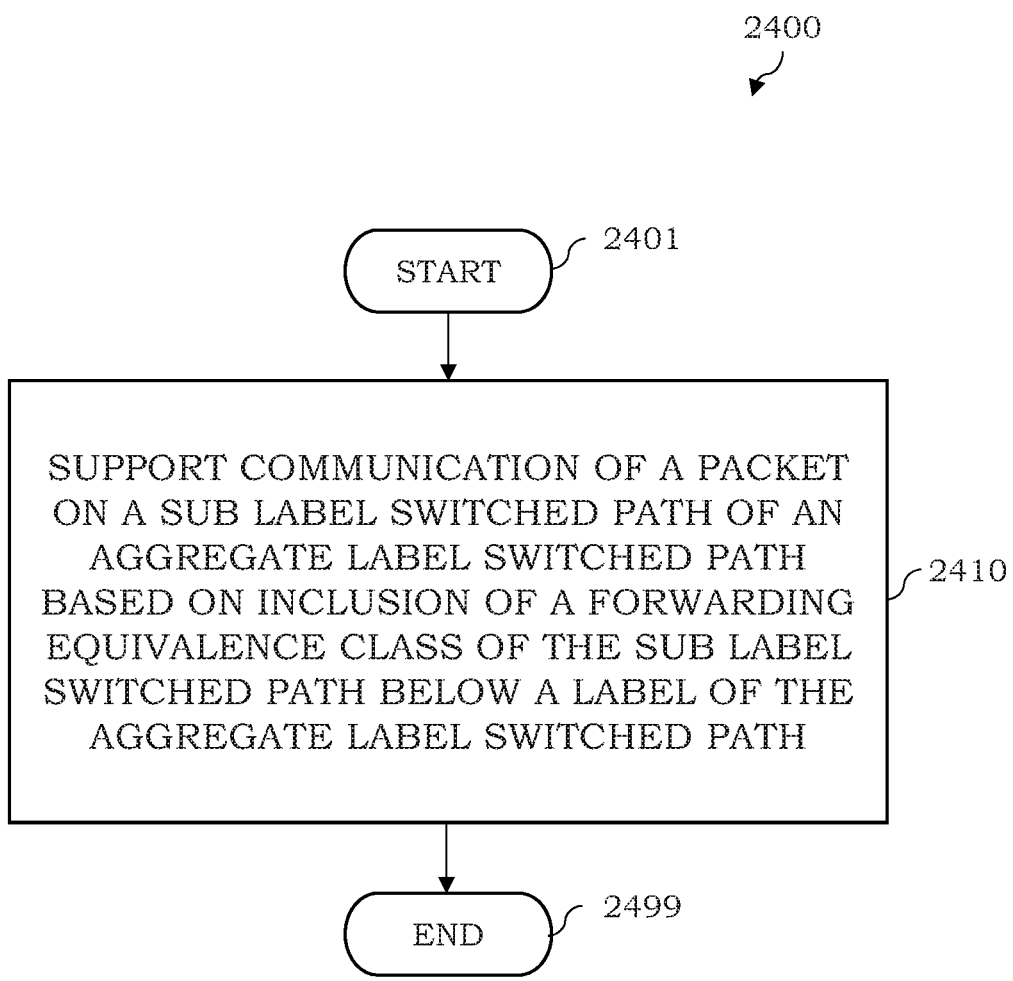
FIG. 24 depicts an example embodiment of a method for supporting scalability of LSPs.

FIG. 24 depicts an example embodiment of a method for supporting scalability of a label switched path. It will be appreciated that although primarily presented as being performed serially, at least a portion of the blocks of method 2400 may be performed contemporaneously or in a different order than as presented in FIG. 24. At block 2401, the method 2400 begins. At block 2410, support communication of a packet on a sub label switched path of an aggregate label switched path based on inclusion of a forwarding equivalence class of the sub label switched path below a label of the aggregate label switched path. In at least some example embodiments, supporting communication of the packet may include determining, by an egress router of the aggregate label switched path based on the forwarding equivalence class of the sub label switched path, a next label switched path for the packet. In at least some example embodiments, the method includes preventing signaling, by an egress router of the aggregate label switched path, signaling of an association of the sub label switched path to the aggregate label switched path. In at least some example embodiments, the method includes forming, by an ingress router of the aggregate label switched path, an association of the sub label switched path to the aggregate label switched path. In at least some example embodiments, the association of the sub label switched path to the aggregate label switched path is based on the forwarding equivalence class of the sub label switched path being a subset of a forwarding equivalence class of the aggregate label switched path. In at least some example embodiments, the association of the sub label switched path to the aggregate label switched path is based on a policy at the ingress router. In at least some example embodiments, the sub label switched path is based on a first version of Internet Protocol (IP) and the aggregate label switched path is based on a second version of IP, wherein the policy at the ingress router is configured to associate a first IP prefix of the first version of IP with a second IP prefix of the second version of IP. In at least some example embodiments, a forwarding equivalence class type of the sub label switched path and a forwarding equivalence class type of the aggregate label switched path are the same. In at least some example embodiments, the forwarding equivalence class type of the sub label switched path and the forwarding equivalence class type of the aggregate label switched path are a prefix forwarding equivalence class type. In at least some example embodiments, the forwarding equivalence class of the sub label switched path is a subset of the forwarding equivalence class of the aggregate label switched path. In at least some example embodiments, the prefix forwarding equivalence class type is an Internet Protocol version 4 (IPv4) prefix or an Internet Protocol version 6 (IPv6) prefix. In at least some example embodiments, the sub label switched path is a single segment pseudowire and the forwarding equivalence class of the sub label switched path is a numeric PWid based forwarding equivalence class type, wherein the aggregate label switched path is a single-segment pseudowire and the forwarding equivalence class of the aggregate label switched path is a PWid based forwarding equivalence class type. In at least some example embodiments, the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a PWid forwarding equivalence class type. In at least some example embodiments, a forwarding equivalence class type of the sub label switched path and a forwarding equivalence class type of the aggregate label switched path are different. In at least some example embodiments, the sub label switched path is a single segment pseudowire and the forwarding equivalence class of the sub label switched path is a PWid based forwarding equivalence class type, wherein the aggregate label switched path is a multi-segment pseudowire and the forwarding equivalence class of the aggregate label switched path is an {SAII, TAII} based forwarding equivalence class type. In at least some example embodiments, the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a single-segment pseudowire forwarding equivalence class type. In at least some example embodiments, the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a multi-segment pseudowire forwarding equivalence class type. In at least some example embodiments, the sub label switched path and the aggregate label switched path have a common egress router. In at least some example embodiments, an egress router of the aggregate label switched path is a border router of a routing domain, wherein a forwarding equivalence class type of the aggregate label switched path is a prefix forwarding equivalence class type. In at least some example embodiments, the routing domain is an Interior Gateway Protocol (IGP) area or an Autonomous System (AS). In at least some example embodiments, the prefix forwarding equivalence class type is a prefix forwarding equivalence class that encodes an Internet Protocol (IP) route prefix summarized by the border router of the routing domain. In at least some example embodiments, an egress router of the aggregate label switched path is a provider edge router, wherein a forwarding equivalence class type of the aggregate label switched path is a single segment pseudowire forwarding equivalence class type. In at least some example embodiments, an egress router of the aggregate label switched path is a terminating provider edge router, wherein a forwarding equivalence class type of the aggregate label switched path is a multi-segment pseudowire forwarding equivalence class type. In at least some example embodiments, the method includes verifying, by an ingress router, a validity of the sub label switched path at an egress router of the aggregate label switched path. In at least some example embodiments, the validity of the sub label switched path at the egress router of the aggregate label switched path is verified based on sending of at least one connectivity message from the ingress router to the egress router of the aggregate label switched path. In at least some example embodiments, the method includes signaling, by an egress router of the aggregate label switched path, an indication of a set of valid sub label switched paths of the aggregate label switched path. In at least some example embodiments, signaling the indication of the set of valid sub label switched paths of the aggregate label switched path includes including, by the egress router of the aggregate label switched path within a label mapping message of the aggregate label switched path, a bit string including a set of bit positions associated with a respective set of sub label switched paths of the aggregate label switched path. In at least some example embodiments, the forwarding equivalence class of the sub label switched path is a numeric PWid forwarding equivalence class type and a forwarding equivalence class type of the aggregate label switched path is a single segment pseudowire forwarding equivalence class type, wherein the bit position of the sub label switched path in the bit string is a PWid of the sub label switched path. In at least some example embodiments, the forwarding equivalence class of the sub label switched path is a numeric PWid forwarding equivalence class type and a forwarding equivalence class type of the aggregate label switched path is a multi-segment pseudowire forwarding equivalence class type, wherein the bit position of the sub label switched path in the bit string is a PWid of the sub label switched path. In at least some example embodiments, the forwarding equivalence class of the sub label switched path is an Internet Protocol (IP) host address within a prefix forwarding equivalence class of the aggregate label switched path, wherein the bit position of the sub label switched path in the bit string is an offset of the IP host address within the prefix forwarding equivalence class of the aggregate label switched path. At block 2499, the method 2400 ends.

It will be appreciated that, although primarily presented herein within the context of an arrangement in which communication of a packet is supported on a sub-LSP of an aggregate LSP, in at least some example embodiments the aggregate LSP may be a more general form of LSP and the sub-LSP may be referred to more generally as a member LSP of the LSP. In at least some example embodiments, communication of a packet on a sub-LSP, or member LSP, of an LSP may be supported based on inclusion of a FEC of the sub-LSP, or member LSP, below a label of the LSP.

Various example embodiments for supporting scalability of LSPs may provide various advantages or potential advantages. For example, various example embodiments for supporting scalability of LSPs may be configured to provide a simple and generic solution for scalability of MPLS LSPs with very minimal changes to the existing MPLS dataplane and control planes. For example, various example embodiments for supporting scalability of LSPs may be configured to support scalability of inter-domain LSPs, including reducing the number of IGP inter-area LSPs by a factor of the average number of routers per area (e.g., in many cases, practically speaking, an IGP area can have up to 300 routers, so the inter-area LSPs can reduce by a factor of 300, which is a significant scaling improvement). In general, scalability of inter-domain LSPs is a major pain point today. For example, various example embodiments for supporting scalability of LSPs may be configured to improve scalability of various types of PWs including SS-PWs and MS-PWs (e.g., by up to 99.97% in at least some cases). Various example embodiments for supporting scalability of LSPs may provide various other advantages or potential advantages.

Figure 25:
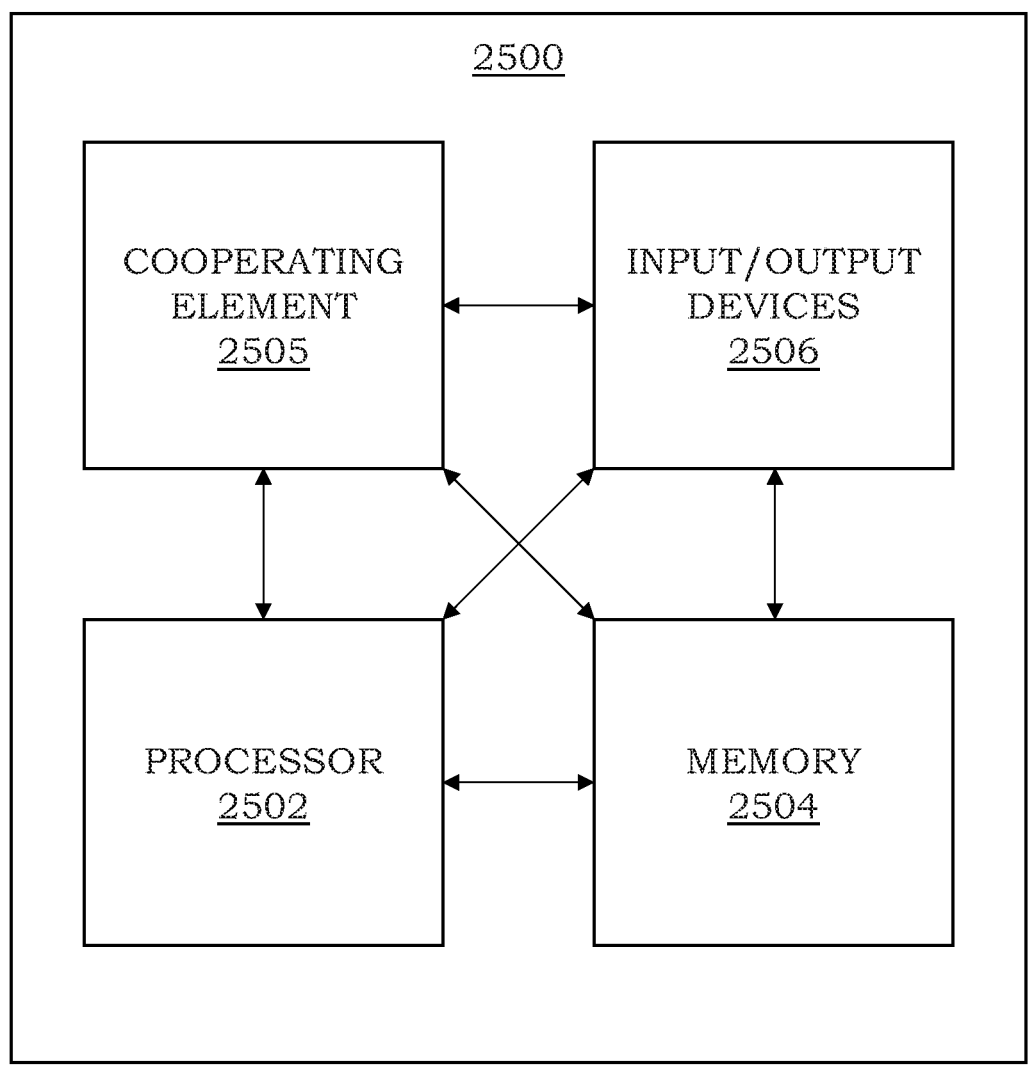
FIG. 25 depicts an example embodiment of a computer suitable for use in performing various functions presented herein.

FIG. 25 depicts an example embodiment of a computer suitable for use in performing various functions presented herein.

The computer 2500 includes a processor 2502 (e.g., a central processing unit (CPU), a processor, a processor having a set of processor cores, a processor core of a processor, or the like) and a memory 2504 (e.g., a random access memory, a read only memory, or the like). The processor 2502 and the memory 2504 may be communicatively connected. In at least some example embodiments, the computer 2500 may include at least one processor and at least one memory including computer program code, wherein the at least one memory and the computer program code are configured to, with the at least one processor, cause the computer to perform various functions presented herein.

The computer 2500 also may include a cooperating element 2505. The cooperating element 2505 may be a hardware device. The cooperating element 2505 may be a process that can be loaded into the memory 2504 and executed by the processor 2502 to implement various functions presented herein (in which case, for example, the cooperating element 2505 (including associated data structures) can be stored on a non-transitory computer-readable storage medium, such as a storage device or other suitable type of storage element (e.g., a magnetic drive, an optical drive, or the like)).

The computer 2500 also may include one or more input/output devices 2506. The input/output devices 2506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2500 may represent a general architecture and functionality suitable for implementing functional elements described herein, portions of functional elements described herein, or the like, as well as various combinations thereof. For example, computer 2500 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative"). It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions that, when executed by the at least one processor, cause the apparatus to:
   support communication of a packet on a sub label switched path of an aggregate label switched path, wherein the packet includes a payload, a forwarding equivalence class of the sub label switched path, and a label of the aggregate label switched path, wherein the forwarding equivalence class of the sub label switched path is arranged between the payload and the label of the aggregate label switched path.

2. The apparatus of claim 1, wherein, to support communication of the packet, the instructions, when executed by the at least one processor, cause the apparatus to:
   determine, by an egress router of the aggregate label switched path based on the forwarding equivalence class of the sub label switched path, a next label switched path for the packet.

3. The apparatus of claim 1, wherein the instructions, when executed by the at least one processor, cause the apparatus to:
   prevent, by an egress router of the aggregate label switched path, signaling of an association of the sub label switched path to the aggregate label switched path.

4. The apparatus of claim 1, wherein the instructions, when executed by the at least one processor, cause the apparatus to:
   form, by an ingress router of the aggregate label switched path, an association of the sub label switched path to the aggregate label switched path.

5. The apparatus of claim 4, wherein the association of the sub label switched path to the aggregate label switched path is based on the forwarding equivalence class of the sub label switched path being a subset of a forwarding equivalence class of the aggregate label switched path.

6. The apparatus of claim 1, wherein a forwarding equivalence class type of the sub label switched path and a forwarding equivalence class type of the aggregate label switched path are the same.

7. The apparatus of claim 6, wherein the forwarding equivalence class type of the sub label switched path and the forwarding equivalence class type of the aggregate label switched path are a prefix forwarding equivalence class type.

8. The apparatus of claim 6, wherein the sub label switched path is a single segment pseudowire and the forwarding equivalence class of the sub label switched path is a numeric PWid based forwarding equivalence class type, wherein the aggregate label switched path is a single-segment pseudowire and the forwarding equivalence class of the aggregate label switched path is a PWid based forwarding equivalence class type.

9. The apparatus of claim 6, wherein the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a PWid forwarding equivalence class type.

10. The apparatus of claim 1, wherein a forwarding equivalence class type of the sub label switched path and a forwarding equivalence class type of the aggregate label switched path are different.

11. The apparatus of claim 10, wherein one of:
    the sub label switched path is a single segment pseudowire and the forwarding equivalence class of the sub label switched path is a PWid based forwarding equivalence class type, wherein the aggregate label switched path is a multi-segment pseudowire and the forwarding equivalence class of the aggregate label switched path is a {source attachment individual identifier (SAII), target attachment individual identifier (TAII)} based forwarding equivalence class type;
    the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a single-segment pseudowire forwarding equivalence class type; or
    the sub label switched path is a single segment pseudowire and the forwarding equivalence class of the sub label switched path is a numeric PWid based forwarding equivalence class type, wherein the aggregate label switched path is a multi-segment pseudowire and the forwarding equivalence class of the aggregate label switched path is a multi-segment pseudowire forwarding equivalence class type.

12. The apparatus of claim 1, wherein one of:
an egress router of the aggregate label switched path is a border router of a routing domain and a forwarding equivalence class type of the aggregate label switched path is a prefix forwarding equivalence class type;
an egress router of the aggregate label switched path is a provider edge router and a forwarding equivalence class type of the aggregate label switched path is a single segment pseudowire forwarding equivalence class type, or
an egress router of the aggregate label switched path is a terminating provider edge router and a forwarding equivalence class type of the aggregate label switched path is a multi-segment pseudowire forwarding equivalence class type.

13. The apparatus of claim 1, wherein the instructions, when executed by the at least one processor, cause the apparatus to:
signal, by an egress router of the aggregate label switched path, an indication of a set of valid sub label switched paths of the aggregate label switched path.

14. The apparatus of claim 13, wherein, to signal the indication of the set of valid sub label switched paths of the aggregate label switched path, the instructions, when executed by the at least one processor, cause the apparatus to:
include, by the egress router of the aggregate label switched path within a label mapping message of the aggregate label switched path, a bit string including a set of bit positions associated with a respective set of sub label switched paths of the aggregate label switched path.

15. The apparatus of claim 14, wherein one of:
the forwarding equivalence class of the sub label switched path is a numeric PWid forwarding equivalence class type and a forwarding equivalence class type of the aggregate label switched path is a single segment pseudowire forwarding equivalence class type, wherein the bit position of the sub label switched path in the bit string is a PWid of the sub label switched path;
the forwarding equivalence class of the sub label switched path is a numeric PWid forwarding equivalence class type and a forwarding equivalence class type of the aggregate label switched path is a multi-segment pseudowire forwarding equivalence class type, wherein the bit position of the sub label switched path in the bit string is a PWid of the sub label switched path; or
the forwarding equivalence class of the sub label switched path is an Internet Protocol (IP) host address within a prefix forwarding equivalence class of the aggregate label switched path, wherein the bit position of the sub label switched path in the bit string is an offset of the IP host address within the prefix forwarding equivalence class of the aggregate label switched path.

16. A method, comprising:
supporting communication of a packet on a sub label switched path of an aggregate label switched path, wherein the packet includes a payload, a forwarding equivalence class of the sub label switched path, and a label of the aggregate label switched path, wherein the forwarding equivalence class of the sub label switched path is arranged between the payload and the label of the aggregate label switched path.

17. An apparatus, comprising:
at least one processor; and
at least one memory including instructions that, when executed by the at least one processor, cause the apparatus to:
support communication of a packet on a sub label switched path of an aggregate label switched path, wherein the packet includes a payload, a forwarding equivalence class header of the sub label switched path, and a label of the aggregate label switched path, wherein the forwarding equivalence class header is arranged between the payload and the label of the aggregate label switched path, wherein the forwarding equivalence class header includes an indication of a forwarding equivalence class of the sub label switched path and an indication of a forwarding equivalence class type of the forwarding equivalence class of the sub label switched path.

18. The apparatus of claim 1, wherein the packet includes a forwarding equivalence class header of the sub label switched path, wherein the forwarding equivalence class header of the sub label switched path includes the forwarding equivalence class of the sub label switched path and an indication of a forwarding equivalence class type of the forwarding equivalence class of the sub label switched path.

19. The apparatus of claim 1, wherein the packet includes a sub label switched path indicator label.

20. The apparatus of claim 19, wherein the sub label switched path indicator label is arranged between the forwarding equivalence class of the sub label switched path and the label of the aggregate label switched path.

21. The apparatus of claim 19, wherein the sub label switched path indicator label is configured to indicate to an egress router of the aggregate label switched path that the sub label switched path is encoded within the packet by the forwarding equivalence class of the sub label switched path.

* * * * *